US010032464B2

(12) United States Patent
Franklin et al.

(10) Patent No.: US 10,032,464 B2
(45) Date of Patent: Jul. 24, 2018

(54) DRONE DETECTION AND CLASSIFICATION WITH COMPENSATION FOR BACKGROUND CLUTTER SOURCES

(71) Applicant: DroneShield, LLC, Herndon, VA (US)

(72) Inventors: John Franklin, Washington, DC (US); Brian Hearing, Falls Church, VA (US)

(73) Assignee: Droneshield, LLC, Warrenton, VA (US)

( * ) Notice: Subject to any disclaimer, the term of this patent is extended or adjusted under 35 U.S.C. 154(b) by 0 days.

(21) Appl. No.: 15/360,069

(22) Filed: Nov. 23, 2016

(65) Prior Publication Data

US 2017/0148467 A1 May 25, 2017

Related U.S. Application Data

(60) Provisional application No. 62/259,209, filed on Nov. 24, 2015.

(51) Int. Cl.
*G10L 25/51* (2013.01)
*G06F 17/30* (2006.01)
(Continued)

(52) U.S. Cl.
CPC .............. *G10L 25/51* (2013.01); *G10L 25/39* (2013.01); *G10L 19/00* (2013.01); *G10L 25/18* (2013.01);
(Continued)

(58) Field of Classification Search
CPC ......... G10L 25/51; G10L 25/39; G10L 25/21; G10L 19/00; G10L 25/18; H04R 2410/00; H04R 29/00
See application file for complete search history.

(56) References Cited

U.S. PATENT DOCUMENTS

| | | | |
|---|---|---|---|
| 4,630,246 | A | 12/1986 | Fogler |
| 4,811,308 | A | 3/1989 | Michel |

(Continued)

FOREIGN PATENT DOCUMENTS

| | | |
|---|---|---|
| DE | 3929077 | 3/1991 |
| DE | 102007062603 | 12/2007 |

(Continued)

OTHER PUBLICATIONS

Hauzenberger et al; Drones Detection Using Audio Analysis, PHd thesis, Jun. 2015.*

(Continued)

*Primary Examiner* — Davetta W Goins
*Assistant Examiner* — Kuassi Ganmavo
(74) *Attorney, Agent, or Firm* — K&L Gates LLP

(57) ABSTRACT

A system, method, and apparatus for detecting drones are disclosed. An example method includes receiving a digital sound sample and partitioning the digital sound sample into segments. The method also includes applying a frequency and power spectral density transformation to each of the segments to produce respective sample vectors. For each of the sample vectors, the example method determines a combination of drone sound signatures and background sound signatures that most closely match the sample vector. The method further includes determining, for the sample vectors, if the drone sound signatures in relation to the background sound signatures that are included within the respective combinations are indicative of a drone. Conditioned on determining that the drone sound signatures are indicative of a drone, an alert message indicative of the drone is transmitted.

20 Claims, 30 Drawing Sheets

(51) Int. Cl.

| | |
|---|---|
| ***G10L 25/39*** | (2013.01) |
| *G10L 25/21* | (2013.01) |
| *H04R 29/00* | (2006.01) |
| *G10L 25/18* | (2013.01) |
| *G10L 19/00* | (2013.01) |

(52) U.S. Cl.
CPC .............. *G10L 25/21* (2013.01); *H04R 29/00* (2013.01); *H04R 2410/00* (2013.01)

(56) References Cited

U.S. PATENT DOCUMENTS

| | | | | |
|---|---|---|---|---|
| 5,060,206 | A | 10/1991 | DeMetz, Sr. | |
| 5,721,712 | A | 2/1998 | LaPointe | |
| 5,831,936 | A | 11/1998 | Zlotnick et al. | |
| 6,366,240 | B1 | 4/2002 | Timothy et al. | |
| 6,400,647 | B1 * | 6/2002 | Huntress | G01V 1/001 367/136 |
| 6,980,152 | B2 | 12/2005 | Steadman et al. | |
| 7,872,948 | B2 | 1/2011 | Davis et al. | |
| 7,957,225 | B2 | 6/2011 | Steadman | |
| 8,059,489 | B1 | 11/2011 | Lee et al. | |
| 8,446,321 | B2 | 5/2013 | Smith | |
| 2002/0131721 | A1 | 12/2002 | Sugiyama et al. | |
| 2006/0241916 | A1 * | 10/2006 | Sieracki | G10L 15/02 702/19 |
| 2007/0291123 | A1 | 12/2007 | Cole | |
| 2009/0257314 | A1 | 10/2009 | Davis et al. | |
| 2010/0034810 | A1 * | 2/2010 | Heeres | A61K 31/513 514/1.1 |
| 2010/0080086 | A1 | 4/2010 | Wright et al. | |
| 2010/0284249 | A1 | 11/2010 | Steadman | |
| 2011/0169664 | A1 * | 7/2011 | Berger | G01H 3/08 340/943 |
| 2013/0119133 | A1 | 5/2013 | Michael et al. | |
| 2014/0226838 | A1 | 8/2014 | Wingate et al. | |
| 2015/0063575 | A1 * | 3/2015 | Tan | G06F 17/30743 381/56 |
| 2015/0237569 | A1 | 8/2015 | Jalali | |
| 2015/0242180 | A1 * | 8/2015 | Boulanger-Lewandowski | G06N 3/0445 700/94 |
| 2015/0302858 | A1 | 10/2015 | Hearing et al. | |
| 2017/0039413 | A1 * | 2/2017 | Nadler | G06K 9/6201 |

FOREIGN PATENT DOCUMENTS

| | | |
|---|---|---|
| GB | 2234137 | 1/1991 |
| TW | 1020130104170 | 9/2013 |

OTHER PUBLICATIONS

Schmidt et al, Single CChannel source separation using non negative matrix factorization,PhD Thesis 2009.*

Orelia, Audio Signal Processing using Raspberry Pi Example of drones sound signatures recognition, vimeo,2013.*

Case et al, Low cost acoustic array for small UAV Detection and Tracking, IEEE, 2008.*

Ferguson et al., "Application of the short-timie Fourier transform and the Wigner-Ville distribution to the acoustic localization of aircraft", Journal of Acoustical Society of America, 1994, Aug. 1994, vol. 2, pp. 821-527.

Quach et al., "Automatic Target Detection Using a Ground-Based Passive Acoustic Sensor", Defence Science Technology and Organisation, 1999, pp. 187-192.

Lance CPL. Ali Azimi, "Competition offers solutions to detecting UAVs", sUAS News, published Sep. 21, 2012, from http://suasnews.com/2012/19/18816/competition-offers-solutions-to-detecting-uavs/, 5 pages.

"Drone-Detector—Main features", Nov. 2, 2013, excerpt from www.drone-detector.com/en/main-features/, 3 pages.

Aljaafreh et al., "Multi-Target Classification Using Acoustic Signatures in Wireless Sensor Networks: A survey", Signal Processing—An International Journal, Jan. 2010; vol. 4, Issue 4, 26 pages.

Yang et al., "Vehicle Identification using Discrete Spectrums in Wireless Sensor Networks", Journal of Networks, Apr. 2008, vol. 3, No. 4, 13 pages.

Duarte et al., "Vehicle classification in distributed sensor networks", Journal of Parallel and Distributed Computing, 2004, 13 pages.

Smaragdis et al., "Static and Dynamic Source Separation Using Nonnegative Factorizations," IEEE Signal Processing Magazine (May 2014), pp. 66-75.

Mairal et al., Online Learning for Matrix Factorization and Sparse Coding, Journal of Machine Learning Research , vol. 11 (2010) pp. 19-60.

Le Roux, J., et al., "Sparse NMF—half-baked or well done?", Mitsubishi Electric Research Laboratories, http://www.merl.com, TR2015-023 (Mar. 2015), 22 pages.

International Search Report and Written Opinion for related International Application No. PCT/US16/63491; dated Jul. 31, 2017; (12 pages).

* cited by examiner

600

| Audio File No. | Class | Brand | Model | No. Rotors | Flight Characteristic |
|---|---|---|---|---|---|
| 1 | 1 | Brand A | Model 2 | 2 | Hover |
| 2 | 1 | Brand A | Model 2 | 2 | Ascend |
| 3 | 1 | Brand A | Model 2 | 2 | Descent |
| 4 | 1 | Brand A | Model 2 | 2 | Approach |
| 5 | 1 | Brand A | Model 2 | 2 | Retreat |
| 6 | 1 | Brand B | Model XZ | 3 | Hover |
| 7 | 1 | Brand B | Model XZ | 3 | Ascend |
| 8 | 1 | Brand B | Model XZ | 3 | Descent |
| 9 | 1 | Brand B | Model XZ | 3 | Approach |
| 10 | 1 | Brand B | Model XZ | 3 | Retreat |
| 11 | 2 | Brand A | Model 5 | 4 | Hover |
| 12 | 2 | Brand A | Model 5 | 4 | Ascend |
| 13 | 2 | Brand A | Model 5 | 4 | Descent |
| 14 | 2 | Brand A | Model 5 | 4 | Approach |
| 15 | 2 | Brand A | Model 5 | 4 | Retreat |
| 16 | 3 | Brand C | Model AS | 7 | Hover |
| 17 | 3 | Brand C | Model AS | 7 | Ascend |
| 18 | 3 | Brand C | Model AS | 7 | Descent |
| 19 | 3 | Brand C | Model AS | 7 | Approach |
| 20 | 3 | Brand C | Model AS | 7 | Retreat |

FIG. 6

| DATE | TIME | DURATION | LOCATION | CLASS | BRAND | MODEL | USER ID |
|---|---|---|---|---|---|---|---|
| Feb. 6, 2014 | 1:23 P.M. | 2 MIN | ADDRESS XCV | CLASS 2 | BRAND C | MODEL 8Y | USER 007 |
| Feb. 8, 2014 | 11:41 A.M. | 12 MIN | LAT. X, LONG. Y | CLASS 5 | BRAND E | MODEL DD | USER 2312 |
| Feb. 10, 2014 | 9:22 P.M. | 3 MIN | TOWN XYZ | CLASS 1 | BRAND A | MODEL 2 | USER 9909 |
| Feb. 12, 2015 | 7:03 A.M. | 35 MIN | ZIP CODE 01010 | CLASS 2 | BRAND D | MODEL 9F | - |

2000

DRONE DETECTION AND CLASSIFICATION WITH COMPENSATION FOR BACKGROUND CLUTTER SOURCES

The present application claims priority to and the benefit of U.S. Provisional Patent Application Ser. No. 62/259,209, filed on Nov. 24, 2015, the entirety of which is incorporated herein by reference.

BACKGROUND

In August 2016, operational rules for small unmanned aircraft rules took effect in the United States. Created by the Federal Aviation Administration ("FAA"), the new rules specify regulations for the routine commercial use of small unmanned aircraft systems weighing less than 55 pounds (e.g., unmanned aerial vehicles ("UAV") and unmanned aircraft system ("UAS")), otherwise known as drones. The rule's provisions are designed to minimize risks to other aircraft and people/property on the ground. Generally, the new rules require pilots to keep an unmanned aircraft within a visual line of sight. In addition, the rules restrict operations to daylight use and allow twilight use if the drone has anti-collision lights. The new rules also address height and speed restrictions and other operational limits, such as prohibiting flights over unprotected people on the ground who are not directly participating in the drone's operation.

While the new regulations cover commercial use, the regulations do not specifically address hobbyist use. In addition, the new drone rules do not specifically address privacy issues. The rules also do not regulate how drones gather data on people or property. The FAA has indicated a desire to address privacy considerations in the future with input from the public. However, there is nothing in place at the present other than a small compilation of varying state and local rules.

The new commercial rules and increased hobbyist use have lead some to believe that the skies of the United States will soon be filled with millions of commercial-grade and consumer-grade drones. On a global scale, potentially tens-of-millions or billions of drones may soon be airborne. The increased drone use, combined with a void of unified privacy rules in the U.S. and internationally, means that people and property are potentially left vulnerable to unwanted incursions.

The vast majority of drone use is legitimate and non-intrusive, including package delivery, aerial light shows, media reporting, infrastructure inspection, and personal use on private property or public parks. Unfortunately, some individuals or organizations use (or plan to use) drones for illegal and/or nefarious purposes. This use cannot be physically prevented by the new drone rules. In the past year alone, drones have been used to deliver contraband to inmates in prisons, drop radioactive sand on a government official's residence, and operate as a suicide vehicle. In addition, paparazzi and other intrusive individuals have used drones to spy on celebrities and neighbors.

While some areas have been designated as no-fly zones for drones (such as disasters, sporting events, and government facilities), enforcement to prevent drones from entering these zones have become a problem. For instance, drone detection is difficult due to the relatively small size of drones and the fact that they typically travel at relatively low altitudes. In addition, visual and/or acoustic noise from the environment (e.g., background noise), may obscure or reduce the effectiveness of drone detection technologies.

SUMMARY

The present disclosure provides a new and innovative system, method, and apparatus for detecting and classifying drones. The system, method, and apparatus disclosed herein are configured to identify individual background sound components (e.g., automobile traffic, lawn mowers, construction, wind, etc.) and any drone sound components in a recorded sound signal. This configuration isolates background sounds and drone sounds, which enables the system, method, and apparatus to determine if the isolated drone sounds are strong enough or spatially separate enough from the background sounds to enable the determination as to whether a drone is present. The example system, method, and apparatus effectively filter or remove background sound components to enable only drone sounds components to be further analyzed.

To identify sound components, the example system, method, and apparatus determine one or more combinations of drone sound signatures and background sound signatures that most closely approximate a received sound signal. In some examples, the system, method, and apparatus use a non-negative matrix factorization ("NMF") algorithm to determine which combination of sound signatures stored in a library or memory most closely resemble a recorded sound signal. The system, method, and apparatus determine if any of the sound signatures grouped within the determined combination include drone sound signatures. Conditioned upon determining that at least one drone sound signature is within the determined combination, the example system, method, and apparatus in some embodiments are configured to transmit an alert indicative of a drone detection. In other embodiments, the example system, method, and apparatus are configured to activate or operate a beamformer to determine a location of a detected drone.

In some instances, the example system, method, and apparatus may use one or more error thresholds to determine whether the combination of sound signatures is well matched to a received sound signal. In addition, the example system, method, and apparatus may compare, within the determined combination of sound signatures, a magnitude of the drone sound signature(s) to background sound signature(s) and/or one or more thresholds to determine a robustness of the drone sound signature(s). The example system, method, and apparatus may only transmit an alert message or activate a beamformer if the detected drone sound signatures are above the error and signal thresholds to reduce the chances of false-detections.

In an example embodiment, an apparatus configured to detect drones includes a microphone configured to receive a sound signal, a sound card configured to record a digital sound sample of the sound signal, and a memory storing a plurality of drone sound signatures and a plurality of background sound signatures. The example apparatus also includes a processor configured to apply a frequency transformation to the digital sound sample to create a sample time-frequency spectrum and determine a sample power spectral density of the sample time-frequency spectrum. The processor is also configured to perform single channel source separation of the sample power spectral density using a non-negative matrix factorization algorithm to determine which of the plurality of sound signatures in the memory are activated by determining a combination of the drone and background sound signatures stored in the memory that most closely match the sample power spectral density of the digital sound sample and applying a sparsity parameter to cause the non-negative matrix factorization algorithm to select a minimal combination of sound signatures needed to closely match the sample power spectral density. The example processor is further configured to determine if at least one of the plurality of drone sound signatures are activated, and conditioned on the at least one of the plurality of drone sound signatures being activated, at least one of (i) transmit an alert indicative of a drone, and (ii) activate a beamformer to determine a location of a drone associated with the sound signal.

In another example embodiment, a method for detecting drones includes receiving, via an interface, a digital sound sample and partitioning, via a processor, the digital sound sample into non-overlapping segments. The method also includes applying, via the processor, a frequency and power spectral density transformation to each of the non-overlapping segments to produce respective sample vectors. For each of the sample vectors, the method includes determining, via the processor, a combination of drone sound signatures and background sound signatures stored in a memory that most closely match the sample vector. The method further includes determining, via the processor, for the sample vectors, if the drone sound signatures in relation to the background sound signatures that are included within the respective combinations are indicative of a drone. Moreover, the example method includes conditioned on determining the drone sound signatures are indicative of a drone, transmitting an alert message indicative of the drone.

Additional features and advantages of the disclosed system, method, and apparatus are described in, and will be apparent from, the following Detailed Description and the Figures.

BRIEF DESCRIPTION OF THE FIGURES

FIG. 6 shows an example data structure of audio files of drone sound samples stored in associated with drone class, brand, model, number of rotors, and flight characteristic information within the drone detection device of FIG. 3, according to an example embodiment of the present disclosure.

DETAILED DESCRIPTION

Figure 1:
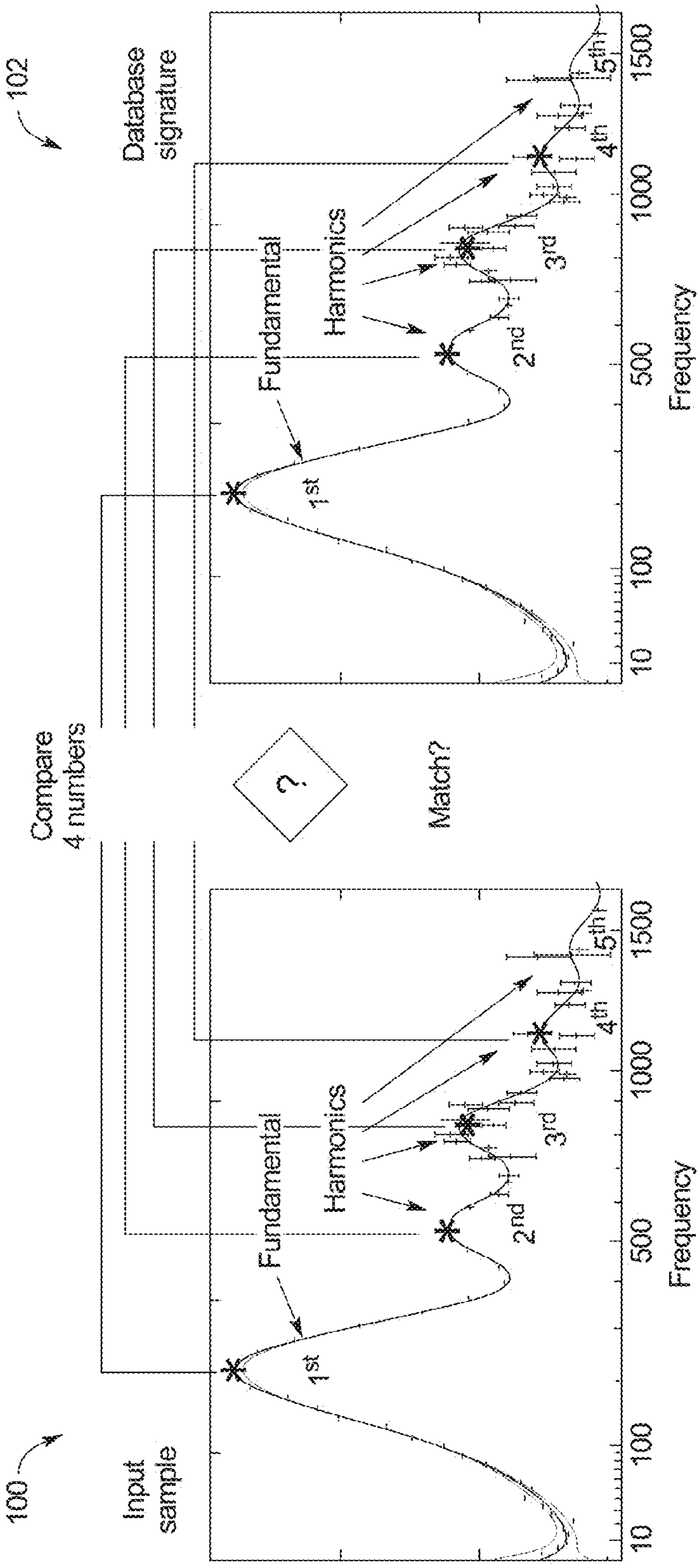
FIG. 1 (PRIOR ART)
FIG. 1 shows an example of acoustic matching using peak harmonic analysis performed by a known sound detector.

The present disclosure relates in general to a method, apparatus, and system for drone detection and classification and, in particular, to a method, apparatus, and system that uses broad spectrum matching to acoustically identify UAVs (e.g., drones) that are within a vicinity or proximity of a detector. In an example, a drone detection device includes one or more microphones configured to sense sound waves (e.g., sound signals or tones) emitted by drones. The drone detection device also includes a sound card that digitizes the sound waves into, for example, a 16-bit digital sound sample. A processor within the drone detection device is configured to perform a Fast Fourier Transform ("FFT") on the sample to obtain a frequency spectrum of the sample, referred to herein as a feature frequency spectrum. The processor of the drone detector uses broad spectrum matching to compare the feature frequency spectrum of the sample to a database of drone sound signatures. It should be appreciated that the drone sound signatures not only include one sound signature for each model, class, or type of drone, hut a sound signature for different flight characteristics of the different models, classes, and/or types of drones.

Conditioned on matching a feature frequency spectrum to a drone sound signature, the processor of the example drone detector is configured to determine a drone class, model, type, etc. associated with the match. Upon detecting a predetermined number of feature frequency spectrums (associated with different digital sound samples) that correspond to the same drone class, model, type, the processor is configured to determine that a drone is indeed within vicinity of the detector device and accordingly provides an alert and/or warning. As discussed in more detail below, an alert may include an email message, a text message, a message transmitted to a management server, a message transmitted to another device (such as a device to interfere with cameras, microphones, communication of the drone, where the law permits), an activation of a light, an activation of an audio warning, and/or an activation of a relay, which causes another component to function. The other component may include a motor to close and/or cover windows or doors.

As the technology for commercial-grade and consumer-grade drones becomes widely available, the use of drones throughout society becomes more of a reality. While some of these uses have significant benefits, such as same day delivery of packages, remote delivery of beverages to thirsty hunters or fisherman, or surveillance to capture accused criminals, other uses can intrude on personal liberties and freedoms. For instance, local governments have expressed an interest in using drones to enforce residential and commercial municipal codes. Media organizations have considered using drones to track or even identify news stories. It is entirely within the realm of possibilities that some individuals may use drones to spy on other individuals, such as neighbors, individuals of high importance or popularity, or targeted individuals. A neighborhood kid using a drone to sneak a peek into a girl's window (or pool) may seem innocent enough. However, drones give more sinister individuals the ability to anonymously and secretly perform surveillance to gather information for blackmail, burglary reconnaissance, social media (public) humiliation, etc.

There are some current known technologies to detect aircraft including detectors that rely on radar and/or sound. At the consumer level, radar is generally ineffective because drones often fly below the threshold detection altitude of radar. Further, many drones are small enough to avoid radar.

Detectors that rely on the detection of sound use peak harmonic matching to identify a drone. The peak harmonics are frequency spikes or peaks within the sound corresponding to fundamental and harmonic frequencies. Planes and fixed-rotor helicopters have relatively consistent tones (e.g., fundamental and harmonic frequencies) based on the configuration of rotors and/or body shape. For example, fixed-rotor helicopters have a main rotor and a tail rotor that rotate at predefined rates. Otherwise, the helicopters would spin out of control. While a helicopter may increase or decrease the speed of the rotors, this change in speed is slight compared to the overall speed of the rotors. Additionally, the range of tones produced from the different speeds of the rotors is extremely limited.

For example, FIG. 1 shows an example of acoustic matching using peak harmonic analysis performed by a known sound detector. To match sound to an aircraft, the known detector compares a recorded sound sample 100 to a database signature 102. The recorded sound sample 100 used to make the comparison is a FFT of a digitized sample of sound waves generated by the aircraft. Likewise, the database signature 102 is a FFT of a digitized sample of sound generated by a known aircraft. A processor compares the peak harmonics from the sound sample 100 to the database signature 102. The processor determines a positive match if the fundamental frequency and harmonic frequencies of the sound sample 100 substantially match the fundamental frequency and harmonic frequencies of the database signature 102. In some instances, relatively small frequency bands may be defined for the fundamental frequency and harmonic frequencies so that an exact frequency match is not required.

Figure 2:
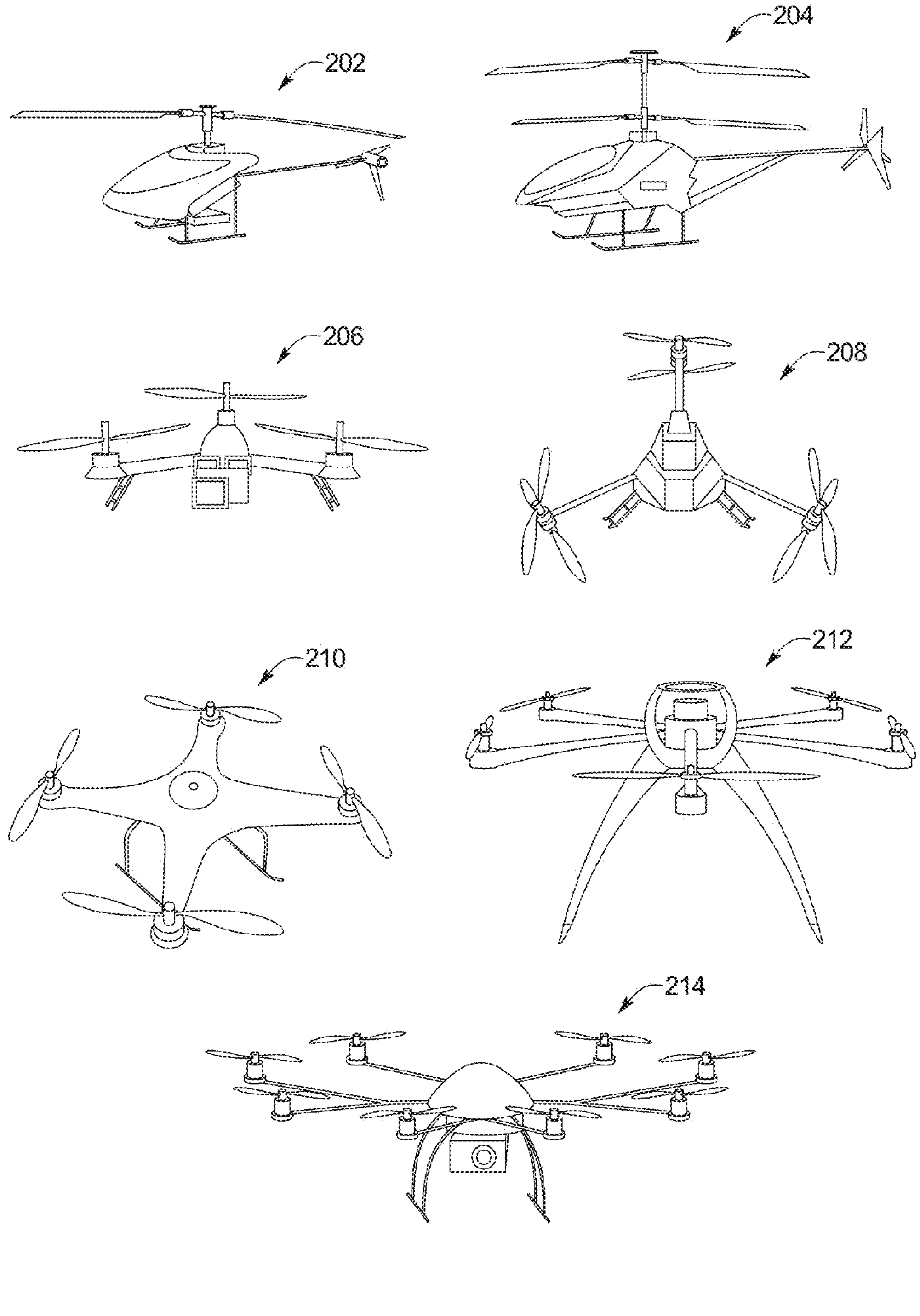
FIG. 2 shows an example of some known drone classes.

While the acoustic matching shown in FIG. 1 works well for aircraft with well-defined tones, acoustic matching cannot be used to detect drones. As an initial matter, drones come in many different shapes, sizes, and rotor configurations. FIG. 2 shows an example of some known drone classes including a single main rotor and tail rotor class 202, a single main rotor and counter-rotating main rotor class 204, a three-rotor class 206, a three-rotor and counter-rotating rotor class 208, a four-rotor class 210, a six-rotor class 212, and an eight rotor class 214. For each of these classes 202-214 (and other not shown drone classes), each rotor may be coupled to a motor that is independently controlled. In other words, there is no operational association between each of the rotors. This independent control enables drones to hover, move forward, move backward, side-to-side, ascend, descent, rotate, invert, etc. This independent control of rotors combined with the different rotor configurations produces an almost infinite number of tones or combinations of tones from the rotors at any one time. Moreover, drones can range in size from a few pounds to hundreds of pounds and have motors and/or rotors that likewise vary in size. The rotors may even be constructed of different materials (e.g., hard plastic, soft plastic, metal, etc.) for different drone models. All of these different drone characteristics produce different tones, thereby making detection and classification using peak harmonics almost impossible. The known peak harmonic matching described in conjunction with FIG. 1 is accordingly realistically incapable of accounting for all of the possible tones or combination of tones generated by drones.

The example system, method, and apparatus described herein overcome the deficiencies of systems that use peak harmonic matching by applying a broad spectrum matching approach. As discussed in more detail below, broad spectrum matching uses the entire frequency spectrum of sound samples to make a detection. Each sound sample is computed into a feature frequency spectrum using a FFT and compared to the entire frequency spectrum of known drone sound signatures. A match is determined by comparing the distance at each frequency between the feature frequency spectrum and the known drone signature (e.g., a Wasserstein metric). Relatively small distances between the feature frequency spectrum and the known signature over significant portions of the frequency spectrum indicate a match.

Previously, computations that calculated differences between distributions of data (such as frequency spectrums) were considered computationally inefficient because of the large number of individual computations needed to be performed for each comparison. A database, for example, may contain tens to hundreds or thousands of drone sound signatures, making fast detection in the past almost impossible using, for example, the Wasserstein metric. Hence, faster techniques, like the just described peak harmonic matching were used. However, with advances in computing power, the Wasserstein metric may be used to compare sound samples to hundreds or thousands of sound signatures in a database to not only detect a drone, but also to classify and identify the drone.

Throughout this disclosure, reference is made to different types of acoustic waveforms or signals. Sound signals are acoustic waves, sounds, or tones that are generated by drones. The disclosed drone detection device converts these sound signals into digital sound samples and processes these samples into one or more feature frequency spectrums, which indicate the frequency characteristics of the acoustic waves generated by drones.

In comparison to digital sound samples, drone sound samples are digital audio files stored within the drone detection device. These audio files represent recordings of drones and are organized by drone class, brand, make/model, and flight characteristics. The drone detection device is configured to process these samples into one or more drone sound signatures (e.g., a frequency spectrum of the drone sound samples). The drone detection device then uses broad spectrum matching to compare the frequency spectrum of the drone sound signatures to the feature frequency spectrums to detect and/or classify drones.

Throughout the following disclosure, reference is also made to drone classes and drone models. A drone class is a group of drones that have similar physical characteristics including size, weight, number of rotors, and configuration of rotors. FIG. 2 shows seven different types of drone classes 202 to 214. However, it should be appreciated that there are many additional drone classes not shown. For instance, the single main rotor and tail rotor class 202 (referred to herein as 'class 1') may include drones that are less than five pounds and one meter in length. A second single main rotor and tail rotor class may include drones with a single main rotor and a tail rotor that are greater than five pounds but less than thirty pounds and have a length between one meter and two meters. A third single main rotor and tail rotor class may include drones with a single main rotor and a tail rotor that are greater than thirty pounds and have a length greater than two meters.

Regarding rotor configuration, different drone classes may correspond to whether a certain number of rotors are horizontal, side-facing vertical, or front-facing vertical. Different drone classes may also correspond to whether a certain number of rotors are positioned toward a front of a drone, toward a rear of a drone, centrally positioned, etc. Further, different drone classes may also correspond to rotor size, average rotor speed, drone body type, etc. It should be appreciated that the number of different drone classes is virtually endless given the vast number of drone designs.

A drone model is a specific drone product manufactured by a specific entity. The drone model can include, for example, a make, a part number, a brand name, a product name, a stock keeping unit, etc. It should be appreciated that different entities may produce different drone models for the same drone class. For example, entity A and entity B may both produce drones that are included within the three-rotor class 206. While the material of the rotors, placement of rotors, and rotor size may vary between the models, there is enough similarity to determine the drones are part of the same class. Such a classification system provides for organization of drone sound signatures, enables detection and reporting on drone class types, and enables the drone detection device to differentiate between welcome and unwelcome drones.

Throughout the following disclosure, reference is also made to drone flight characteristics. As mentioned, the configuration of rotors enables drones to execute aerial maneuvers atypical for many aircraft. Similar to common helicopters, some of the flight characteristics include ascending, descending, rotating, hovering, sideways translating, forward movement, and backwards movement. However, drones may also execute flight characteristics that include inverting, temporary free falling, launching, and sideways-inverting. As discussed in more detail below, the example drone detection device not only includes a sound signature for each different type of drone class/drone model but also for each flight characteristic. Such a library of drone sound signatures enables the drone detection device to detect and classify drones regardless of the different types of tones emitted resulting from different flight maneuvers.

Figure 3:
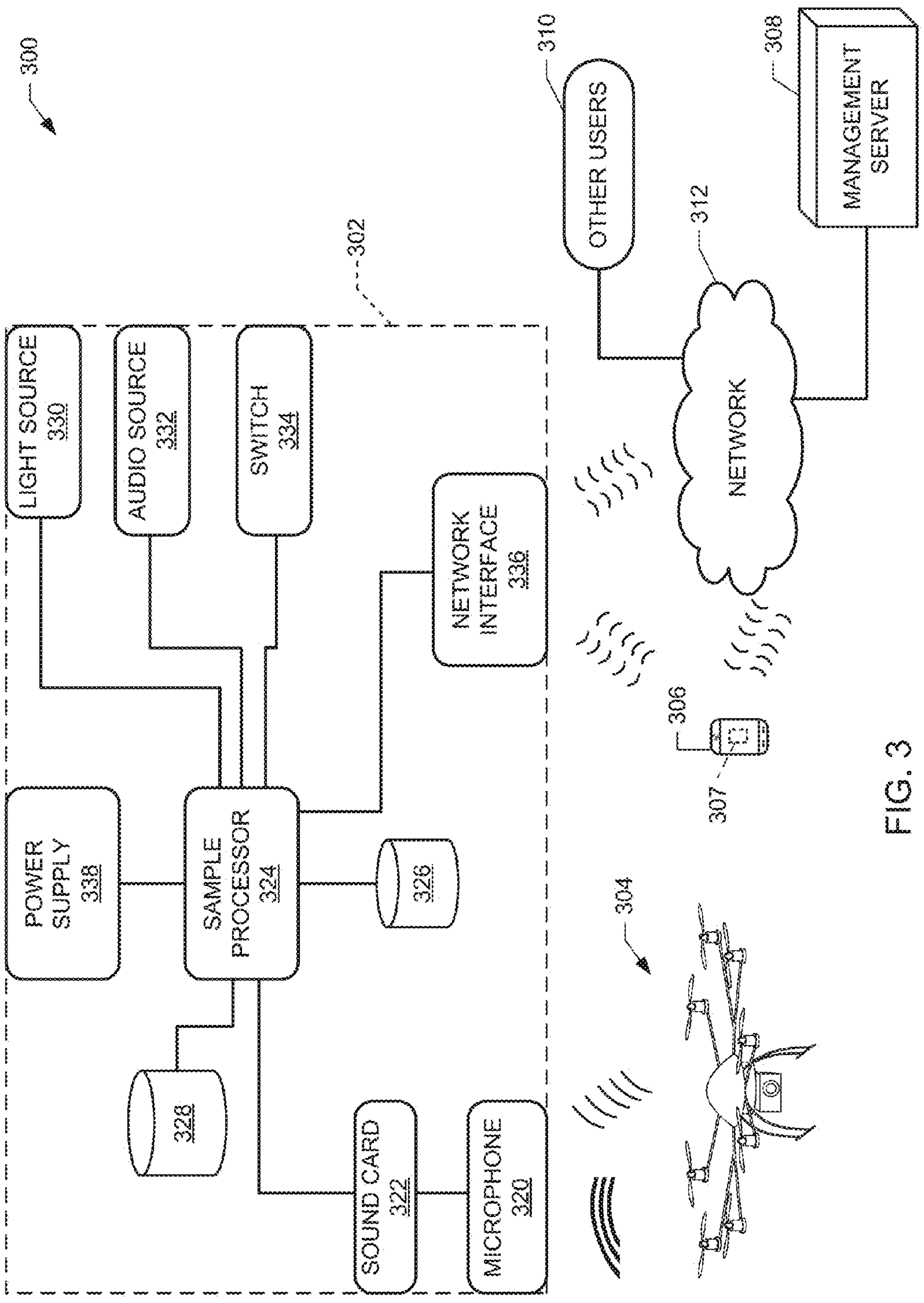
FIG. 3 shows an example drone detection environment including a sample processor and a management server, according to an example embodiment of the present disclosure.

FIG. 3 shows an example drone detection environment 300 according to an example embodiment of the present disclosure. The drone detection environment 300 includes a drone detection device 302 that is configured to detect and classify drones 304. The drone detection environment 300 also includes a user device 306 that is configured to receive alerts of detected and/or classified drones. The user device 306 may include an application 307 that is configured to graphically and/or audibly provide alerts received from the drone detection device 302 and/or configured to program or set parameters for the drone detection device 302. The drone detection environment 300 also includes a management server 308 that is configured to manage and distribute drone sound signatures (or drone sound samples), manage and transmit drone detections, and/or host a platform for a community of users 310 to report and view drone detections. The management server 308 is communicatively coupled to the drone detection device 302, the user device 306, and/or the community of users 310 via network 312 (e.g., the Internet).

Drone Detection Device

The example drone detection device 302 of FIG. 3 is configured to sense, detect, and classify drones. The example drone detection device 302 is also configured to transmit an alert conditioned upon detecting a drone. The drone detection device 302 may include a self-contained apparatus that may be positioned at any location on a user's property including within a residence, within a building, or outside. The drone detection device 302 may include an exterior casing that is constructed from metal, hard plastic, soft plastic and/or a combination thereof. In some instances, the drone detection device 302 may be water-tight to enable deployment outdoors.

While FIG. 3 shows only one drone detection device 302, it should be appreciated that a user may use more than one drone detection device to provide sufficient drone detection and classification coverage. In some embodiments, each drone detection device is assigned a unique identifier (e.g., a media access control ("MAC") address) at the time of manufacture to enable a user to determine which drone detection device 302 has detected a drone. In one embodiment, a user may program or otherwise enter a codename (or nickname) for each drone detection device 302. The drone detection device 302 then includes the codename within any detection alert transmitted to the user device 306. The user may use the user device 306 to access each drone detection device 302 (using the identifier, for example) to program the codename. Alternatively, a user may connect the user device 306 (or another computer) directly to the drone detection device 302 using, for example a universal serial bus ("USB") connection to program the codename.

Conditioned on detecting a drone, the user device 306 may display an alert to the user including the programmed codename of the drone detection device 302, a time of the detection, a determined drone class, a drone model, a drone brand, a detected flight characteristic, a determined distance from the detector 302, and/or any other information that may be determined by the drone detection device 302 and/or relevant to the user. In instances where more than one drone detection device 302 is deployed, the user device 306 (via the application 307) may be configured to show which device 302 made the detection within a graphical representation. For instance, a user may program into the user device 306 a geographic location of each drone detection device 302. The geographic location may include latitude and longitudinal coordinates, an address, global positioning signal ("GPS") coordinates, property coordinates, and/or housing coordinates. The user device 306, via the application 307, associates the geographic location with the appropriate drone detection device 302 for the selected graphical representation. For relatively large properties, the graphical representation may include a map. For relatively small areas and/or buildings, the graphical representation may include a blueprint or other drawing of the area. Such a feature enables a user to view an estimated location of the drone 304 as determined by the drone detection device 302.

In addition to programming a codename, a user may use the application 307 on the user device 306 to program detection thresholds, sensitivity of microphones, pair one or more external microphones with the drone detection device 302, specify alert types, etc. The user device 306 may also be used to specify network settings of the drone detection device 302. These network settings enable the drone detection device 302 to connect to, for example, the management server 308 and/or the network 312. The network settings may also enable the drone detection device 302 to wirelessly communicate with the user device 306 via a local area network ("LAN") and/or wireless LAN ("WLAN").

I. Microphone and Sound Card

The example drone detection device 302 includes a microphone 320 and a sound card 322 to sense and digitize sound signals. The microphone 320 may include, for example, a 3.5 millimeter hands-free computer clip-on mini lapel microphone. In other embodiments, the microphone 320 may be configured to have a sensitivity within a frequency band associated with drone tones (e.g., 1000 hertz to 15000 hertz). The microphone 320 may also be configured to have an acoustic sensitivity to detect drones within 50 feet, 100 feet, 500 feet, half of a mile, a mile, etc. based on preferences of a manufacturer and/or user. Additionally or alternatively, the microphone 320 may be configured to detect drone tones within ultrasonic frequency bands.

In some embodiments, the drone detection device 302 may include more than one microphone 320. In some instances, the microphones 320 may both be positioned with the same housing but facing different directions so as to increase the detection range of the device 302. Additionally, the drone detection device 302 may include multiple microphones 320 configured to be sensitive to different frequency bands. Such a configuration enables the drone detection device 302 to be especially precise for drones that emit a tone that standard microphones may have difficulty sensing.

In some embodiments, the drone detection device 302 is configured to support external microphones 320. For example, the microphone 320 may be connected to a cord long enough that enables the microphone 320 to be placed at a window, outside, etc., while being able to leave the drone detection device 302 inside. Alternative to using a cord, the microphone 320 may be configured to have wireless capabilities to send sensed signals to the drone detection device 302. The wireless microphone 320 may use a Bluetooth®, a Zigbee®, and/or any other wireless communication protocol to communicate with the drone detection device 302. It should be appreciated that the use of wireless microphones 320 enables a user to associate a plurality of microphones with the single drone detection device 302. For instance, a user may place microphones 320 outside or at different windows of a building, at specific points on a property, etc.

The example sound card 322 is configured to record and digitize a sound signal sensed by the microphone 320. The sound card 322 may include a 7.1 channel USB external sound card, for example. Other sound cards may also be used that are specifically configured for processing sound signals with frequencies common among drones.

The sound card 322 of FIG. 3 is configured to record a digital sample of the sound signal transmitted by the microphone 320. The length of time for each sample recording may be predetermined by a designer, a manufacturer, or a user. In some embodiments, the sound card 322 is configured to record a one second long audio clip at 22,050 samples per second with 16 bit quantization per sample. In this embodiment, the sound card 322 is configured to record consecutive clips or samples such that the each sample is processed separately and individually compared to drone sound signatures to detect and/or classify drones. The drone detection device 302 may be configured to register a drone detection only if a predetermined number (e.g., 5) of consecutive clips or samples correspond to the same drone class, drone model, drone type, etc. It should be appreciated that the record time may be shorter or longer in addition to the number of samples recorded during the record time.

The sound card 322 of FIG. 3 is also configured to digitize the sound sample into a 16-bit digital signal (e.g., 16 bit quantization per sample). In other embodiments, the sound card 322 may be configured to digitize the sound sample into an 8-bit digital sound sample, a 32-bit digital sample, a 64-bit digital sample, a 128 bit digital sample, etc. It should be appreciated that large bit samples provide more tonal resolution and may enable more precise classification and/or determination of flight characteristics among different drone type. The use of larger bit digital signals may be based on processing capability of the drone detection system 302.

In some embodiments, the single sound card 322 may process sound signals from multiple microphones 320. For example, the sound card 322 may be configured to receive sound signals from two microphones 320 either both within a housing of the device 302, both outside of the device 302, or a combination thereof. The sound card 322 may be configured to process sound signals as they are received from the multiple microphones 320 and transmit the digitized signal. In other embodiments, the drone detection device 302 may include a sound card 322 for each microphone 320. In these examples, the device 302 may include a predetermined number of sound cards 322 to enable support for a corresponding number of microphones 320.

In yet other embodiments, the sound card 322 may be integrated with the microphone 320. For instance, a wireless microphone 320 may include the sound card 322 such that the digitized sound sample is wirelessly transmitted to the drone detection device 302. In these embodiments, the drone detection device 302 may include a wireless transceiver to receive and decode the wireless digitized sound samples. It should be appreciated that remotely located microphones 320 that do not include a sound card may transmit a wireless signal that includes information corresponding to received sound signals. The sound card 322 within the drone detection system 302 then digitizes the received wireless signal.

II. Sample Processor and Databases

The example drone detection device 302 of FIG. 3 also includes a sample processor 324 configured to convert a digitized sound sample into a feature frequency spectrum and compare the feature frequency spectrum to drone sound signatures to detect and/or classify drones. The sample processor 302 may operate on a Linux operating system (e.g., Rasbian) and use Python and PHP scripting and programming languages. In other embodiments, the sample processor 324 may operate using other types of operating systems and/or programming languages.

The drone detection device 302 also includes a drone database 326 that is configured to store drone sound signatures and a parameter database 328 configured to store parameters for drone detection and/or classification. The databases 326 and 328 may comprise any type of computer-readable medium, including RAM, ROM, flash memory, magnetic or optical disks, optical memory, or other storage medium. In addition to the databases 326 and 328, the drone detection device 302 may also include a memory to store instructions for processing digital signals into a feature frequency spectrum, comparing feature frequency spectrums to drone sound signatures, determining whether to transmit an alert, etc. The drone detection device 302 may also include a memory to store previous drone detections and/or classifications.

Figure 4:
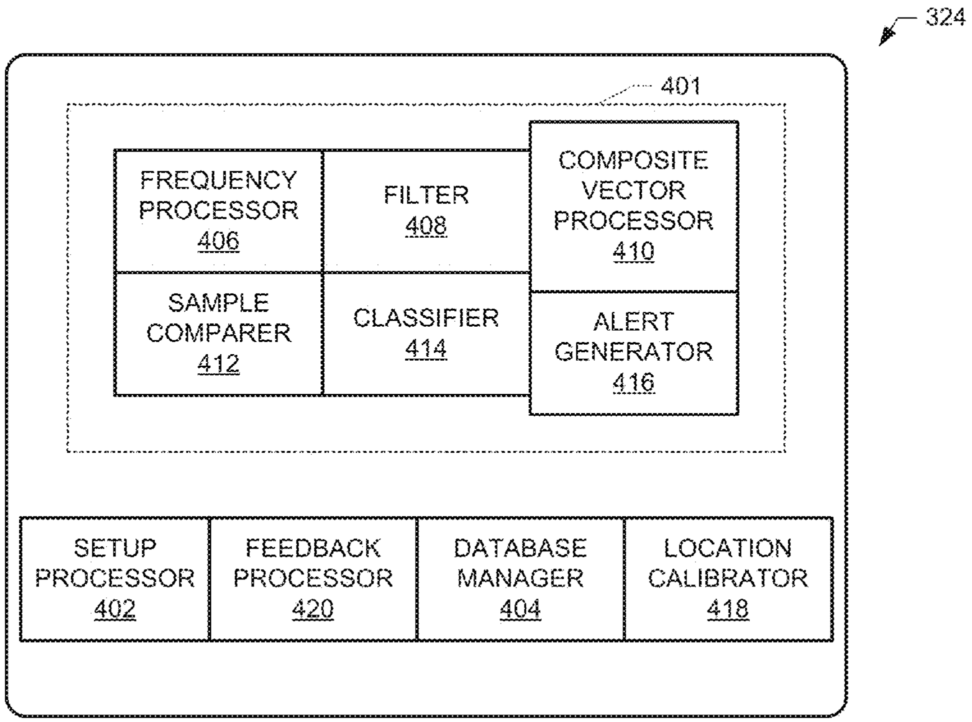
FIG. 4 shows a diagram of the sample processor of FIG. 3, according to an example embodiment of the present disclosure.

As discussed in more detail in conjunction with FIG. 4, the example sample processor 324 of FIG. 3 is configured to convert a digital sound signal into a feature frequency spectrum. The conversion includes, for example, partitioning each recorded digitalized sound sample into equal non-overlapping segments and determining a vector of frequency amplitude for each segment by calculating an absolute value of an FFT for that segment. The conversion also includes applying one or more sliding median filters to smooth the frequency amplitude vectors corresponding to the segments. The conversion further includes forming a composite frequency vector by averaging the frequency amplitude vectors of the segments. The example processor 324 may also normalize the composite frequency vector to have a unit sum. The normalized composite frequency vector is a feature vector or feature frequency spectrum used by the sample processor 324 to compare to drone sound signatures.

In some embodiments, the drone database 326 includes one or more drone sound samples stored in, for example, a Waveform Audio File Format ("WAV"), an AC-3 format, an advanced audio coding ("AAC") format, an MP3 format, etc. The drone database 326 may also include a data structure that cross-references each drone sound sample to a drone class, a drone model, a drone type, a flight characteristic, etc. In these embodiments, the sample processor 324 is configured to determine a normalized composite frequency vector (e.g., a drone sound signature) for each drone sound sample for comparison to the normalized composite frequency vector (i.e., the feature frequency spectrum) corresponding to the sound signal sensed by the microphone 320. The process for determining the normalized composite frequency vector for each drone sound sample is similar to the process described above for converting the digital sound sample from the sound card 322. The example sample processor 324 may be configured to perform this conversion on the drone sound samples upon startup, initialization, etc. when drones would not typically be present. In some instances, the sample processor 324 may store the normalized composite frequency vector for each drone sound sample to the database 326 so that the conversion is performed only once. Alternatively, the sample processor 324 may be configured to store the normalized composite frequency vector for each drone sound sample to a volatile memory such that the conversion process is repeated every time the drone detection device 302 restarts or loses power.

In addition to converting digital sound samples, the example sample processor 324 of FIG. 3 is configured to detect and classify drones. To make a detection, the sample processor 324 determines, for example, a Wasserstein metric for each drone sound signature compared to a feature vector or feature frequency spectrum recorded by the sound card 322. In other examples, the sample processor 324 may use a Euclidean distance calculation and/or an earth mover's distance calculation to make the comparison. As discussed herein, the sample processor 324 makes the comparison over the entire frequency spectrum (e.g., performs broad spectrum matching), not just at specified harmonics.

After determining, for example, a Wasserstein metric for each drone sound signature, the sample processor 324 is configured to determine the metric with the lowest value. The sample processor 324 may also determine a specified number of drone sound signatures that are closest to the drone sound signature with the lowest Wasserstein metric using, for example, a k-nearest neighbor ("k-NN") algorithm. Conditioned upon the selected drone signatures being from the same drone class, drone model, drone type, etc., the sample processor 324 is configured to determine that the comparison corresponds to a 'hit'. A detection is made if a certain number of digitalized sound samples are classified as having a 'hit' with the same drone class, drone type, drone model, etc.

The sample processor 324 of FIG. 3 is configured to classify a drone after making a detection. To make a classification, the sample processor 324 determines which drone sound signatures correspond to the 'hits'. The sample processor 324 then accesses the drone database 326 and reads the data structure that references each drone sound signature to drone class, drone model, flight characteristic, etc. After accessing the drone database 326, the sample processor 324 locally stores the determined drone class, drone model, flight characteristic, etc. for inclusion within an alert.

In some instances, the sample processor 324 may also determine a distance and/or heading, of a drone after making a detection. For instance, after making a detection, the sample processor 324 may access the original digitized sound sample and determine a distance based on voltage amplitudes. Greater amplitudes correspond to closer drones. The sample processor 324 may be calibrated by a user to determine a distance based on types of microphones used, features of a detection environment, etc. The sample processor 324 may also use Doppler processing on consecutive digitalized samples to determine, for example, whether a drone is approaching or leaving and/or a heading of the drone.

The example sample processor 324 is configured to transmit different types of alerts based on, for example, preference of a user, manufacturer, etc. Depending on the type of alert, the sample processor 324 may create a message that includes a time of detection, a determined drone class (or model, brand, type, etc.), a determined flight characteristic, and/or an identifier of the drone detection device 302. The sample processor 324 formats the message based on the type of alert specified by the user. For example, the sample processor 324 may configure a message for Simple Main Transfer Protocol ("SMTP"), Short Message Service ("SMS"), File Transfer Protocol ("FTP"), Hyper Text Transfer Protocol ("HTTP"), Secure Shell Transport Layer Protocol ("SSH"), etc. After formatting the appropriate message, the example sample processor 324 transmits the message.

In some embodiments, the sample processor 324 may be configured to queue detections until specified times. In these embodiments, the sample processor 324 transmits the detections at the specified time. Additionally or alternatively, the sample processor 324 may be configured to provide different contexts of detections and/or classifications. For example, text messages may be transmitted to the user device 306 as soon as possible after a detection. However, FTP-based messages are transmitted to the management server 308 every few hours, days, weeks, etc. In this example, the text message may include specific locations on a property where a drone was detected in addition to drone class. In contrast, the FTP-based message may include day/time of detection, flight characteristics, a duration of the detection, and a drone model/brand.

As mentioned, the description in conjunction with FIG. 4 discloses further detail and features of the sample processor 324. Some of these additional features includes determining a detection duration, determining a course or flight pattern of a detected drone, determining if the drone is a friend or foe, applying localized background compensation to the conversion of digitized sound samples and/or drone sound samples, and applying user feedback regarding missed detections, false detections, missed classifications, etc. to improve detection and/or classification. Further, FIG. 4 discloses example parameters and values for converting sound samples and making detections/classifications.

III. Physical Alerts

In addition to transmitting alerts, the example sample processor 324 of FIG. 3 is configured to activate one or more physical devices to provide an alert. The devices may include a light source 330, an audio source 332, and a switch 334 (e.g., a relay). It should be appreciated that in other examples, the drone detection device 302 may include fewer or additional devices.

The example light source 330 includes a LED or other similar light emitting device. The light source 330 may be integrated within a housing of the drone detection device 302. Alternatively, the light source 330 may be remotely located from the drone detection device 302 at a position selected by a user. For example, a user may place the light source 330 on a nightstand. In these instances, the light source 330 is configured to wirelessly receive messages from the sample processor 324 to activate/deactivate.

The example audio source 332 includes a speaker or other audio output device configured to emit a warning after receiving a message (or signal) from the sample processor 324. In some instances, the sample processor 324 may control the tone or otherwise provide an audio signal for the audio source 332. For example, the sample processor 324 may enable a user to select a tone type or audio output when a drone is detected. The sample processor 324 may also enable a user to select different tones or audio outputs for different classes of drone and/or for friend or foe drones. Similar to the light source 330, the audio source 332 may be remotely located from the drone detection device 302 and wirelessly receive audio signals.

The example switch 334 is configured to close or otherwise activate upon a signal provided by the sample processor 324. The switch 334 may be used in conjunction with other components or devices provided by a user to enable the drone detection device 302 to control physical countermeasures in response to detecting a drone. For example, the switch 334 may provide power when in a closed or actuated position. A user may connect a power cord, for example, to the switch 334 so that a device connected to the power cord becomes powered when the switch 334 is closed in response to a drone detection. The switch 334 may also be connected to one or more motors that control, for example, opening/closing of window shades, blinds, covers, etc. For example, after detecting a drone, the sample processor 324 causes the switch 334 to actuate, which closes the shades on specified windows. After the drone has moved on to annoy other people and out of detection range of the device 302, the sample processor 324 opens the switch 334, which causes the shades on the specified windows to open. It should be appreciated that the number and types of devices that may be connected to the switch 334 is virtually unlimited. For instance, a user may connect a signal jamming device or an anti-drone device (where allowed by law) to the switch 334.

Similar to the light source 330 and the audio source 332, the switch 334 may be remote from the drone detection device 302. In these instances, the switch 334 (similar to the light source 330 and the audio source 332) is separately powered and wirelessly receives activation/deactivation signals from the sample processor 324. Such a configuration enables a user to place one or more switches 334 adjacent to components or devices while having the drone detection device 302 located in a more central or remote location.

IV. Network Interface

As mentioned, the sample processor 324 is configured to receive user input and transmit alerts and other data associated with alerts. The drone detection device 302 includes a network interface 336 to facilitate communication between the sample processor 324 and devices external to the device 302. The network interface 336 may include any wired and/or wireless interface to connect to, for example, the network 312 and/or the user device 306. For instance, the network interface 336 may include an Ethernet interface to enable the drone detection device 302 to connect to a router and/or network gateway. The network interface 336 may also include a WLAN interface to enable the drone detection device 302 to communicatively couple to a wireless router and/or a wireless gateway. The network interface 336 may further include a cellular interface to enable the drone detection device 302 to communicatively couple to a 4G LTE cellular network, for example. The network interface 336 may also include functionality to enable powerline communications. The network interface 336 may moreover include a Bluetooth® interface (and/or a USB interface, a Near Field Communication ("NFC") interface, etc.) to enable, for example, the user device 306 to communicate directly with the drone detection device 302 without the use if the network 312.

V. Power Supply

The example drone detection device 302 also includes a power supply 338 to provide power to, for example, the microphone 320, the sound card 322, the sample processor 324, the databases 326 and 328, the light source 330, the audio source 332, and/or the network interface 336. The power supply 338 may include a battery, and more specifically, a lithium ion battery. The power supply 338 may also include a voltage transformer to convert an AC signal from, for example, a wall outlet, into a regulated DC voltage. In some embodiments, the power supply 338 may include both a transformer and a battery, which is used when power from a wall outlet is not available. In further embodiments, the power supply 338 may include one or more solar panels, thereby enabling the drone detection device 302 to operate in remote locations.

Sample Processor Embodiment

FIG. 4 shows a diagram of the sample processor 324 of FIG. 3, according to an example embodiment of the present disclosure. The sample processor 324 includes components for detecting/classifying drones and transmitting alerts. In addition, the sample processor 324 includes components for provision, feedback, and database management. It should be appreciated that each of the components may be embodied within machine-readable instructions stored in a memory that are accessible by a processor (e.g., the sample processor). In other embodiments, some or all of the components may be implemented in hardware, such as an application specific integrated circuit ("ASIC"). Further, the sample processor 324 may include fewer components additional components, or some of the discussed components maybe combined or rearranged.

As discussed in more detail below, the sample processor 324 includes a component 401 that is configured to convert digital signals into a frequency spectrum. This includes digital sound samples sensed from a drone 304 within proximity of the drone detection device 302 and drone sound samples stored as audio files within the drone database 326. The component 401 is configured to convert digital sound samples into a feature frequency spectrum and convert the drone sound samples into drone sound signatures (e.g., a frequency spectrum of the drone sound samples). The component 401 uses broad spectrum matching to compare the feature frequency spectrum to the drone sound signatures to accordingly detect and/or classify drones.

I. Setup Processor

The example sample processor 324 of FIG. 4 includes a setup processor 402 to detect and classify drones. The example setup processor 402 is configured to prompt or otherwise receive user and/or manufacturer parameters and apply those parameters for the detection, classification and alerting of drones. The setup processor 402 may, for example, provide a user interface or web form that enables a user to specify parameters. Alternatively, a user may use the application 307 to enter parameters, which are then transmitted to the setup processor 402 for configuration.

Figure 5:
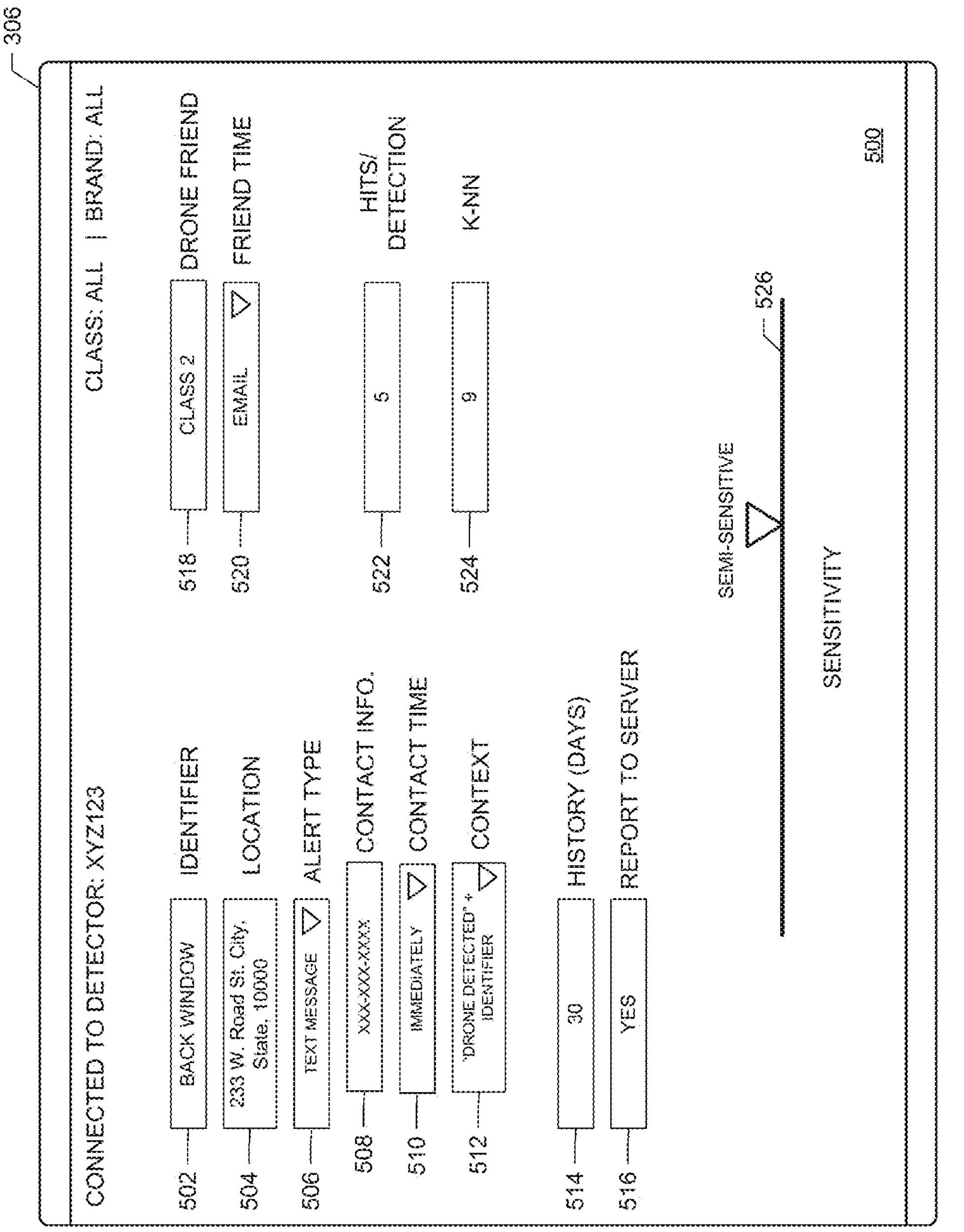
FIG. 5 shows an example user interface that enables a user to specify configuration parameters for the sample processor of FIGS. 3 and 4, according to an example embodiment of the present disclosure.

FIG. 5 shows an example user interface 500 that enables a user to specify configuration parameters for the sample processor 324 and/or more generally, the drone detection device 302. The user interface 500 may be provided by the setup processor 402 after the user device 306 directly connects to the drone detection device 302 via the network interface 336. The user interface 500 may also be provided by the application 307. Additionally or alternatively, the user interface 500 may be provided by the management server 308, which then transmits the entered parameters to the drone detection device 302 via the network 312. In these instances, the user interface 500 may also include a field for a network address and/or a MAC address of the drone detection device 302.

In the illustrated embodiment of FIG. 5, the user interface 500 includes an identifier field 502, which enables a user to specify a nickname or other identifier to organize or otherwise identify the drone detection device 302. The user interface 500 also includes a location field 504, which enables a user to specify a geographic location of the drone detection device 302. The geographic location may include an address, latitudinal and longitudinal coordinates, GPS coordinates, real estate coordinates, building or home coordinates, etc. As discussed, the location information enables the detection of a drone to be resolved to a geographic location.

The example user interface 500 also enables a user to specify alert types within field 506. A user may select one or more alert types, which causes the user interface 500 to display the appropriate contact fields 508, 510, and 512. For instance, selection of an email contact type causes an email-based field 510 to be displayed. In another example, selection of an audio alert type within the field 506 causes a field to be displayed that enables a user to select a tone, song (e.g., "Danger Zone" by Kenny Loggins), or other audio indicator. The user interface 500 may also include a feature that enables a user to link or otherwise associate a remote light source 330, audio source 332, switch 334, and/or microphone 320 with the drone detection device 302 (e.g., initiate a Bluetooth® connection procedure).

The example content field 512 enables a user to specify a context in which an alert is to be provided. In this embodiment, a user has selected to receive a text message with the text of "drone detected" and the identifier specified in the field 502. In other embodiments, a user may select a map context, which causes the sample processor 324 to use the geographic location in the field 504 within a graphical representation showing a location of the detection. In some instances, the sample processor 324 may include the geographic location within the alert with a flag or other message instructing the application 307 to display the location within a graphic representation, such as a map.

Example field 514 of FIG. 5 enables a user to specify how many days drone detections are to be stored until being deleted. Example field 516 enables a user to specify whether detections are to be reported to the management server 308. The context of detection information transmitted to the server 308 may be specified by the server 308 and/or the user. For instance, a user may request that the geographic location is not permitted to be sent.

The example user interface 500 also may include fields that enable a user to specify friend versus foe drones. For instance, a user may wish to not be alerted when a drone from Amazon® delivers a package. Alternatively, a user may wish to receive an alert (or a different alert) for only friendly drones as a way to receive a notice regarding the delivery of a package. The user accordingly specifies a class of the Amazon® drone within field 518 and a notice of the friend drone within field 520. Alternative to specifying a class, a user may provide a drone model and/or other information that identifies a drone.

The example notice field 520 specifies when the friendly drone is expected. For example, a detection of a class 2 drone outside of the specified time may be regarded as a foe drone. A user may enter a time, a date, or an information source within the field 520. In this embodiment, a user provides an email address or email account, which the sample processor 324 may access to view emails regarding delivery of packages and accordingly set the friend time period to the delivery time/date. In an alternative embodiment, the application 307 may access the email account or a user may have specific emails forwarded to the application 307 and/or management server 308, which then transmits the friend date/time to the drone detection device 302 via the network interface 336.

The example user interface 500 also may include fields that specify how the detection and classification algorithm operates. A number of hits per detection field 522 enables a user to specify a number of consecutive 'hits' of samples are needed before a detection is determined. A k-NN field 524 enables a user to specify how many next lowest drone sound signatures are used when determining whether to register a 'hit'. A lower numerical value may increase the chances of detecting a drone but may reduce the accuracy of the classification. A sensitivity field 526 enables a user to select (via a scroll bar in this example) a volume threshold, which specifies a threshold that sound signals must exceed before processing into a feature frequency spectrum is permitted.

After receiving a user's selection of the parameters within the user interface 500, the example setup processor 402 of FIG. 4 is configured to store the parameters to the parameter database 328. The sample processor 324 accesses the parameters to, for example, populate variable values for drone detection and/or classification algorithms. The sample processor 324 also accesses the parameters to determine how alerts are to be transmitted.

II. Database Manager

The example sample processor 324 of FIGS. 3 and 4 is configured to use a database manager 404 to access the drone database 326 for drone sound samples and/or drone sound signatures. Drone sound samples are acoustic samples of drones flying under a variety of conditions (e.g., flight characteristics). The acoustic samples may be stored as a WAV file, an AC-3 file, an AAC file, an MP3 file, or any other audio file. Each recording is labeled or otherwise associated with a make, model, class, brand, etc. of the drone that generated the acoustic sample. In some instances, the make, model, class, etc. may be stored as metadata of the audio file.

FIG. 6 shows an example data structure 600 of audio files of drone sound signatures stored in association with drone class, brand, model, number of rotors, and flight characteristic information. It should be appreciated that in other embodiments, the data structure 600 may include fewer or additional fields. Moreover, while the data structure 600 is shown as a flat file, in other embodiments the data structure 600 may be hierarchal with at a highest level corresponding to drone classes, a second level corresponding to drone makes/models, and a lowest level corresponding to flight characteristics.

As mentioned, each audio file includes a recording of a drone. The recording may have a duration of one second, two seconds, five seconds, etc. The duration should be long enough to at least match the duration of a recording performed by the sound card 322. The sample processor 324 may be configured to compare multiple different separate portions of the same drone sound sample to recorded sound samples to make a detection. For instance, a drone sound sample having a ten second duration may be partitioned into ten consecutive samples and individually compared to the sound signal detected by the microphone 320. Such a comparison provides more accurate detections because a tone of a drone may change even during the recording of a relatively short sample. Additionally, comparisons using the different portions from the same drone sound sample potentially account for any acoustic deviations between individual drones of the same class, brand, model, etc.

In some embodiments the drone sound sample may be partitioned into separate portions based on different flight characteristics associated with different parts of the sample. For instance, different flight characteristics may be time-stamped or otherwise marked to a timeline (e.g., within metadata) of a drone sound sample. An individual making the recording may note the flight characteristics at the specific times. The database manager 404 and/or the management server 308 may use the markings of the flight characteristic to break the recording into separate drone sound samples and/or select different portions of a single drone sound sample.

The recording may be made by a manufacturer and stored to the data structure 600 at a time of manufacture. Recordings may also be made by a manufacturer or third-party and stored to the management server 308, which periodically transmits the recordings to the database manager 404 for storage in the drone database 326. In this manner, the drone detection device 302 is capable of receiving drone sound samples as new drones are released to the market. This configuration also facilitates a crowd-sharing component, where the other users 310 may contribute recordings of drone sound samples, thereby increasing the number of available drone sound samples available to make a detection. These other users 310 may record the drone sound samples with their own drone detection devices 302 (or other suitable recording devices such as a smartphone), enter the drone information via the application 307 (or an interface of the management server 308) and upload the drone sound samples.

The example database manager 404 is configured to manage the storage and organization of newly received drone sound samples. In some instances, the data manager 404 may store multiple drone sound samples for the same class, brand, flight characteristic. Alternatively, the database manager 404 may only retain a most recent drone sound sample. The database manager 404 may also remove outdated or otherwise incorrect drone sound samples per direction from, for example, the management server 308.

In addition to managing the storage of drone sound samples, the database manager 404 may also be configured to manage the storage of drone sound signatures. As mentioned, a drone sound signature is a frequency spectrum of a drone sound sample after FFT processing, filtering, and frequency vector determination. The database manager 404 may store drone sound signatures after conversion at initialization of the drone detection device 302 so that the conversion does not need to be repeated. The database manager 404 may also determine newly received drone sound samples and cause only these newly received signals to be processed into drone sound signatures.

III. Frequency Processor

Figure 7:
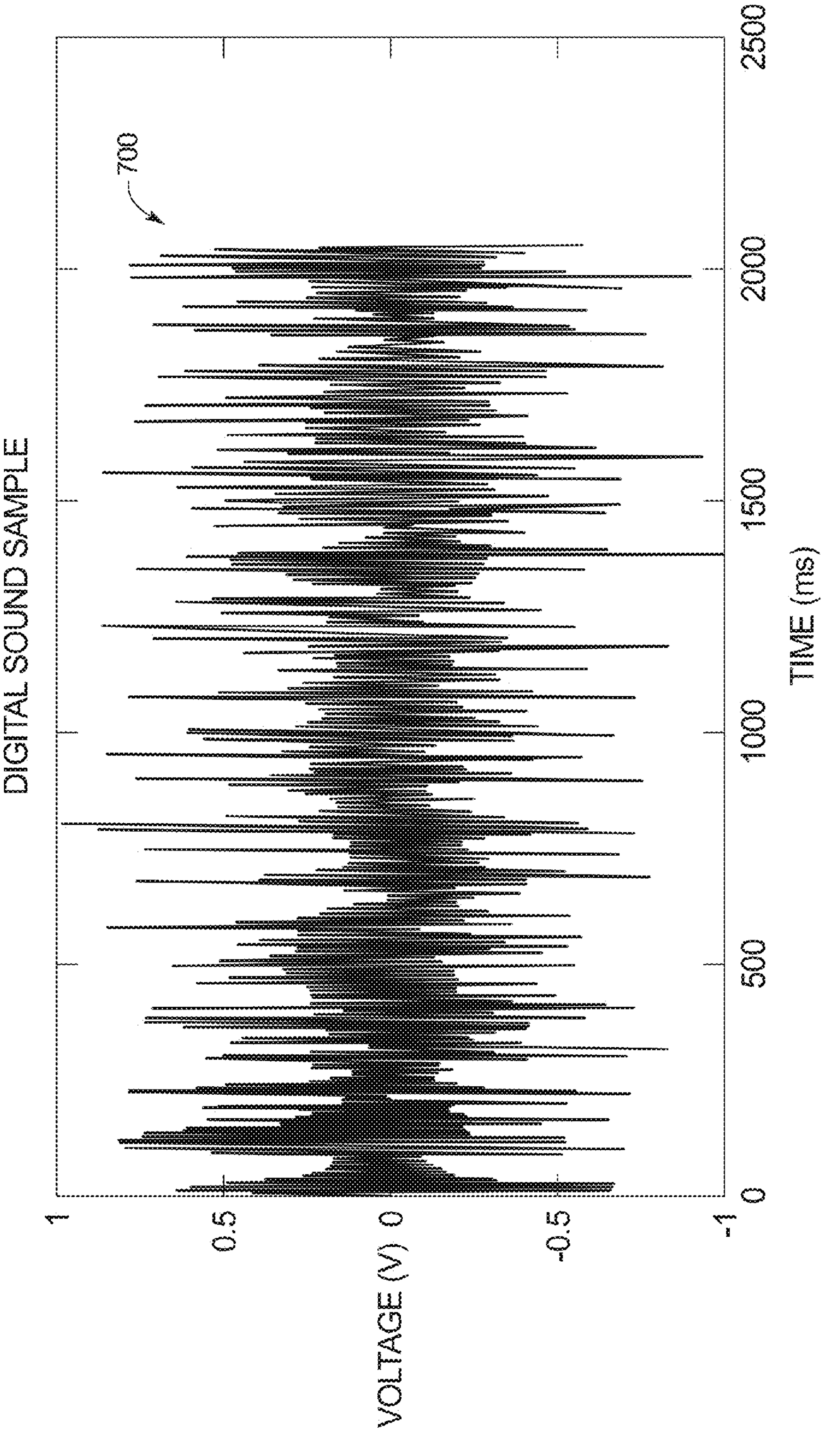
FIG. 7 shows an example digital sound sample (or drone sound sample) received by the sample processor of FIGS. 3 and 4, according to an example embodiment of the present disclosure.

The example component 401 of the sample processor 324 of FIG. 4 includes a frequency processor 406 (e.g., a frequency calculator) to convert a digital sound sample (or a drone sound sample) into one or more frequency amplitude vectors. FIG. 7 shows an example digital sound sample 700 (or drone sound sample) received by the frequency processor 406. The sound card 322 may have digitized the digital sound sample 700 from a sound signal sensed by the microphone 320 using, for example, a sample rate of 22,050 samples per second with a 16-bit quantization per sample.

As shown in FIG. 7, the digital sound sample 700 is a waveform recorded over time with the amplitude of the waveform corresponds to a voltage. The time scale is in milliseconds and the voltage scale is in volts. The digital sound sample 700 has a total duration of two seconds. In other embodiments, the digital sound sample 700 may have a total duration of one section.

The example frequency processor 406 is configured to split or otherwise partition the digital sound sample 700 (or the drone sound sample) into, for example, ten equal-sized non-overlapping 0.1 second segments. The frequency processor 406 may select a window for the segments in instances where the total duration is greater than one second. In this embodiment, the frequency processor 406 may select the digital sound sample 700 between 0.5 seconds and 1.5 seconds for the ten segments. In other embodiments, the frequency processor 406 may partition a sample into fewer or more segments and the duration of each segment may be less than, equal to, or greater than 0.1 seconds. For instance, the number of segments and/or the segment duration may change based on a setting of the sensitivity field 526 of FIG. 5.

Figure 8:
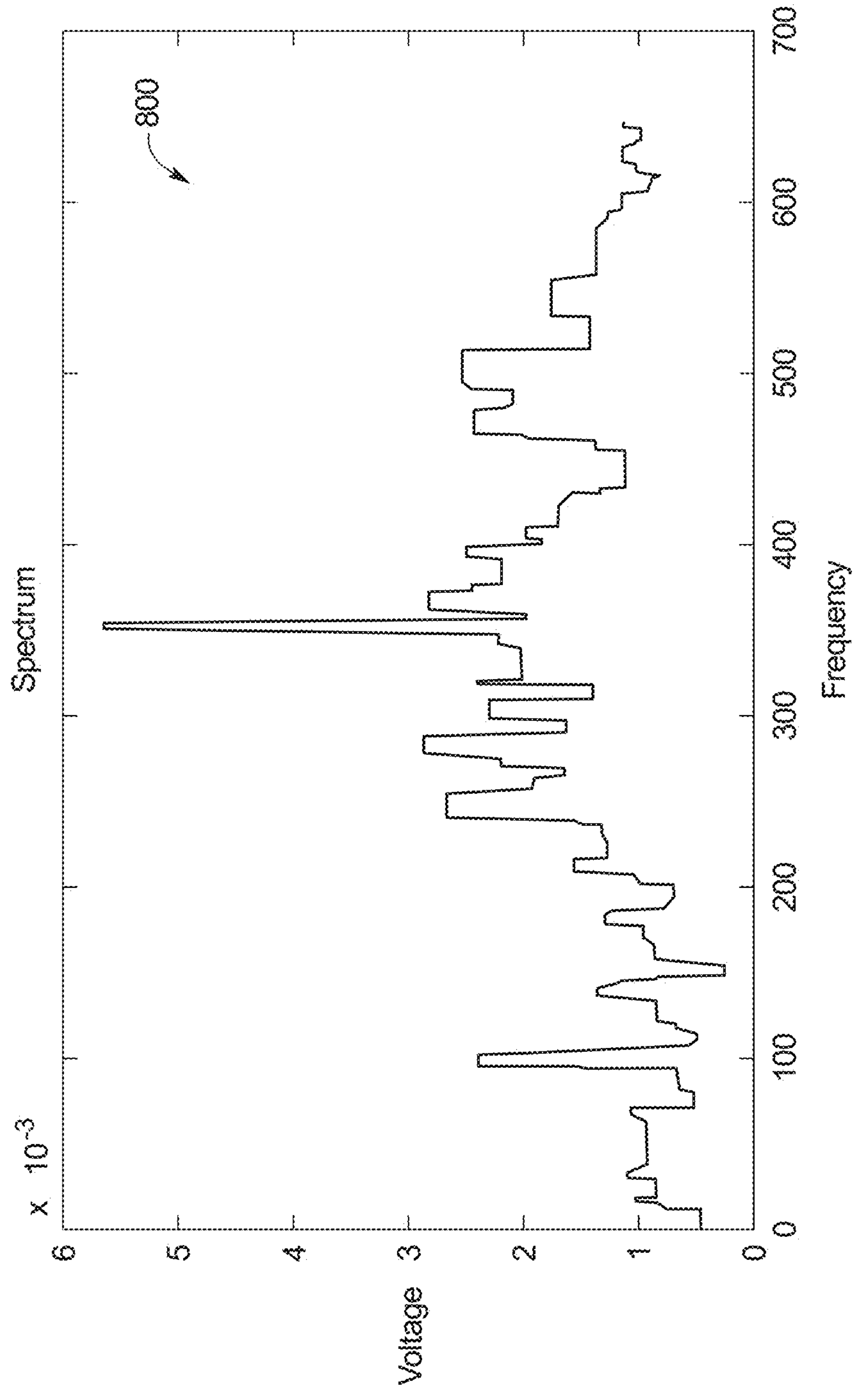
FIG. 8 shows a frequency amplitude vector that was computed by the sample processor of FIGS. 3 and 4, according to an example embodiment of the present disclosure.

The example frequency processor 406 is also configured to convert each of the ten segments into respective vectors of frequency amplitudes. For each segment, the frequency processor 406 determines a vector of frequency amplitudes by computing an absolute value of an FFT of the segment. FIG. 8 shows a frequency amplitude vector 800 (e.g., a raw frequency spectrum) that was computed by the frequency processor 406 determining an absolute value of an FFT of a 0.1 second segment of the digital sound sample 700 from 0.5 seconds to 0.6 seconds. The frequency processor 406 is configured to computer the FFT of the 0.1 second segment at, for example, 11,050 Hz using 11 Hz bin widths and a total of 1024 bins. The example frequency processor 406 may use any type of FFT algorithm to determine the frequency amplitude vectors 800 including, for example, Rader's FFT algorithm, the Prime-factor FFT algorithm, Bruun's FFT algorithm, Bluestein's FFT algorithm, the Cooley-Tukey FFT algorithm, etc.

IV. Filter

The example sample processor 324 of FIG. 4 includes a filter 408 configured to remove noise from each of the frequency amplitude vectors 800 for the respective segments. The filter 408 may use, for example, a sliding median filter to smooth each of the frequency amplitude vectors 800. The example filter 408 may also use a bandpass filter to remove noise. The bandpass filter may be configured to pass, for example, the 3 kHz to 9 kHz frequencies of the frequency amplitude vectors 800 to remove noise and other unwanted acoustic artifacts. The bandpass filter may use, for example, approximately 600 bins for the filtering. It should be appreciated that the bandpass filter may be adjusted based on tones generated by drones.

V. Composite Vector Processor

The example sample processor 324 of FIG. 4 includes a composite vector processor 410 configured to combine each of the segments into a single frequency vector. For example, the composite vector processor 410 is configured to combine the segments by determining an average of all of the filtered frequency amplitude vectors (associated with the same digital sound sample or same portion of the digital sound sample) corresponding to the segments (e.g., the ten segments from the digital sound sample 700) and creating a composite frequency amplitude vector based on the determined average. In some embodiments, the composite vector processor 410 may weigh each of the filtered frequency amplitude vectors differently based on, for example, an amount of noise removed, an order within a sequence, etc.

Figure 9:
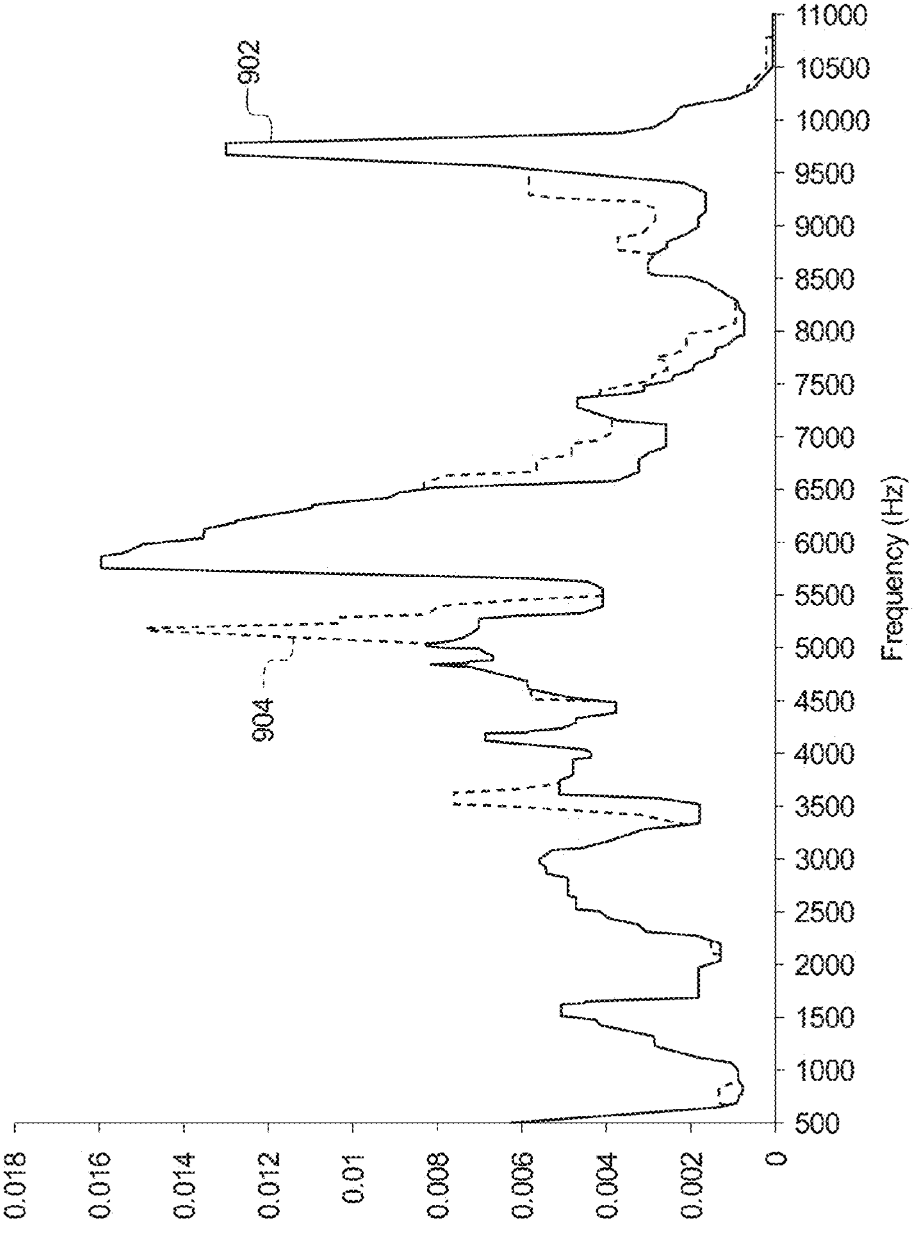
FIG. 9 shows a first normalized composite frequency amplitude vector, referred to herein as a feature frequency spectrum and a second normalized composite frequency amplitude vector, referred to herein as a drone sound signature, according to an example embodiment of the present disclosure.

The example composite vector processor 324 is also configured to normalize the composite frequency amplitude vector to have a unit sum. Normalizing to a unit sum may reduce processing calculations needed to make a comparison to drone sound signatures. FIG. 9 shows a normalized composite frequency amplitude vector, referred to herein as a feature frequency spectrum 902. FIG. 9 also shows a normalized composite frequency amplitude vector, referred to herein as a drone sound signature 904.

It should be appreciated that the composite vector processor 410 (as well as the frequency calculator 406 and the filter 408) are configured to convert drone sound samples into drone sound signatures 904 before converting the digital sound sample from, for example, the drone 304 into the feature frequency spectrum 902. The creation of the drone sound signatures 904 may occur, for example, after initiation or startup of the drone detection device 302. The composite vector processor 324 may be configured to store the drone sound signatures 904 to the drone database 326 so that the corresponding drone sound samples do not need to be reprocessed in the event the drone detection device 302 restarts or loses power. Further, the composite vector processor 410 may also store feature frequency spectrums to memory.

VI. Sample Comparer

The example sample processor 324 of FIG. 4 includes a sample comparer 412 to determine a difference between each drone sound signature 904 and the feature frequency spectrum 902 using broad spectrum matching. FIG. 9 shows a graphical representation of the comparison between one of the drone sound signatures 904 and the feature frequency spectrum 902. To determine a distance between the feature frequency spectrum 902 and the drone sound signature 904, the sample comparer 412 is configured to determine a linear distance between the feature frequency spectrum 902 and the drone sound signature 904 for each frequency (or frequency band), thereby making a comparison over the entire frequency spectrum under analysis (e.g., broad spectrum matching). The sample comparer 412 is also configured to integrate (or otherwise sum) the determined linear distances over the entire frequency spectrum to calculate a single distance value. In other words, the sample comparer 412 determines the difference in total area between a feature frequency spectrum and each drone sound signature. The sample comparer 412 may determine this difference in area using, for example, a Wasserstein metric, an earth-mover's distance algorithm, a Euclidean distance algorithm, etc.

It should be appreciated that the determination of a Wasserstein metric for each drone sound signature 904 compared to the single feature frequency spectrum 902 requires significant computational resources to calculate the difference in area between the two distributions of frequency spectrums. The drone database 326 may include hundreds to thousands of drone sound signatures, which means hundreds to thousands of comparisons are processed by the sample classifier for each feature frequency spectrum 902. In addition, each feature frequency spectrum 902 corresponds to a one second sample. A drone may be within proximity of the drone detection device 302 for a number of seconds to a number of minutes, or even hours. The sample comparer 412 accordingly has to compare tens to hundreds of feature frequency spectrums (each corresponding to a one second sample) to the hundreds or thousands of drone sound signatures to make accurate and precise drone detections and classifications. The sample comparer 412 accordingly has to make a comparison of each feature frequency spectrum to the entire database of drone sound signatures within one second or so. Otherwise, a processing queue will quickly form that will cause response times to degrade.

In some embodiments, the sample processor 324 may use a plurality of sample comparers 412 to more quickly compare in parallel a feature frequency spectrum to the database of drone sound signatures. The sample processor 324 may also be configured to select only a subset of drone sound signatures once an initial determination of drone class has been made. For example, within the first few seconds of sensing a drone, the sample processor 324 may determine that the drone corresponds to a class 2 drone. To reduce the number of computations, the sample comparer 412 may be configured to only compare subsequent feature frequency vectors to class 2 drone sound signatures and/or sound signatures of other classes that are similar to class 2 drone sound signatures.

VII. Classifier

The example sample processor 324 of FIG. 4 includes a classifier 414 to detect and classify a drone detection. For each feature frequency spectrum 902 (e.g., each digital sound sample), the example classifier 414 is configured to determine a lowest distance or area value (e.g., the Wasserstein metric) corresponding to the plurality of drone sound signatures 904. The lowest value corresponds to the drone sound signature 904 that best matches the feature frequency spectrum 902. The classifier 414 determines a drone class, model/make, brand, etc. (and flight characteristic) that corresponds to the selected drone sound signature 904.

a. False Classification Processing

To reduce false classifications, the example classifier 414 is configured to determined a specified number (e.g., nine) of drone signatures that have a next lowest Wasserstein metrics. The specified number may be determined, for example, based on a user providing a value in the field 524 of FIG. 5 and/or the specified number may be set by a manufacturer. The classifier 414 determines a drone class, model/make, brand, etc. that corresponds to the selected drone sound signatures having the next lowest Wasserstein metric.

The classifier 414 compares the drone class, brand, make/model, etc. of the drone sound signature 904 with the lowest Wasserstein metric to the drone class, brand, make/model. etc. of the drone sound signatures with the next lowest Wasserstein metrics. Conditioned on the drone classes, make/models, brands matching, the classifier 414 is configured to register a 'hit' classification for the feature frequency spectrum 902. The 'hit' classification includes, for example, a time of detection, the detected drone class, make/model, brand, etc., flight characteristic, and an identification of the feature frequency spectrum 902 and the drone sound signatures used to make the classification. It should be appreciated that the classifier 414 may use any algorithm to make the classification including, for example, a k-NN algorithm.

The classifier 414 is also configured to determine when the feature frequency spectrum 902 does not correspond to a drone. For instance, the classifier 414 may determine that a drone is not present if the drone class, make/model, brand, etc. does not match the specified next lowest number of Wasserstein metrics. Additionally or alternatively, the classifier 414 may determine that a drone is not present if the lowest Wasserstein metric is above a threshold and/or if a specified number of the Wasserstein metrics are not below a threshold. As discussed in conjunction with FIG. 5, the threshold may be set by a user providing an input via the sensitivity field 526.

The classifier 414 may also be configured to determine a drone is present but may not be able to classify the drone. For example, less than the specified number of next lowest Wasserstein metrics may match the drone class, make/model, brand of the drone corresponding to the lowest Wasserstein metric. This may be enough information for the classifier 414 to alert a user that a drone is present. However, the classifier 414 may provide an indication that the drone class, make/model, brand, etc. cannot be determined. Such a detection may be referred to as a 'partial-hit' classification.

To further reduce false classifications, the example classifier 414 is configured to determine a specified number of consecutive 'hits' (or 'partial-hits') before an alert is transmitted. For instance, a user may specify the number in the hits per detection field 522. The classifier 414 uses this number to determine when a number of consecutive digital sound samples (e.g., consecutive feature frequency spectrums associated with the same drone class, make/model, brand, etc.) with a 'hit' classification reaches the specified number. Conditioned on reaching the specified number, the classifier 414 determines that a drone is indeed present and uses the information associated with the detection to classify the drone.

Figure 10:
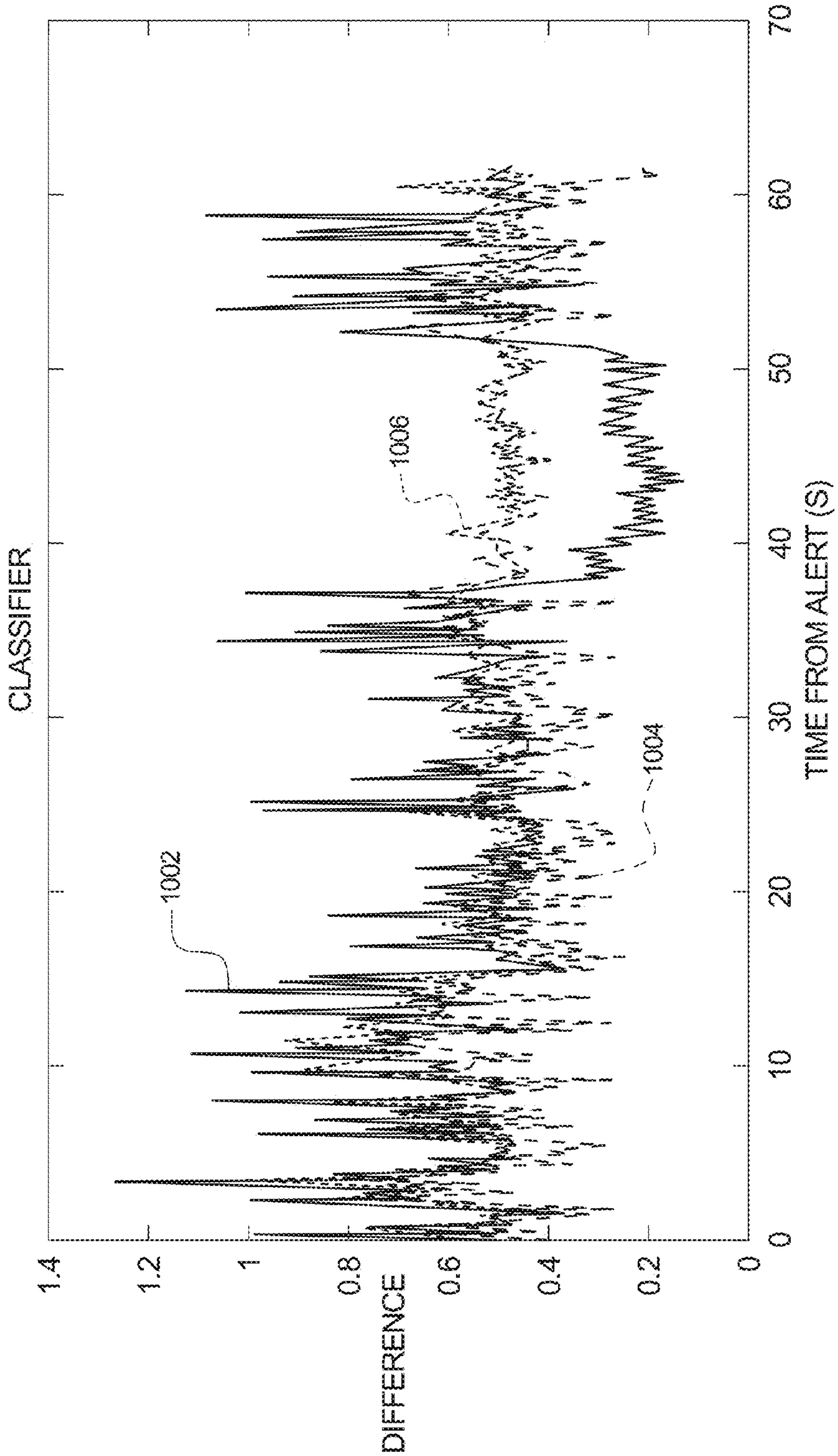
FIG. 10 shows a graphical representation of Wasserstein metrics for different drone sound signatures over a time period of a detection, according to an example embodiment of the present disclosure.

FIG. 10 shows a graphical representation of Wasserstein metrics for different drone sound signatures over a time period of a detection. Each feature frequency spectrum and corresponding digital sound sample covers 0.1 seconds. FIG. 10 accordingly shows 62 seconds of detection, which amounts to the processing of 620 digital sound samples into feature frequency spectrums. For brevity, FIG. 10 shows only three waveforms 1002, 1004, and 1006 corresponding to respective drone sound signatures. However, it should be appreciated that FIG. 10 could include a plot of Wasserstein metrics for all drone sound signatures computed during the detection time.

As shown in FIG. 10, the amount of difference between a drone sound signature and feature frequency spectrums change for each feature frequency spectrum. This difference corresponds to different flight characteristics of the drone or tonal variations of the drone. For example, the waveform 1002 may correspond to a drone sound signature having a hover flight characteristic. The difference from the feature frequency spectrum is relatively small in instances where the detected drone is hovering (or near hovering) and relatively large in instances where the drone is moving. Such differences are one reason why drone sound signatures are provided for the same class, make/model, brand, etc. with different flight characteristics. Such differences are also why detection and classification is based on drone class, brand, make/model, etc., namely to account for different tones resulting from the wide variety of flight characteristics.

Returning to FIG. 4, conditioned on the classifier 414 determining that the number of consecutive 'hits' satisfies the specified number, the classifier 414 transmits a message to an alert generator 416. The message includes, for example, a time of detection, the detected drone class, make/model, brand, etc. and an identification of the feature frequency spectrum and the drone sound signatures used to make the classification. The classifier 414 may continue to record 'hits' and/or 'partial-hits' to determine a duration of the drone incursion and an estimated flight path of the incursion.

Conditioned on the classifier 414 determining that a number of 'partial-hits' satisfies a specified number, the classifier 414 transmits a message to an alert generator 416 indicating the detection. The message may also include the two or more possible drone classes, make/models, brands, etc. associated with the detection and/or an identification of the feature frequency spectrum and the drone sound signatures used to make the detection. The message may also include the one or more flight characteristics associated with the matching drone sound signatures.

b. Duration and Flight Tracking Processing

In addition to detecting and classifying drones, the classifier 414 is also configured to determine how long a drone is within vicinity of the drone detection device 302 and determine an estimated flight path. In other embodiments, the classifier 414 may be configured to store the data associated with the detection and/or classification to enable, for example, the application 307 and/or the management server 308 to determine the duration and/or flight path. For instance, each 'hit' corresponds to specific time and flight characteristic. The classifier 414 may compile 'hits' to determine a total duration of the drone incursion. The classifier 414 may also compile the flight characteristics corresponding to the 'hits' to determine how the drone was operating (e.g., ascending, approaching, hovering, descending, retreating, etc.). The classifier 414 (or application 307/management server 308) may use this data to construct a plot of the drone's flight over the detection time.

To further refine the information regarding the drone's flight, the classifier 414 may determine a distance (and/or heading) of a drone based on the digitized sound samples. For instance, the classifier 414 may use a voltage amplitude of the digital sound sample to determine a distance from the microphone 320 to the drone 304. The classifier 414 may also use Doppler processing to determine a direction of movement of the drone. The classifier 414 associates the digital sound sample with the 'hit' time and associates the distance and/or heading information with the flight characteristic.

Figure 11:
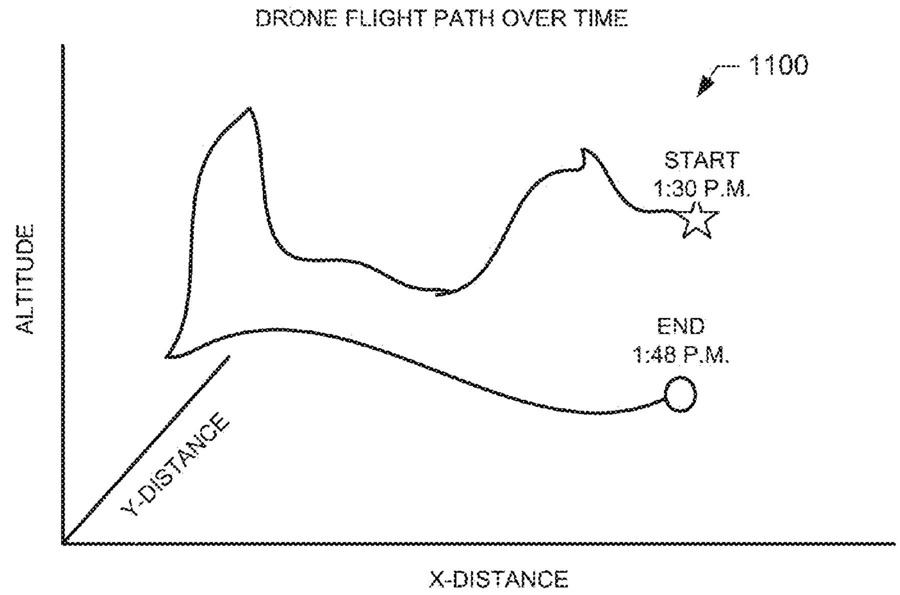
FIG. 11 shows an example graphical representation of a flight path of a drone during a detection as determined by the sample processor of FIGS. 3 and 4, according to an example embodiment of the present disclosure.
Figure 12:
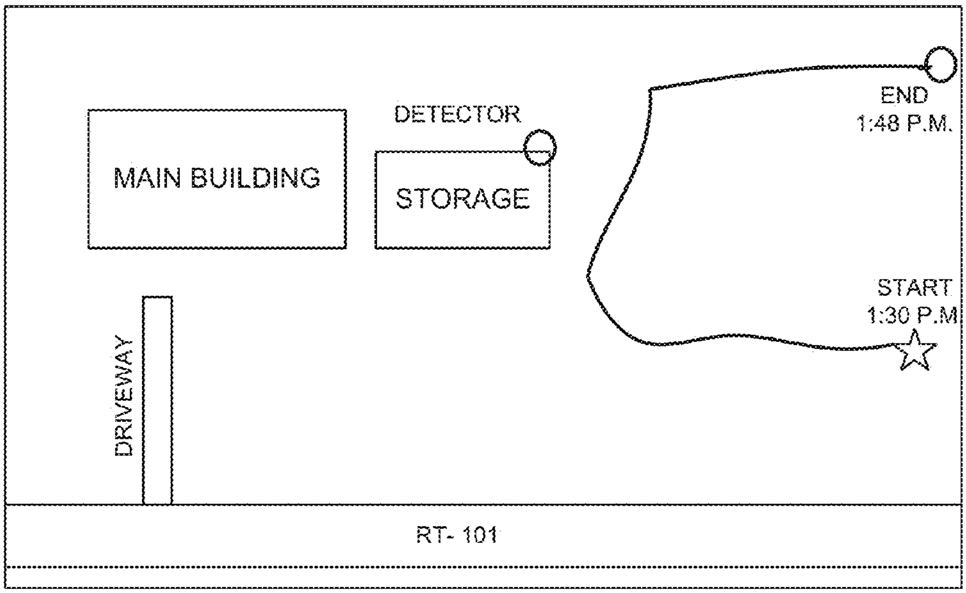
FIG. 12 shows a graphical representation of the flight path of FIG. 11 within a map of a user's property, according to an example embodiment of the present disclosure.

FIG. 11 shows an example graphical representation of a flight path 1100 determined by the classifier 414. The flight path 1100 shows an altitude of a drone in conjunction with an X-distance and a Y-distance from the microphone 320 over the detection time. The flight path 1100 may be resolved by, for example, the classifier 414, the application 307, and/or the management server 308 into a map or other graphical representation based on a geographic location of the drone detection device 302 and/or the microphone 320. In this manner, the flight path 1100 may be shown relative to a map of a user's property (as shown in FIG. 12) to illustrate where and when the drone incursion began, where the drone traveled on the property during the incursion, and where and when the incursion ended.

VIII. Alert Generator

The example sample processor 324 of FIG. 4 includes an alert generator 416 to create and transmit alerts responsive to the classifier 414 detecting and/or classifying a drone. The example alert generator 324 creates an alert based on preferences by the user, as discussed in conjunction with FIG. 5. The alert generator 416 may also transmit a flight path and/or graphical representation of a drone detection in relation to a map. The alert generator 416 may further transmit a message indicative of the end of a drone detection.

As discussed, the alert generator 416 is configured to create a message specific for the protocol specified by a user. The alert generator 416 is also configured to activate/deactivate the light source 330, the audio source 332, and/or the switch 334. The alert generator 416 may also queue detections and corresponding detection information for transmission to the management server 308. Moreover, the alert generator 416 is configured to store to a data structure each detection incident.

Figures 13, 14:
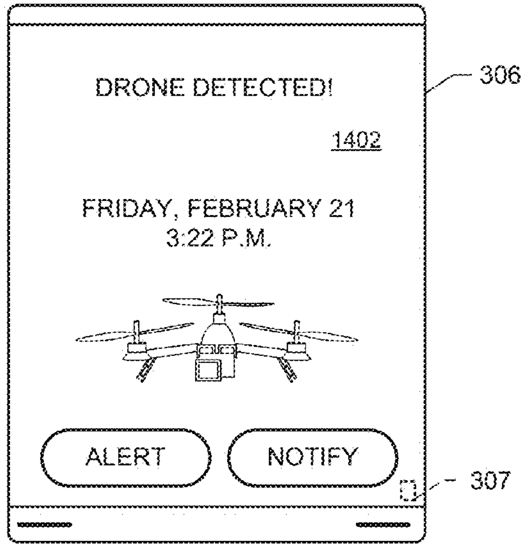
FIG. 13 shows a data structure of drone detections created by the sample processor of FIGS. 3 and 4 and/or the management server of FIG. 3, according to an example embodiment of the present disclosure.
FIG. 14 shows an alert displayed by a user device via an application, according to an example embodiment of the present disclosure.

For example, FIG. 13 shows a data structure 1300 created by the alert generator 416. The data structure 1300 stores detection incidents including, for example, a time, date, duration, and location of the detection. The data structure 1300 also includes drone classification information including the drone class, the brand, and the model. The data structure 1300 may also include an identifier of a microphone and/or drone detection device 302 (when multiple drone detection devices 302 are used in conjunction with each other by a common user).

The storage of alerts may be used to preserve evidence of drone incursions for subsequent legal suits or the prosecution of criminal activity. In addition, the alert generator 416 may control a camera in communication with the drone detection device 302 (e.g., via the network interface 336 and/or the switch 334). In conjunction with creating an alert, the alert generator 416 may cause the camera to record video and/or still pictures of the drone 304 and store the recorded images in association with a record of the incursion. In some instances, the recorded images may be transmitted within the alert message.

FIG. 14 shows an alert 1402 displayed by the user device 306 via the application 307. The alert generator 416 may transmit the alert 1402 via the network interface 336 and the network 312 to the user device 306. The application 307 may be configured to render the alert 1402 based on the format in which the alert is received. In this embodiment, the alert 1402 includes a "Drone Detected!" message, a time and date of detection, and a representative picture of the detected drone class, make/model, brand (or actual picture of the drone). The alert 1402 also includes options to enable the user to notify the management server 308 and/or authorities (e.g., the police, FBI, etc.) of the intrusion. The alert 1402 may also include an option to take addition countermeasures (e.g., the 'Alert' button), which causes, for example, the sample processor 324 to activate the switch 334 to close window shades, etc. The countermeasures may also include transmitting an alert to a security team or local authorities. It should be appreciated that the alert 1402 shown in FIG. 14 is only one type of alert that could be transmitted by the alert generator 416. For instance, the alert 1402 may be included within an email sent to an email account of the user or the alert may be transmitted within a text message and displayed by a messaging application.

IX. Location Calibrator

The example sample processor 324 of FIG. 4 includes a location calibrator 418 to adjust drone sound samples and/or digital sound samples based on environmental characteristics specific to the detection environment 300. For instance, each property and/or building has unique features that affect acoustic signals or tones generated by drones. Some building features, landscaping, or microphone location may cause certain frequencies to be attenuated, amplified, shifted, etc. Such change in frequencies may reduce the accuracy of detections.

To improve detection accuracy, the location calibrator 418 is configured to determine how environmental characteristics change frequency response and accordingly apply frequency or digital signal corrections. The location calibrator 418 may also determine and compensate for environmental noise. The location calibrator 418 may apply the corrections to the digital samples, the frequency amplitude vectors, the composite frequency amplitude vectors and/or the feature frequency spectrum (or drone sound signature). The corrections may include, for example, frequency shifts, digital signal filtering, digital signal phase shifting, digital signal peak smoothing, etc.

In an embodiment, a user may perform a calibration routine using the location calibrator 418 and a sound machine (e.g., the user device 306). The sound machine may simulate a drone and generate sound signals with known properties. The location calibrator 418 compares received calibration digital sound signals and/or processed feature frequency spectrums to known calibration digital sound signals and calibration frequency spectrums for the generated sound signal. The location calibrator 418 determines differences between the measured and known signals and accordingly determines tuning parameters and/or filters to compensate for the differences. The frequency processor 406, the filter 408, the composite vector processor 410, the sample comparer 412, and/or the classifier 414 may apply the tuning parameters and/or filters based on whether the digital sound signal, the frequency vector, or the feature frequency spectrum is being adjusted.

In some instances the sound machine may generate different sound signals. In these instances, the user may provide an indication to the location calibrator 418 as to which calibration sound signal is being generated. This indication enables the location calibrator 418 to select the appropriate calibration digital sound sample and/or calibration frequency spectrum. The different calibration sound signals may be specifically designed to calibrate for particular tones and/or ranges of tones.

In some embodiments, the application 307 may function as the sound machine. For instance, the application 307 may cause the user device 306 (or a connected speaker) to output calibration sound signals. The application 307 may also transmit to the location calibrator 418 an indication of which calibration sound signal is being played.

In an alternative embodiment, the location calibrator 418 may adaptively calibrate the drone detection device 302 during normal use. For example, the location calibrator 418 may determine differences between one or more feature frequency spectrums and a drone sound signature having a lowest Wasserstein value for one or more 'hits.' In some instances, the calibration may only be performed if the lowest Wasserstein value is below a certain threshold to ensure that there is a substantial match. The location calibrator 418 may then determine parameters and/or filter values that would cause the feature frequency spectrums to have substantially zero difference with the corresponding drone sound signatures. The location calibrator 418 then applies these parameters and/or filter values.

X. Feedback Processor

The example sample processor 324 of FIG. 4 includes a feedback processor 420 to refine detections based on false-positive detections and false-negatives. For example, after the alert generator 416 transmits an alert, a user may provide feedback that there is in fact no drone within a vicinity of the drone detection device 302. The user may provide the feedback via, for example, the application 307. The user may also switch a false-positive button included with the drone detection device 302.

Responsive to receiving the feedback, the feedback processor 420 is configured to determine the one or more drone sound signatures that generated the false-positive detection. The feedback processor 420 stores a flag or other indication in association with the drone sound signatures (or drone sound samples) indicating that a match is not a 'hit' or 'partial-hit'. The feedback processor 420 may also transmit information identifying the drone sound signatures (or drone sound samples) to the management server 308, which may relay the false-positive indication to other drone detection devices 302.

The feedback processor 420 may also be configured to process false-negative feedback from a user. For instance, a user may notice a drone incursion and realize an alert was not generated. The user may provide an indication via, for example, the application 307, that a drone detection was missed. The user may also provide a time/date of the missed detection. Responsive to receiving the false-negative feedback, the feedback processor 420 is configured to determine the feature frequency spectrums and/or digital sound samples that were recorded and processed at the time the drone was spotted by the user. The feedback processor 420 may store the digital sound samples as new drone samples and/or store the feature frequency spectrums as new drone sound signatures. The feedback processor 420 may prompt the user for the drone class, make/model, brand, flight characteristic, etc. (e.g., "How many rotors did the drone have?", "Select a picture that corresponds to the drone.", "Select how the drone was flying." etc.). The feedback processor 420 uses the information provided by the user as metadata or information stored in association with the drone sound sample, as shown in FIG. 6.

The feedback processor 420 may also determine the drone information if a user is unable to provide information. The feedback processor 420 may determine which drone sound samples and/or drone sound signatures are closest to the sound signature or sound sample associated with the false-negative detection. The feedback processor 420 uses the information from the closest drone sound samples and/or drone sound signatures as the information associated with the false-negative detection.

The feedback processor 420 is also configured to transmit newly detected drone sound samples to the management server 308. The feedback processor 420 may transmit the information provided by the user. The management server 308 may compile newly detected sound samples and send out periodic updates to the other users 310. In this manner, the drone detection devices 302 provide an adaptive learning system that automatically updates other devices when new drones are detected.

Flowchart of the Example Process

Figure 15:
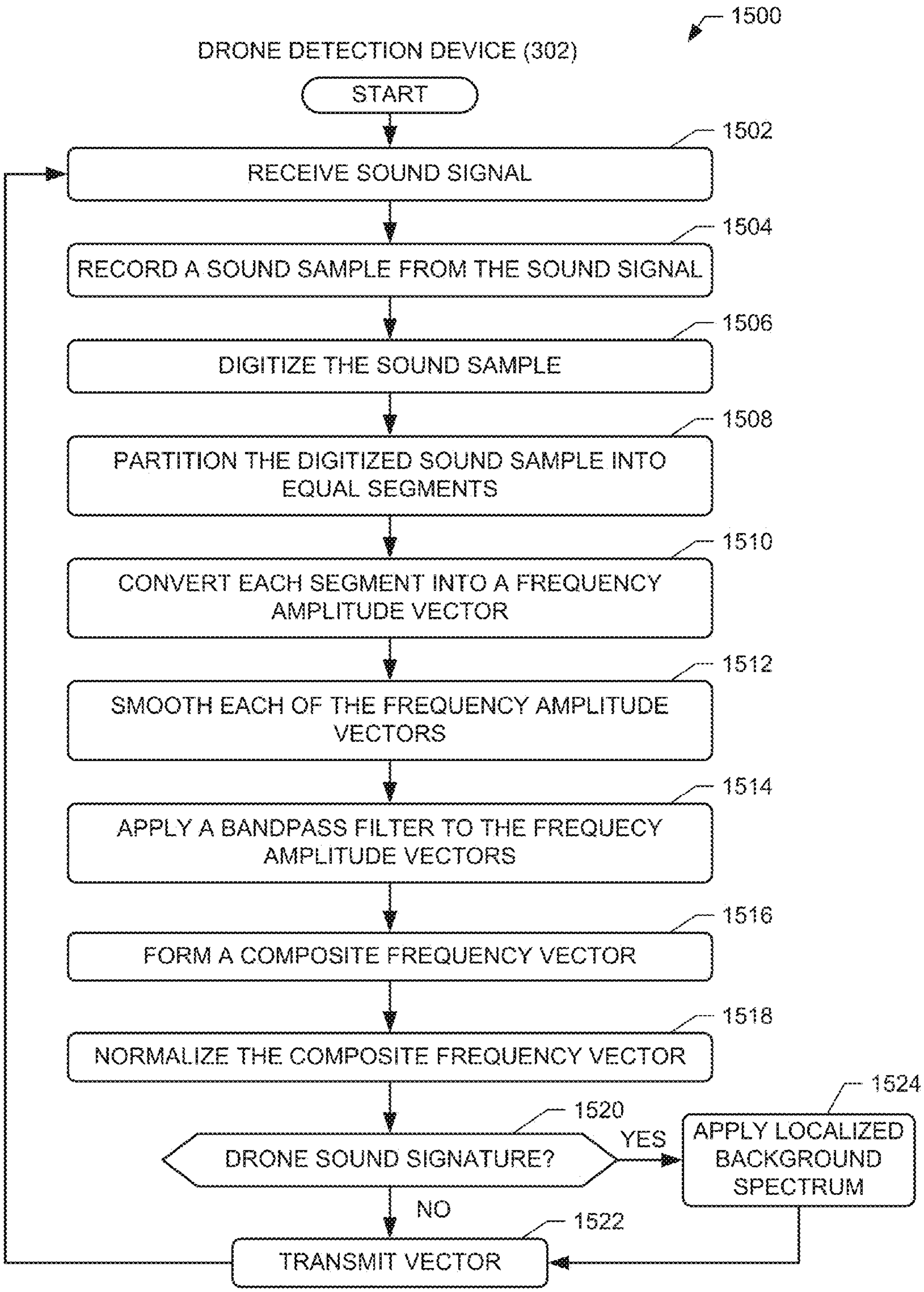
FIG. 15 illustrates a flow diagram showing an example procedure to create a feature frequency spectrum and/or drone sound signature, according to an example embodiment of the present disclosure.

FIG. 15 illustrates a flow diagram showing an example procedure 1500 to create drone sound signatures and/or feature frequency spectrums, according to an example embodiment of the present disclosure. Although the procedure 1500 is described with reference to the flow diagram illustrated in FIG. 15, it should be appreciated that many other methods of performing the steps associated with the procedure 1500 may be used. For example, the order of many of the blocks may be changed, certain blocks may be combined with other blocks, and many of the blocks described are optional. Further, the actions described in procedure 1500 may be performed among multiple devices including, for example the frequency processor 406, the filter 408, the composite vector processor 410 (collectively the sample processor 324), the microphone 320, and/or the sound card 322.

The example procedure 1500 of FIG. 15 operates on, for example, the drone detection device 302 of FIG. 3. The procedure 1500 begins when the microphone 320 receives a sound signal (block 1502). The sound card 322 then records and digitizes the sound signal as a digital sound sample (blocks 1504 and 1506). The sample processor 324 partitions the digitized sound sample into equal segments (block 1508).

The sample processor 324 converts each segment into a frequency amplitude vector by determining an absolute value of a FFT applied to the segment (block 1510). The sample processor 324 also applies a sliding median filter to smooth each frequency amplitude vector (block 1512). The sample processor 324 may also apply a bandpass filter to the smoothed frequency amplitude vectors to remove noise (block 1514). The sample processor 324 then forms a composite frequency vector my averaging the smoothed filtered frequency amplitude vectors associated with the same digital sound sample (block 1516). The sample processor 324 may further normalize the composite frequency vector (block 1518). In some embodiments, the bandpass filtering in block 1514 may be performed after the composite frequency vector is formed and/or after the normalization.

In instances where the example procedure 1500 is for drone sound samples, the steps associated with blocks 1502 to 1506 may be omitted. The sample processor 324 begins by partitioning drone sound samples into equal segments in block 1508. The sample processor 324 then continues in the same manner as described above in conjunction with blocks 1510 to 1518.

The example procedure 1500 of FIG. 15 continues by determining if the resulting frequency spectrum is a drone sound signature or a feature frequency spectrum (block 1520). Conditioned on the resulting frequency spectrum being a feature frequency spectrum, the example sample processor 324 transmits the feature frequency spectrum (e.g., the sample vector) for comparison to drone sound signatures (block 1522). The example procedure 1500 then returns to block 1502 to process another sound signal.

Conditioned on the resulting frequency spectrum being a drone sound signature (block 1520), the example sample processor 324 applies localized background spectrums (e.g., parameters, filters, etc.) determined from a calibration performed by the location calibrator 418. The example sample processor 324 then transmits the drone sound signature (e.g., the vector) for comparison to feature frequency spectrums (block 1522). The example procedure 1500 then returns to block 1502 to process another sound signal and/or to block 1508 to process another drone sound sample.

Figure 16:
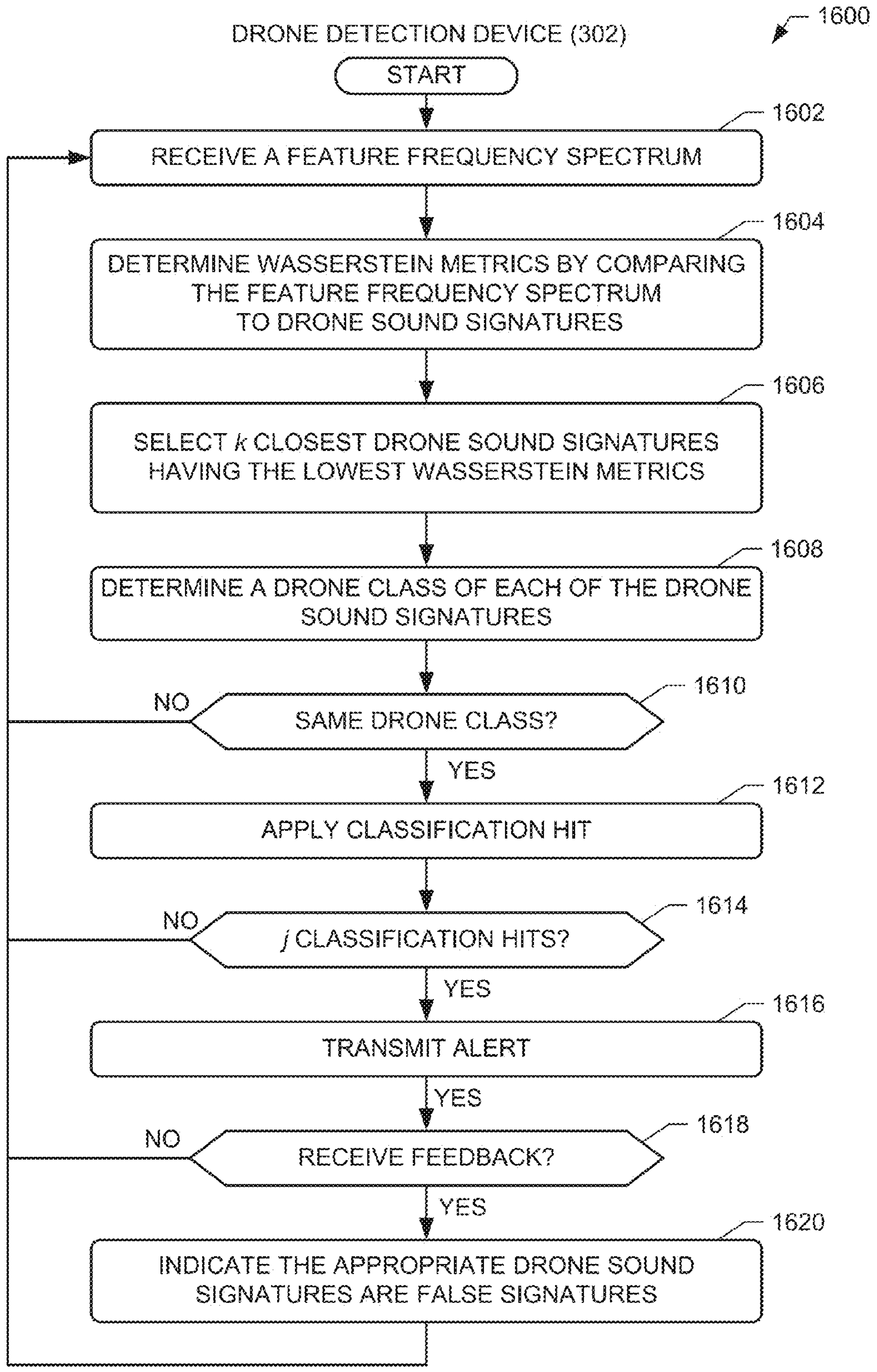
FIG. 16 illustrates a flow diagram showing an example procedure to detect and classify drones, according to an example embodiment of the present disclosure.

FIG. 16 illustrates a flow diagram showing an example procedure 1600 to detect and/or classify a drone, according to an example embodiment of the present disclosure. Although the procedure 1600 is described with reference to the flow diagram illustrated in FIG. 16, it should be appreciated that many other methods of performing the steps associated with the procedure 1600 may be used. For example, the order of many of the blocks may be changed, certain blocks may be combined with other blocks, and many of the blocks described are optional. Further, the actions described in procedure 1600 may be performed among multiple devices including, for example the sample comparer 412, the classifier 414, the alert generator 416, the feedback processor 420 (collectively the sample processor 324), and/or the network interface 336.

The example procedure 1600 of FIG. 16 operates on, for example, the drone detection device 302 of FIG. 3. The procedure 1600 begins after the sample processor 324 of the drone detection device 302 has converted a digital sound sample into a feature frequency spectrum, as described in conjunction with FIG. 15 (block 1602). The sample processor 324 compares the feature frequency spectrum to each drone sound signature and determines a Wasserstein metric for each comparison (block 1604). The sample processor 324 then determines which drone sound signature is associated with the lowest Wasserstein metric and which k drone sound signatures are associated with the next lowest Wasserstein metrics (block 1606). The k value may be selected by a user, manufacturer, etc. It should be appreciated that more accurate detections may be made with relatively larger k values.

The example processor 324 next determines a drone class, for example, associated with the drone sound signatures associated with the lowest and next lowest k Wasserstein metrics (block 1608). The example sample processor 324 then compares the drone class of the drone sound signatures associated with the lowest and next lowest k Wasserstein metrics (block 1610). Conditioned on the drone class being the same for all of the drone sound signatures, the example sample processor 324 designates the broad spectrum match as a 'hit' (block 1612). Conditioned on not all of the drone classes being the same for all of the drone sound signatures, the example sample processor 324 determines the feature frequency spectrum did not originate from a known drone and returns to processing additional feature frequency spectrums (block 1602). In some embodiments, the sample processor 324 may designate a detection as a 'partial-hit' if some of the drone sound signatures are associated with the same class.

Returning to block 1612, after applying a 'hit' classification, the sample processor 324 determines if there have been a j number of consecutive 'hits' associated with the same drone class (block 1614). In other embodiments, the number of 'hits' may be compared to a threshold of a number of 'hits' within a designated time period (e.g., ten seconds). As discussed, the j value may be selected by a user, manufacturer, etc. If the number of 'hits' is less than the j value, the sample processor 324 returns to block 1602 to process the next feature frequency spectrum. However, conditioned on the number of 'hits' meeting the j value, the sample processor 324 determines that a drone has been detected and creates/transmits an alert (block 1616). As discussed, the alert may include an indication of the drone class, a flight characteristic of the drone, a time of detection, a picture of the drone, etc. The sample processor 324 may also store a record of the drone detection.

The sample processor 324 may also determine if feedback has been received regarding the detection (block 1618). If not feedback has been received, the example sample processor 324 returns to block 1602 to process the next feature frequency spectrum. However, conditioned on receiving feedback, the sample processor 324 determines the drone sound signatures associated with the detection and creates and indication that these signatures correspond to false detections (block 1620). This feedback prevents the sample processor 324 from issuing an alert for subsequent feature frequency spectrums that match the drone sound signatures associated with the false-positive detection. The example sample processor 324 then returns to block 1602 to process the next feature frequency spectrum.

Application

As discussed throughout, the example application 307 of FIG. 3 is configured to enable a user to provision, calibrate, record drone sound samples, receive alerts, and communicate with the drone detection device 302. In addition, the application 307 may include features that use alert information to provide a more comprehensive alert. For example, the application 307 may receive an indication of an alert including a geographic location of the drone detection device 302 that made the alert and/or a recorded flight path. The application 307 may determine the geographic location on a map and render the map including the detection and positions of drone detection device(s) owned by the user. The application 307 may also display the flight path on the map, as shown in FIG. 12.

The application 307 may also enable a user to record drone sound samples and update the drone database 326 and/or the management server 308 with the recording. For example, a user may come in contact with a drone anywhere. The user may activate the application 307 on the user device 306 and record the tone emitted by the drone. The application 307 may also prompt the user for information regarding the drone including, for example, drone class, make/model, brand, and observed flight characteristics (stored in conjunction with the time of the recording in which the flight characteristic took place).

The application 307 may be a standalone application stored locally to the user device. Alternatively, the application 307 may be accessible via a web page or website hosted by, for example, the management server 308. The application 307 may also comprise an interface that enables direct access of data and information on the drone detection device 302 and/or the management server 308.

It should be appreciated that in some embodiments some of all of the drone detection device 302 may be implemented by the application 307 and/or the user device 306. For example, microphones and sound cards within a smartphone may implement the microphone 320 and the sound card 322 of FIG. 3. Further, the sample processor 324 may be implemented by instructions stored in association with the application 307 executed by one or more processors on a smartphone. Moreover, the light source 330 and audio source 332 may be implemented by speakers and/or LEDs on a smartphone. A smartphone may be in wireless communication with remotely located switches 334. Additionally, the cellular, WLAN, and other wireless interfaces of a smartphone may implement the network interface 336 features. In this manner, the application 307 enables any smartphone, tablet computer, laptop, etc. to operate as a drone detection device 302.

Management Server

The example management server 308 of FIG. 3 is configured to manage the distribution of drone sound signatures and/or drone sound samples. As discussed, the management server 308 is configured to receive drone sound samples from anyone that makes a recording of a drone. The management server 308 is also configured to prompt individuals for information regarding the recording including, for example drone class, drone make/model, flight characteristics, etc. In some instances, the management server 308 may host a website that enables individuals to upload drone sound samples. The website may prompt the individuals for information including showing individuals representative pictures of different drones and associating drone information based on a selected picture. In some embodiments, the management server 308 may determine drone information by analyzing the received drone sound samples and/or comparing the samples to known drone sound samples.

The management server 308 is also configured to compile drone detections and make these detections graphically available to owners of drone detection devices, subscribing members, and/or the general public. FIG. 13 shows the data structure 1300, which may be compiled by the management server 308 based on detections by a plurality of users. In some instances, different users provide different types of geographic information, which is resolved by the management server 308 into the appropriate location on a graphical representation. In these instances, a user may opt out of having detection information stored or request that detection information remain anonymous (e.g., no geographic information included or very general geographic information included, such as a town).

Figure 17:
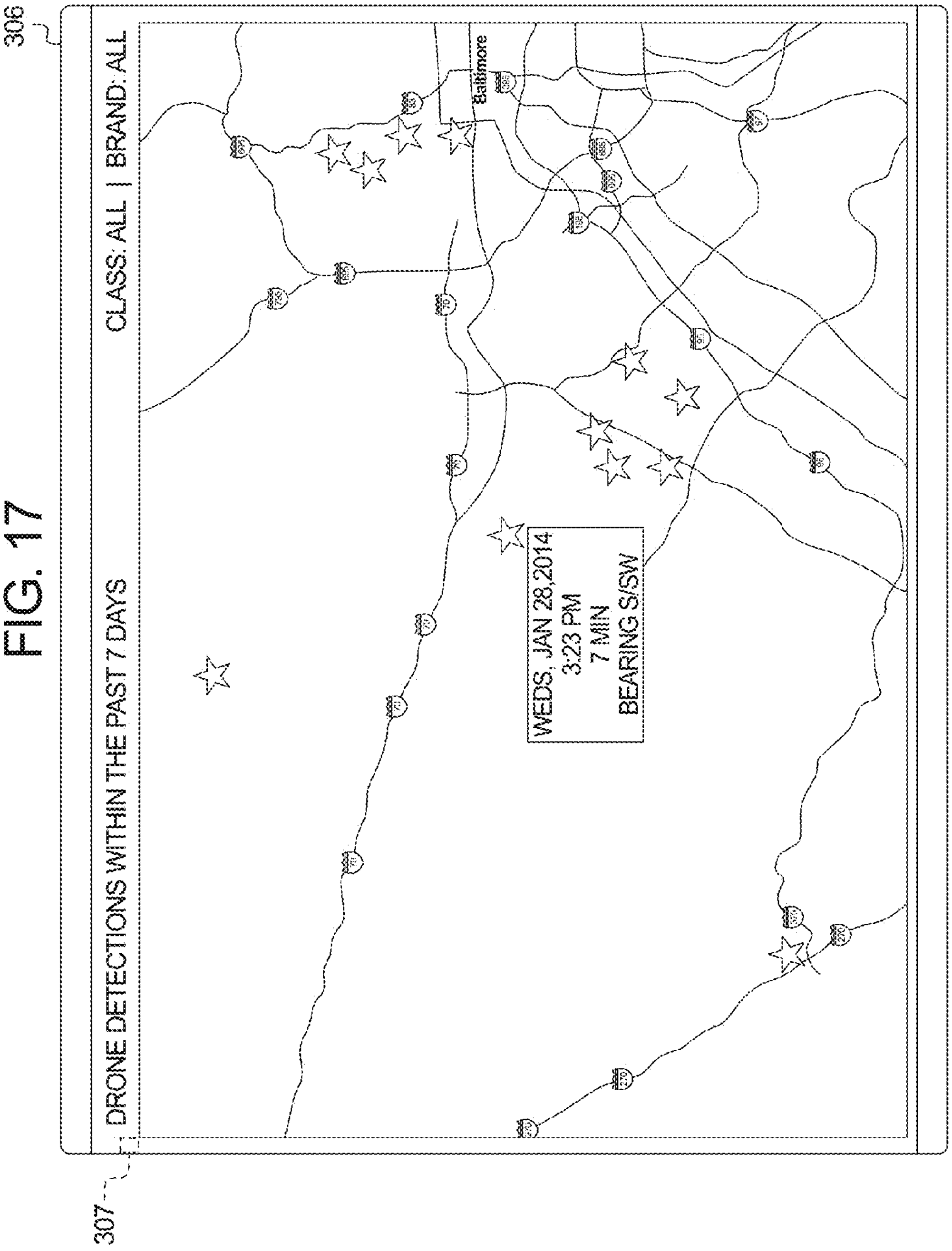
FIG. 17 shows a graphical representation of detections generated by a management server and displayed by a user device via an application.

FIG. 17 shows a graphical representation 1700 of detections generated by the management server 308 and displayed by the user device 306 via the application 307. The graphical representation 1700 includes detections from multiple users (as denoted by the stars). The management server 308 may update the graphical representation in real-time as detections are received. A user may select one of the stars to view additional information regarding the detection including, for example, drone class, date/time of the detection, duration, bearing of the drone, etc. The management server 308 and/or the application 307 may enable a user to filter the data for specific locations, time periods, drone class, drone brand, etc.

The example management server 308 may also alert users to approaching drones. For example, the management server 308 may receive a detection of a drone at a certain address. The management server 308 may then determine users who are within vicinity of the detection area or own property within vicinity of the detection area (e.g., within five miles of the detection). The management server 308 transmits an alert to the corresponding user devices 306 regarding the nearby drone. The management server 308 may also transmit a message to the drone detection devices 302 within vicinity, which may cause the devices to activate or adjust detection thresholds as a result of a likely impending detection.

Processor

Figure 18:
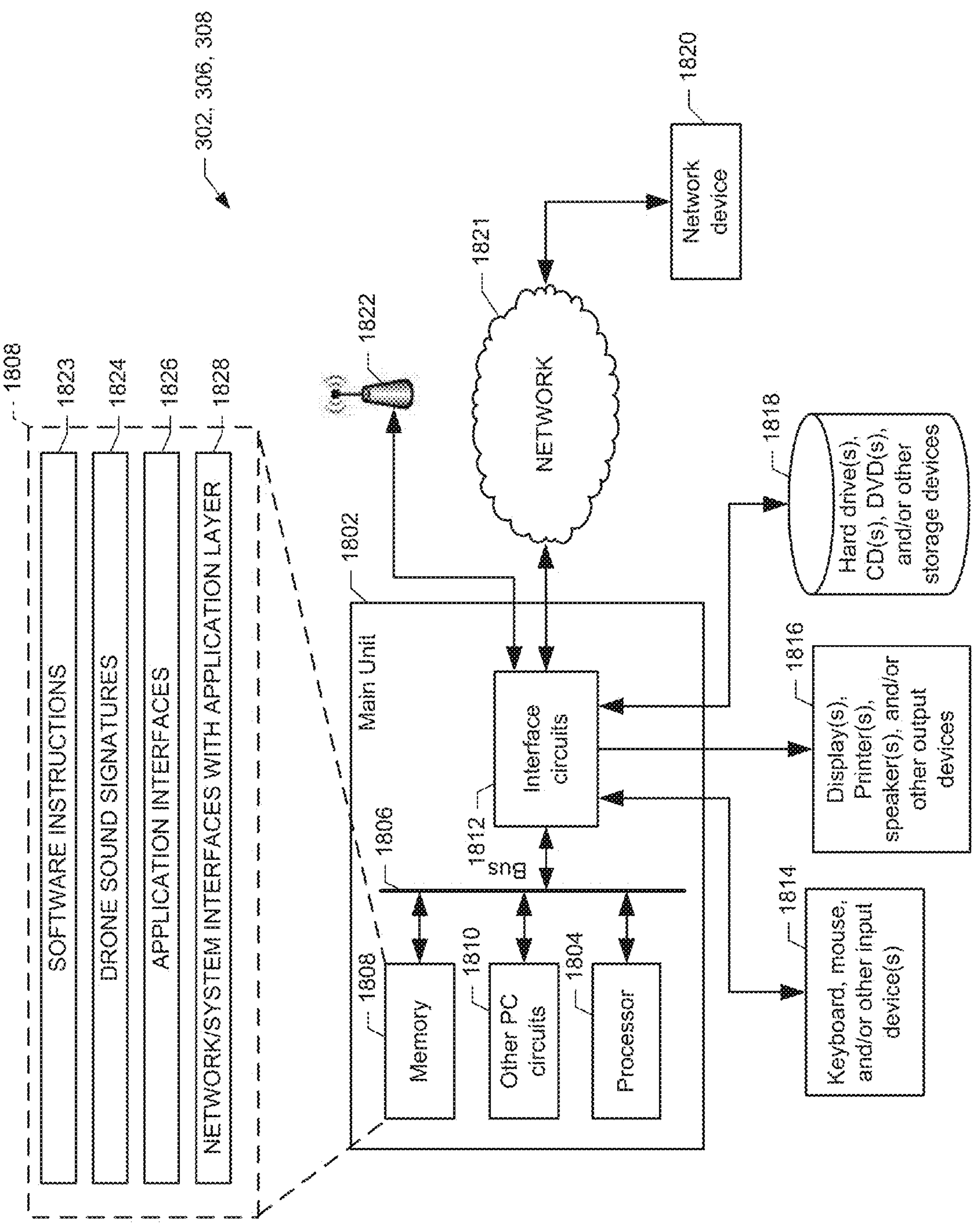
FIG. 18 shows a detailed block diagram of an example a sample processor, user device and/or management server, according to an example embodiment of the present disclosure.

A detailed block diagram of electrical systems of an example computing device (e.g., the setup processor 402, the database manager 404, the frequency processor 406, the filter 408, the composite vector processor 410, the sample comparer 412, the classifier 414, the alert generator 416, the location compensator 418 and the feedback processor 420 (collectively the sample processor 324 or the drone detection device 302), the user device 306, and/or the management server 308) is illustrated in FIG. 18. In this example, the devices 302, 306, and 308 include a main unit 1802 which preferably includes one or more processors 1804 communicatively coupled by an address/data bus 1806 to one or more memory devices 1808, other computer circuitry 1810, and one or more interface circuits 1812. The processor 1804 may be any suitable processor, such as a microprocessor from the INTEL PENTIUM® or CORE™ family of microprocessors. The memory 1808 preferably includes volatile memory and non-volatile memory. Preferably, the memory 1808 stores a software program that interacts with the other devices in the environment 300, as described above. This program may be executed by the processor 1804 in any suitable manner. In an example embodiment, memory 1808 may be part of a "cloud" such that cloud computing may be utilized by devices 302, 306, and 308. The memory 1808 may also store digital data indicative of documents, files, programs, webpages, drone sound samples, drone sound signatures, drone information, etc. retrieved from (or loaded via) devices 302, 306, and 308.

The example memory devices 1808 store software instructions 1823, drone sound signatures 1824 (or drone sound samples), user interface features, permissions, protocols, identification codes, audio files, content information, registration information, event information, and/or configurations. The memory devices 1808 also may store network or system interface features, permissions, protocols, configuration, and/or preference information 1828 for use by the devices 302, 306, and 308. It will be appreciated that many other data fields and records may be stored in the memory device 1808 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 1812 may be implemented using any suitable interface standard, such as an Ethernet interface and/or a Universal Serial Bus ("USB") interface. One or more input devices 1814 may be connected to the interface circuit 1812 for entering data and commands into the main unit 1802. For example, the input device 1814 may be a keyboard, mouse, touch screen, track pad, track ball, isopoint, image sensor, character recognition, barcode scanner, microphone, and/or a speech or voice recognition system.

One or more displays, printers, speakers, and/or other output devices 1816 may also be connected to the main unit 1802 via the interface circuit 1812. The display may be a cathode ray tube ("CRTs"), a liquid crystal display ("LCD"), or any other type of display. The display generates visual displays generated during operation of the device 302, 306, and 308. For example, the display may provide a user interface and may display one or more webpages received from the device 302, 306, and 308. A user interface may include prompts for human input from a user of the devices 302, 306, and 308 including links, buttons, tabs, checkboxes, thumbnails, text fields, drop down boxes, etc., and may provide various outputs in response to the user inputs, such as text, still images, videos, audio, and animations.

One or more storage devices 1818 may also be connected to the main unit 1802 via the interface circuit 1812. For example, a hard drive, CD drive, DVD drive, and/or other storage devices may be connected to the main unit 1802. The storage devices 1818 may store any type of data, such as identifiers, identification codes, registration information, content information, drone sound samples, drone sound signatures, calibration sound samples, calibration sound signatures, media content, image data, video data, audio data, drone information, detection information, or usage data, statistical data, security data, etc., which may be used by the devices 302, 306, and 308.

The computing device 302, 306, and 308 may also exchange data with other network devices 1820 via a connection to a network 1821 (e.g., the Internet) or a wireless transceiver 1822 connected to the network 1821. Network devices 1820 may include one or more servers, which may be used to store certain types of data, and particularly large volumes of data which may be stored in one or more data repository. A server may process or manage any kind of data including databases, programs, files, libraries, identifiers, identification codes, registration information, content information, drone sound samples, drone sound signatures, calibration sound samples, calibration sound signatures, media content, image data, video data, audio data, drone information, detection information, or usage data, statistical data, security data, etc. A server may store and operate various applications relating to receiving, transmitting, processing, and storing the large volumes of data. It should be appreciated that various configurations of one or more servers may be used to support, maintain, or implement the devices 302, 306, and 308 of the environment 300. For example, servers may be operated by various different entities, including operators of the management server 308, drone manufacturers, users, drone detection organizations, service providers, etc. Also, certain data may be stored in one of the devices 302, 306, and 308 which is also stored on a server, either temporarily or permanently, for example in memory 1808 or storage device 1818. The network connection may be any type of network connection, such as an Ethernet connection, digital subscriber line ("DSL"), telephone line, coaxial cable, wireless connection, etc.

Access to the devices 302, 306, and 308 can be controlled by appropriate security software or security measures. An individual third-party client or consumer's access can be defined by the device 302, 306, and 308 and limited to certain data and/or actions. Accordingly, users of the environment 300 may be required to register with one or more computing devices 302, 306, and 308.

Background Noise Embodiment

A common challenge for drone detection is that drones oftentimes operate in environments with differing amounts and types of background noise. For example, a drone detection device 302 of FIG. 3 operating at an airport is subject to certain background noises including aircraft engine noise, support vehicle traffic, automobile traffic, and construction. By comparison, a drone detection device 302 located at a remote prison is subject to different, but still challenging background noises including lawnmower noise, crowd noise, and wildlife noise. In either environment, the drone detection device 302 must detect drones regardless of the background noise. The above description of the drone detection device 302 described in conjunction with FIGS. 3 to 18 focuses primarily on matching a sound signal to a drone sound signature. The section below discloses how drone detection occurs when background noises are considered. Such a configuration enables drones to be detected virtually anywhere regardless of the environment or location of the drone detection device 302.

As disclosed herein, the example drone detection device 302 includes the drone database 326 to store drone sound signatures. As discussed above, the drone sound signatures include known sounds emitted from drones and are classified by drone type, drone model, drone brand, and/or drone flight characteristic. The example database 326 may also include background sound signatures, which, are ambient noises not made by drones. The background sound signatures may include a static component and a dynamic component. In other examples, the background sound signatures may only include a static component or a dynamic component.

As disclosed herein, static background sound signatures are sound signatures that are correlated or related to known defined background noises. Examples include, audio recordings of urban traffic, highway traffic, country road use, rain, wind, snow, storms, vehicles on wet streets, vehicles on dry streets, heavy construction, light construction, industrial activity, commercial settings, prison settings, landscaping, sporting events, concerts, urban rooftops, shooting ranges, small airfields, large airfields, suburban settings, rural settings, farm activity, etc. Within each of these background sound signature types, recordings may be made at different times of day or days of the week. Recordings may also be made at different distances from the source of the sound or under varying circumstances. In some instances, the static background sound signatures may be created during a calibration period when a drone detection device 302 is deployed. Additionally, the static background sound signatures may be periodically created and/or updated based on extended use of the drone detection device 302 in a particular location or sounds recorded by other drone detection devices 302. Further, the management server 308 may provide new static sound signatures and/or update currently stored static background sound signatures.

The dynamic background sound signatures are sound signatures that are recorded in an environment in which a drone detection device 302 has been deployed. For instance, the drone detection device 302 may store to the database 326 all sounds recorded at a location for the past 24 hours in which a drone was not detected. The 24 hours of data provides a baseline of sound at the deployment location. The 24 hours of data also accounts for how sound at a particular location changes throughout the day. In other examples, the sound may be recorded over a 48 hour period, a week period, a month period, etc. The database 326 may be constantly updated such that sound signatures are replaced or modified based on the most recent sounds such that the database 326 accurately reflects the most up-to-date background noise associated with the deployment location. It should be appreciated that the dynamic background may not be associated with any particular sound source (such as a lawn mower) but rather all background noise experienced by the drone detection device 302 at a deployment location.

The example drone detection device 302 is configured to consider background noise in a sound signal by comparing the background sound signatures and the drone sound signatures in the database 326 to a received sound signal. The drone detection device 302 determines a combination or one or more sounds signatures that best approximate a received sound signal. The drone detection device 302 then determines if at least one drone sound signature is included in the combination to determine if a drone has been detected.

In an example, a drone detection device 302 may be deployed at a residence of an individual. At the time a drone approaches, landscapers are working in a neighboring yard. In addition, cars are occasionally driving down the street in front of the residence. As a drone comes into acoustic range, the drone detection device 302 receives sounds signals that include components from the drone (i.e., sound from the drone's rotors in addition to sound components from a lawn mower, traffic in front of the house, and any sound components from nature, such as wind, birds, or insects. Further, overlapping frequencies between the different components may cause attenuation, muting, and/or distortion. The drone detection device 302 is configured to compare sound signatures in the database 326 to the received sound signal. For instance, the drone detection device 302 may determine that a combination of an approaching DJI® Phantom 4™ drone sound signature combined with a dynamic background sound signature created fifteen minutes beforehand and a static background sound signature of light suburban traffic best approximates the received sound signal. The example drone detection device 302 is configured to analyze the combination of drone and background sound signatures that have been determined to best approximate the sound signal to determine if the inclusion of the approaching IMO Phantom 4™ drone sound signature is indicative of a presence of a DJI® Phantom 4™ drone. The drone detection device may also compare the combination of drone and background sound signatures to certain error thresholds and/or signal thresholds to rule out false alarms. An alert may be generated, a beamformer may be activated, and/or countermeasures may be initiated if a drone is detected. Further, other sensors may be used to confirm the presence of a drone. For example, radar, a camera, and/or an RF detector may be activated to confirm the drone detection.

Figure 19:
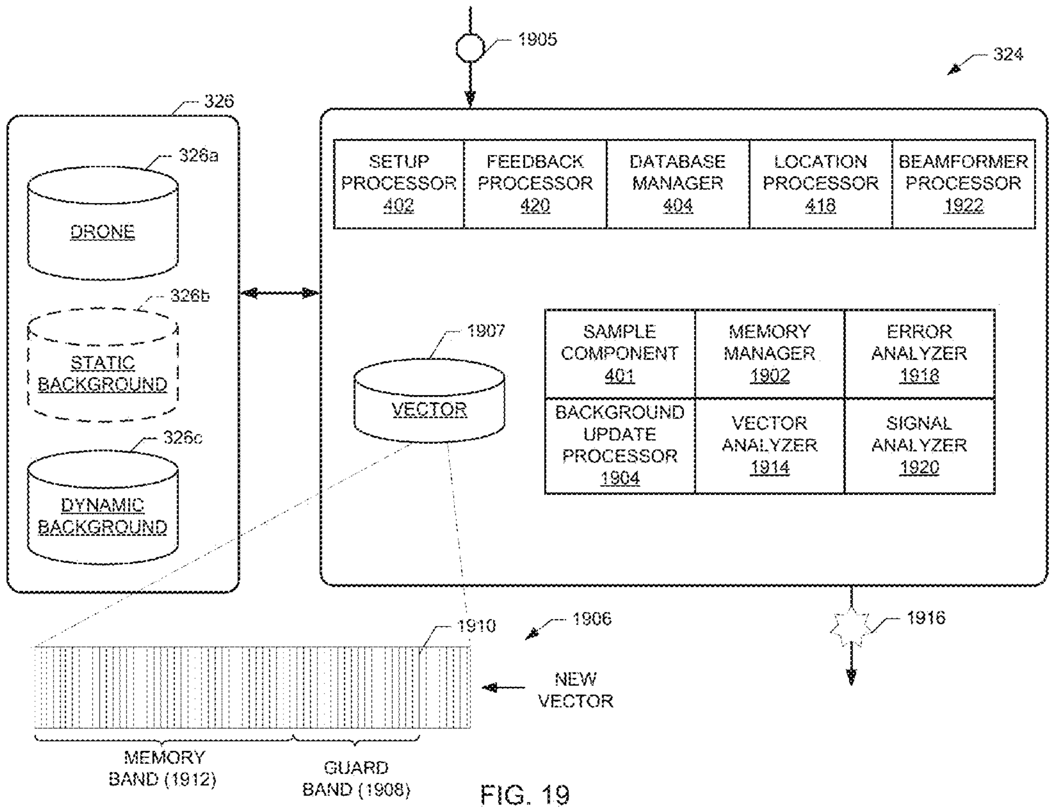
FIG. 19 shows a diagram of the example of the sample processor of FIGS. 3 and 4 configured to consider background noise for drone detection, according to an example embodiment of the present disclosure.

FIG. 19 shows a diagram of the example of the sample processor 324 and database 326 of FIGS. 3 and 4 configured in this embodiment to consider background noise for drone detection. The example sample processor 324 may be included within the drone detection device 302 of FIG. 3. In other examples, the sample processor 324 and/or the database 326 of FIG. 19 may be partitioned between the drone detection device 302 and a distributed or cloud computing environment. For instance, a first portion of the sample processor 324 may convert sound samples into segmented frequency-transformed waveforms while a second portion of the sample processor 324 is configured to execute an NMF algorithm to consider background noises and determine if a drone is present. The first portion may be communicatively coupled to the second portion of the sample processor 324 via any network, such as the Internet and/or a private LAN. Further, a first portion of the database 326 may be located at the drone detection device 302 to store dynamic background sound signatures, which may be transmitted to a remote storage location that stores drone, static background, and dynamic background sound signatures. The following sections describe features of the sample processor 324 and database 326 of FIG. 19.

I. Sound Signature Databases

The example database 326 may be partitioned into at least two different databases. A first database includes a drone database 326*a*, which is configured to store drone sound signatures. As discussed above, drone sound signatures include power spectrums and/or frequency transformations of drone sound samples. For example, the drone database 326 is constructed by operating different types (e.g., models, classes) of drones in an anechoic chamber, a hemi-anechoic, or other environment with minimal background noise. The chamber may include or impose a comb filter artifact to approximate ground reflection. Sound samples are recorded of each drone at different flight characteristics, such as approaching, retreating, hovering, descending, ascending, etc. Each of the flight characteristics may be collected at different altitudes or distances from a microphone, such as 20 feet, 40 feet, and 60 feet. The sound samples are converted into a time-frequency domain and then processed into a power spectral density for a given sample period. At least ten sound signatures may be created for each drone model.

Figure 20:
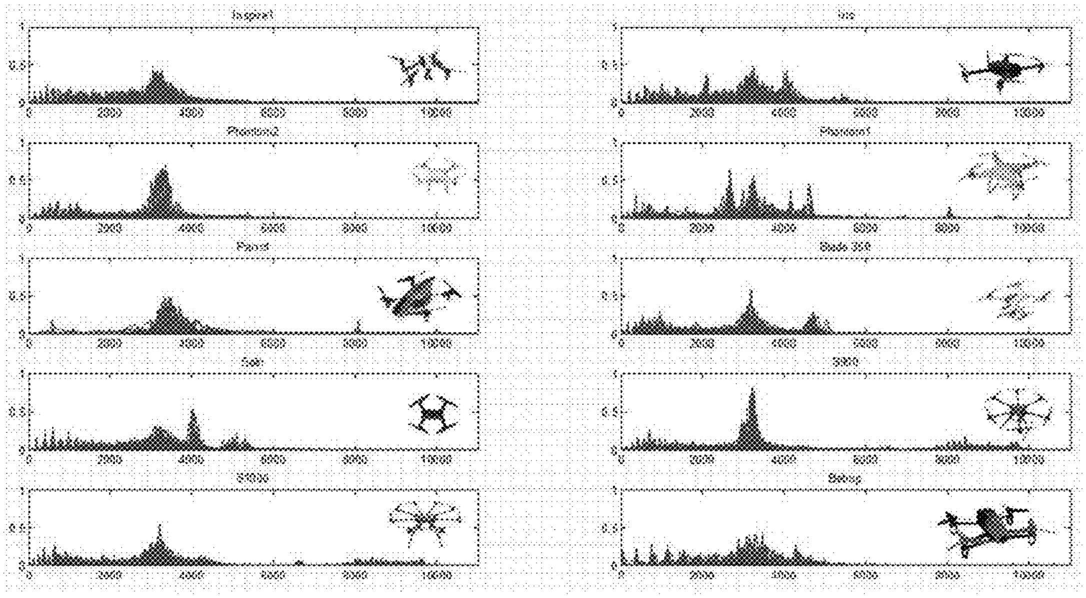
FIGS. 20 and 21 show diagrams of power spectral density graphs that are illustrative of drone sound signatures, according to example embodiments of the present disclosure.
Figure 21:
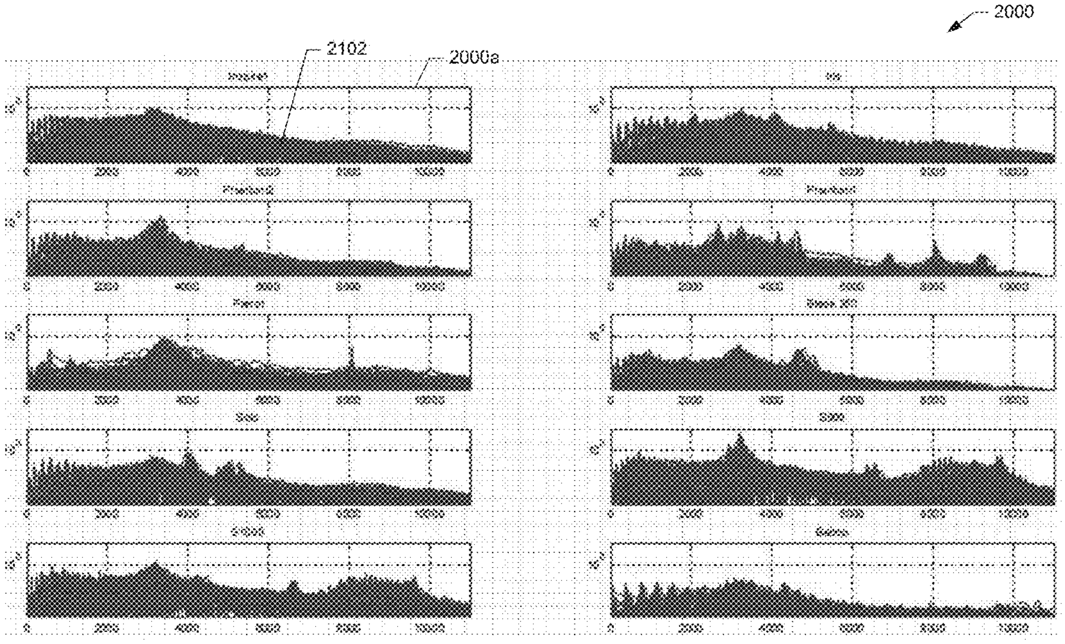

FIGS. 20 and 21 show example power spectral density graphs 2000 that are illustrative of drone sound signatures stored in the database 326*a*. Each of the graphs shows acoustic power of each type or model of drone at different frequencies between 0 Hz and 11 kHz. The dashed line within each graph 2000 shows a moving average of the power at each frequency. For example, dashed line 2102 of FIG. 21 shows the moving average power spectral density for the drone sound signature 2100*a* related to the Inspire1 drone model.

Figure 22:
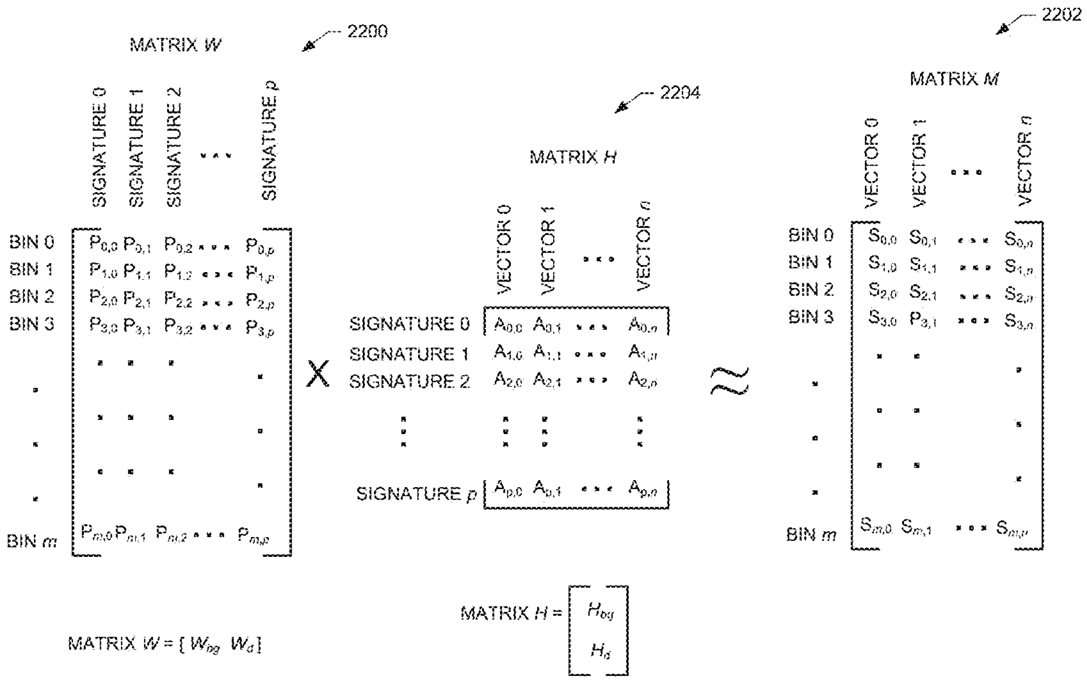
FIG. 22 shows a diagram of an NMF computation performed by the sample processor of FIG. 19 to detect drones while considering background noise, according to an example embodiment of the present disclosure.

The drone sound signatures 2000 may be stored in a signature matrix W 2200 (shown in FIG. 22). Each sound signature is a column within the signature matrix W 2200 and each row corresponds to a frequency bin (between 0 Hz and 11 kHz). The signature matrix W 2200 comprises a drone sound signature component ($W_d$) and a background sound signature component ($W_{bg}$). Each bin within the matrix W 2200 may have a width of 11 Hz, with a total of 1024 bins needed to cover an 11 kHz range. In this example, the matrix W 2200 is an m×p matrix, where m is a total number of frequency bins (e.g., 1024 bins) and p is a total number of drone sound signatures. Each bin may include a moving average of the power, as shown in to dashed line 2102 of FIG. 21. Each bin may alternatively include an average or median power for all frequencies included within the bin. In yet alternative examples, each bin may include a max power for all frequencies included within the bin. It should be appreciated that given over 50 different drone models, with over 30 flight characteristics for each, the number of drone sound signatures stored in the signature matrix W 2200 may be over 1,500. This number does not even include sound signatures for the background component ($W_{bg}$), which is discussed below.

Each entry within the signature matrix W 2200 specifies a power ($P_{i,j}$) of the respective sound signature at the respective frequency bin. The power is based on a decibel or amplitude value of a sound sample at a particular frequency. In some instances, the power density value for each entry is normalized between 0 and 1 or 0 and 10 to improve computational efficiency. A value at the low end of the range (e.g., 0) for a particular frequency bin indicates that the particular drone model does not produce sound at that frequency when operating in a specific flight characteristic. In contrast, a value at a mid-point or high end of the range indicates that the particular drone model, operating in the specific flight characteristic, produces noise at that frequency. In the example of FIG. 22, Signature 1 corresponds to a drone sound signature 2000 of the Phantom 2™ drone operating in a hover mode at 40 feet off the ground. Bin 0 may include a 0, indicative that the Phantom 2™ drone does not emit sound at a frequency between 0 and 11 Hz when hovering at 40 feet. In contrast, Bin 1 may include a 0.75 value, indicative that the Phantom 2™ drone emits sound at a frequency between 12 and 22 Hz when hovering at 40 feet.

The example drone sound signatures 2000 may also be associated with or stored in conjunction with metadata that provides information regarding an origination of the sound. For example, metadata may specify a drone model, a drone class, a drone brand, and/or a flight characteristic. The metadata may also include a timestamp that specifies when the signature was created. The metadata may further indicate environmental conditions when the signature was recorded. At least some of the metadata may be used to classify or identify a detected drone.

In addition to the drone database 326*a*, the example database 326 may include a static background database 326*b* and/or a dynamic background database 326*c*. The static background database 326*b* is configured to store static background sound signatures. By comparison, the dynamic background database 326*c* is configured to store dynamic background sound signatures. The static and dynamic background sound signatures are stored or otherwise used within the signature matrix W 2200 of FIG. 22 as the background component ($W_{bg}$).

The static background sound signatures may be created by placing a microphone in certain locations that are representative of different types of background noise. In this sense, the static background sound signatures may be generic for any drone detection device 302. For example, a static background sound signature may include noise from a lawn mower. Another static background sound signature may include an approaching car on dry pavement. In other instances, the static background sound signatures may include background clutter sources derived from data (or sample sound signals) collected over an extended background survey period or calibration period. In other words, the static background sound signatures are created after the drone detection device 302 is deployed. In these instances, the static background sound signatures represent historical or typical background noise at a deployment location. In some instances, the static background sound signatures may include a combination of generic background noise and location-specific background noise.

In some examples, static background sound signatures may be created upon detection of a unique acoustic event. For example, the sample processor 324 samples or continuously analyzes sound samples to create frequency-based power spectrums. The sample processor 324 may compare more recent spectrums to a moving average of past power spectrums to determine an acoustic change in the environment. For example, a low-flying aircraft may provide a sudden power spike in a number of frequency bins compared to previous background noise. The sample processor 324 detects this sudden change in background noise and accordingly creates one or more static background sound signatures based on this unique acoustic noise source.

The dynamic background sound signatures are created and/or updated based on sound samples collected from a more recent past at a deployment location of a drone detection device 302. For instance, previous dynamic and/or static background sound signatures may be updated based on recently detected background noise. Additionally or alternatively, dynamic background sound signatures may be newly created based on recently detected background noise. Updated or newly created dynamic background sound signatures represent sound samples collected over a previous 24-hour time period. In addition, updated and/or newly created dynamic background sound signatures represent background noise at a deployment location right before a drone is detected. In other words, the updated or newly created dynamic background sound signatures provide a baseline of background noise just before a drone is detected when it is known that no drone is present. The dynamic background sound signatures may be created on a rolling basis such that the stored sound signatures are updated as newer sound samples are recorded and older sound samples are discarded.

The example sample processor 324 is configured to use a combination of dynamic and static background sound signatures to account for changes in background noise that occur during detection of a drone. In other words, the use of static background sound signatures provides a fallback in instances where more recent dynamic background sound signatures to not consider or do not have data for an acoustic situation during a drone detection. For example, using the landscaping example, the static background database **326*b* may include sound signatures of lawn mowers, leaf blowers, and trimmers from a previous week or month. During a drone detection, the landscapers may begin their work. However, since the landscapers have just arrived for the week, the dynamic background database 326*c* does not include (and has not been updated to reflect) sound signatures with the landscapers present. The example sample processor 324 uses the landscaping background sound signatures in the static database 326*b*** to account for the landscaping background noise during the drone detection.

The example background databases **326*b* and 326*c* may store hundreds to thousands of different background sounds signatures. For example, the sample processor 324 may create a dynamic background sound signature every 0.1 seconds, 0.5 seconds, 1 second, 2 seconds, 10 seconds, etc., which may be stored for 24-hours on a rolling basis. If a signature is created every 0.1 seconds, this would create 864,000 dynamic background signatures for a single day. Alternatively, the background databases 326*b* and 326*c* may be initially populated with a defined number of background sound signatures, such as 500, 1,000, 5,000, 50,000, etc. For instance, hundreds to thousands of static and/or dynamic background sound signatures may be initially created to account for different noise sources and how noises change as a position or orientation of the noise sources change with respect to a stationary microphone. After deployment and/or calibration, the sample processor 324 maintains the same number of sound signatures but updates the dynamic background sound signatures based on most recently detected background noise (without a drone component). The matrix W 2200 of FIG. 22** may accordingly include thousands to hundreds of thousands of background sound signatures.

II. Background Sound Signature Creation/Updating

The example sample processor 324 of FIG. 19 includes a memory manager 1902 and a background update processor 1904 configured to create and/r update static and/or dynamic sound signatures. The following section describes how background sound signatures are created and/or updated by the sample processor 324. However, it should be appreciated, that in some instances, the sample processor 324 may receive background and/or drone sound signatures from other drone detection devices 302 and/or the management server 308 of FIG. 3.

As mentioned above, the sample processor 324 is configured to create background sound signatures from background noise when it is known that no drone is present. The example memory manager 1902 is configured to process received sound signals 1905 into samples and operate a routine that determines which samples are to used to update and/or create background sound signatures. The example memory manager 1902 operates in conjunction with the sample component 401 (described in conjunction with FIG. 4), which processes sound signals into frequency-based power spectrums (e.g., sample vectors or sample power spectrum density vectors).

The frequency processor 406 of the component 401 is configured to receive digitized sound samples 1905 from a sound card 322. The samples may have a duration between 0.5 seconds and 30 seconds, but preferably, 1 second. The frequency processor 406 splits or otherwise partitions the digital sound sample 1905 into, for example, ten equal-sized non-overlapping 0.1 second segments. The frequency processor 406 performs a time-frequency transformation (e.g., an FFT transformation or a Short Time Fourier Transform ("STFT")) on each of the segments to create sample time-frequency spectrums. The frequency processor 406 also determines a power spectral density for each sample time-frequency spectrum to create a power spectral density vector (e.g., sample vector) for each segment. The frequency processor 406 may determine the power spectral density vector by computing an absolute power over a frequency range for a respective time-frequency segment. The power spectral density vectors are similar to the frequency amplitude vector 800 of FIG. 8. In some instances, the sample component 401 may include the filter 408 to remove systemic noise from the sample vectors.

In some embodiments, the frequency processor 406 of the component 401 is configured to apply a symmetric weighting function to sound samples to create a predetermined number of sound segments. For instance, a one second sound sample may be partitioned into 7,500 sample points. In this instance, the weighing function includes 200 sample points. The frequency processor 406 may be configured to apply the weighting function every 75 sample points. The result is approximately 100 estimates or segments of the sound sample every second. It should be appreciated that the segments overlap since the weighing function includes 200 sample points which is applied every 75 sample points. The frequency processor 406 performs a time-frequency and power spectral density transformation on each of the segments to determine respective sample vectors.

Figure 23:
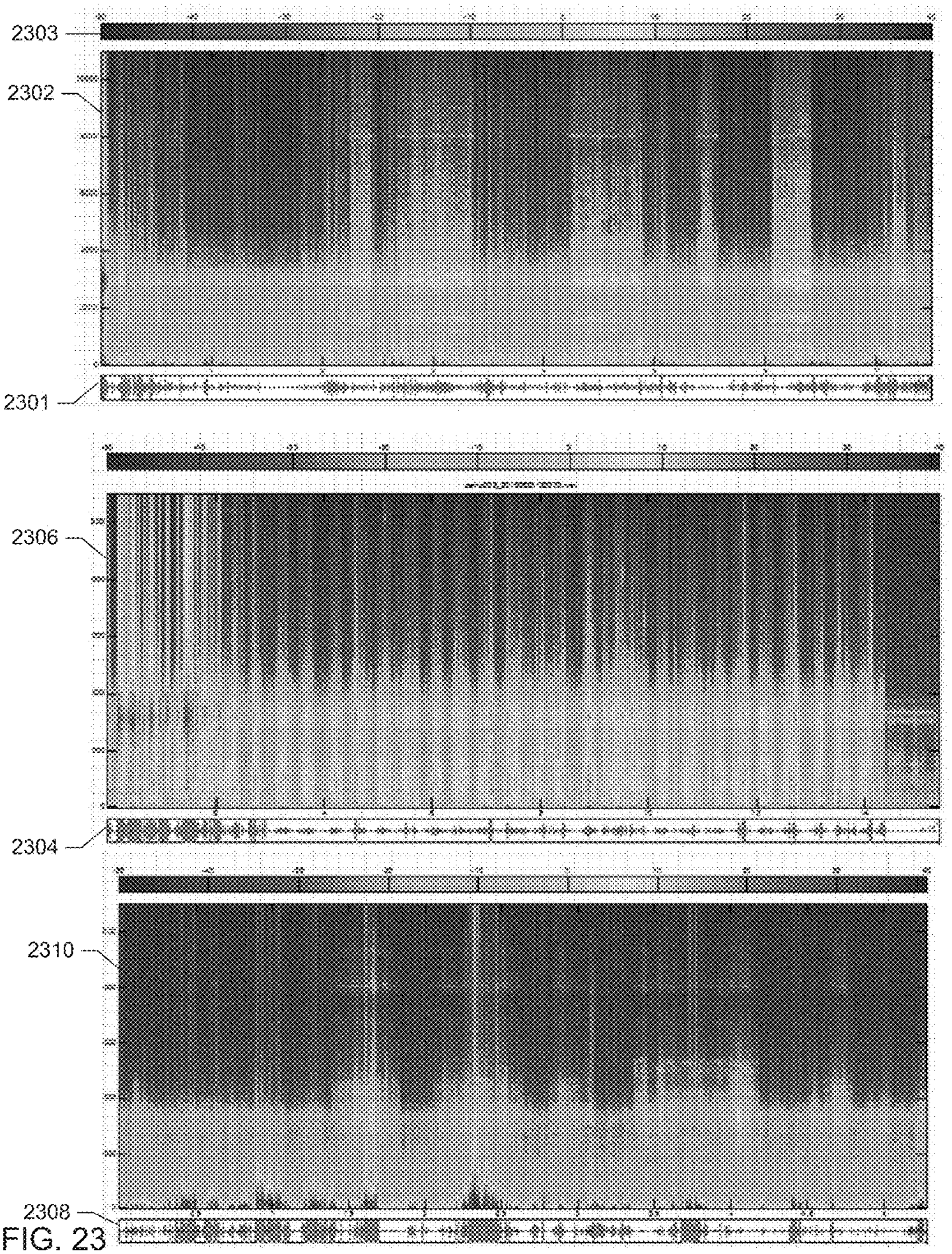
FIG. 23 shows diagrams illustrative of digital sound sample processing that may be carried out by the sample processor of FIG. 19, according to an example embodiment of the present disclosure.

FIG. 23 shows diagrams illustrative of digital sound sample processing that may be carried out by the frequency processor 406, according to an example embodiment of the present disclosure. Graph 2301 shows a digitized sound sample recorded over 71 minutes at an industrial site. The frequency processor 406 performs a frequency transformation and power spectral density determination on the digital sound sample in graph 2301 to create a time-series power spectral density spectrum 2302. Scale 2303 provides a legend of the power value shown in the spectrum 2302, where power in decibels is denoted by different line hashing. As shown in FIG. 23, the power spectral density spectrum 2303 ranges from −50 dB to 40 dB across frequencies between 0 Hz and 11 kHz. The frequency processor 406 creates sample vectors of the spectrum 2303 by selecting a segment having a predefined duration, such as 0.1 seconds. The frequency processor 406 plots the power over the different frequencies for the 0.1 second segment. The plot of power in relation to frequency for a segment is the power spectral density vector. The 7.5 second sample may be partitioned into 75 non-overlapping segments to create 75 power spectral density vectors. Alternatively, the 7.5 second sample may be partitioned into partially overlapping segments to create more than 75 power spectral density vectors.

In addition to the digitized sound sample 2301 of the industrial site, FIG. 23 includes a digitized sound sample 2304 of landscaping at a residence. The sound sample 2304 has a duration of 117 minutes and includes noise from a string trimmer, lawn mower, and leaf blower. The frequency processor 406 creates a time-series power spectral density spectrum 2306 based on the sound sample 2304. Further, FIG. 23 includes a digitized sound sample 2308 of a prison site. The sound sample 2306 has a duration of 55 minutes and includes noise from wind, activity in a courtyard, and light traffic on a nearby road. The frequency processor 406 creates a time-series power spectral density spectrum 2310 based on the sound sample 2308.

The time-series spectrums 2302, 2306, and 2310 of FIG. 23 illustrate the differences in frequency and power at different physical locations. Each of the power density spectrums 2302, 2306, and 2310 contain differences during the sampling period based on when certain noise sources were present. The background update processor 1904 of the sample processor 324 is accordingly configured to record numerous samples of background noise to provide adequate consideration for all possible sources of noise at a specific location.

It should be appreciated that FIG. 23 provides an illustration of the processing and may not reflect an order of operations executed by the frequency processor 406 to create power spectral density vectors. For example, FIG. 23 shows a frequency transformation and power determination being performed on an entire 71 minute sound sample 2301 before segmenting into sample vectors. However, in other examples, a sound sample is partitioned or segmented before a frequency transformation is performed.

The frequency processor 406 of the component 401 of FIG. 19 creates continuous or periodic frequency-based power spectrums (and segmented sample vectors of the spectrum) of noises detected by one or more microphones 320. The example memory manager 1902 is configured to manage the storage of each of the power spectral density vectors to determine which, if any, are to be copied to the dynamic background database 326*c* and/or used to update dynamic sound signatures stored in the database 326*c*. FIG. 19 shows a memory block 1906 that illustrates how the memory manager 1902 processes sample vectors. The memory block 1906 may be included within the sample processor 324 or included within a temporary vector memory 1907. In some instances, the memory block 1906 may be embodied within the dynamic background database 326*c*. The memory manager 1902 is configured to store new or most recently created power spectral density vectors to a right side of the block 1906 while at the same time removing old vectors at a left side of the block. The memory block 1906 comprises a predetermined number of sample vectors or vectors received over a defined time period. For instance, the memory block 1906 may represent 10 minutes, 20 minutes, 45 minutes, 60 minutes, 2 hours, 4 hours, 10 hours, etc. of most recently received sound samples. Each new sample vector added corresponds to a power spectral density vector of a defined time segment of a sound sample.

Any acoustic environment is typically characterized well in the short term by a finite number of noise sources. However, in the mid-to-long term, additional noise sources not in the original set frequently contribute to the acoustic environment. The example memory manager 1902 is configured to update the dynamic background database 326*c* to keep up with a changing acoustic environment with mechanisms in place to prevent the accidental incorporation of drone sounds. Specifically, the memory manager 1902 is configured to refrain from using power spectral density vectors that are believed to include a drone component in the creation and/or updating of background sound signatures in the background database 326*c*. The memory manager 1902 uses a guard band 1908 within the memory block 1906 to prevent the accidental inclusion of drone sounds in the dynamic background database 326*c*.

In an example, the memory manager 1902 selects sample vector 1910, located right before the guard band 1908, for drone detection processing (described below in more detail). After selecting the sample vector 1910, the memory manager 1902 checks memory band 1912 for any sample vectors that are indicative of a drone detection. If the sample vectors within the memory band 1912 do not include drone components, the memory manager 1902 uses the sample vectors in the memory band 1912 to update or amend dynamic background sound signatures within the database 326*c*. For example, the database 326*c* may include thousands of previously recorded background sound signatures. The background update processor 1904 uses most recent sample vectors of background sound samples (free of drone components) to update or amend the background sound signatures to reflect the most current background environment at the deployment location. Using the sample vectors in the memory band 1912 to update drone sound signatures is discussed in more detail below in conjunction with the background update processor 1904.

After updating the dynamic background signatures, the memory manager 1902 causes the sample vector 1910 to be included within an analysis to determine if a drone is present. As discussed in more detail below, the sample vector 1910 is compared to the drone and background sound signatures in the matrix W 2200 of FIG. 22. If it determined that a drone is present, the memory manager 1902 associates the sample vector 1910 with a drone detection. For instance, the memory manager 1902 may set a drone detection flag within metadata related to the sample vector 1910. Additionally or alternatively, the memory manager 1902 may store classification information within the metadata. If no drone is detected, the memory manager 1902 refrains from indicating that the sample vector 1910 is associated with a drone. In some instances, the memory manager 1902 may set a non-detection flag within the metadata.

After drone detection analysis, the example memory manager 1902 moves the sample vector 1910 into the guard band 1908. The movement into the guard band 1908 occurs regardless of a drone detection. The memory manager 1902 then processes the next sample vector behind the vector 1910 to determine if the background sound signatures are to be updated and/or to determine if a drone is present. The memory manager 1902 continues processing sample vectors, which causes the sample vector 1910 to move left through the guard band 1908. Typically, the guard band 1908 is configured to have a duration between 1 minute and 20 minutes, which may correspond to 10 to 12000 sample vectors, depending on sampling rate and segment length.

After a time period, the sample vector 1910 moves left into the memory band 1912, shown within the memory block 1906. At this point, the sample vector 1910 is used to update the dynamic background sound signatures (if a drone has not yet been detected) when a sample vector located to the right of the guard band 1908 is processed. The sample vector 1910 is retained within the memory band 1912 and continues to be pushed left as sample power spectral density vectors are created from new sound samples. Eventually, the sample vector 1910 reaches the end of the memory band 1912, where it is then discarded. If the sample vector 1910 does include a drone component (or includes background noise saturated by loud ambient noise), the presence of the sample vector 1910 in the memory band 1912 prevents the background sound signatures from being updated when newer sample vectors located before the guard band 1908 are processed. Instead, the newer sample vectors are analyzed to determine drone and background components.

In alternative embodiments, only a portion or subset of the sample vectors in the memory band 1912 that are proximate to the sample vector 1910 are ignored when updating background sound signatures. For instance, the memory manager 1902 may identify sample vectors that are within +/− one minute of the sample vector 1910 that includes a drone component. The memory manager 1902 removes these identified sample vectors from being considered by the background update processor 1904 to update background sound signatures. Accordingly, background sound signatures are still updated using a portion of the sample vectors in the memory band 1912 that are temporally far enough from the sample vector 1910 with the drone component.

In some embodiments, if the sample vector 1910 does not contain a drone component, the memory manager 1902 copies and stores the sample vector 1910 as a background sound signature to the dynamic background database 326*c*. In this manner, the memory manager 1902 increases the number of dynamic background sound signatures within the database 326*c*. Oftentimes at startup or a reboot, the memory manager 1902 copies at least some of the sample vectors without drone components to the database 326*c* until, for example, 4096 dynamic background sound signatures are stored.

In some examples, the memory manager 1902 may select certain sample vectors from the memory band 1912 and/or the database 426*c* for more permanent storage in the static background database 426*b* as a static background sound signature. For example, the memory manager 1902 may compare the dynamic background sound signatures for instances of large power densities (e.g., significant noise) at different frequencies. In another example, the memory manager 1902 may track activations over time for the static and/or dynamic background sound signatures. In this other example, the memory manager 1902 replaces static sound signatures with a relatively low number of activations with dynamic background sound signatures with a relatively large number of activations. For either of the examples, the memory manager 1902 may copy the sound signatures for inclusion in the static background database 426*b*. Additionally or alternatively, the memory manager 1902 may be configured to randomly and/or periodically copy dynamic background sound signatures for storage as static background sound signatures.

As discussed above, the background update processor 1904 may dynamically adjust background sound signatures in the database 426*c* based on the power spectral density vectors within the memory band 1912 and/or newly received sample vectors. In these examples, the number of dynamic background sounds signatures is fixed at, for example, 4096 background sound signatures. The background update processor 1904 is configured to use an NMF algorithm to update the 4096 background sound signatures to best approximate sound samples known to be absent of drone components. It should be appreciated that the drone sound signatures are not included in the update.

As discussed in more detail below, the sample processor 324 performs drone detection by solving for activation matrix H below in equation (1), which is indicative of which drone or sound signatures are present in a sound sample. Matrix W from equation (1) includes drone and background sound signatures, similar to matrix W 2200 of FIG. 22. Matrix M from equation (1) (shown as sample matrix M 2202 of FIG. 22) corresponds to a number of sample vectors related to a sound sample and can include, for example, the sample vectors located within the memory band 1912 of FIG. 19. Matrix W includes two components (drone component ($W_d$) and background component ($W_{bg}$), as shown in equation (2). In addition, activation matrix H (shown as matrix H 2204 of FIG. 22) includes two components (drone sound signature activation component ($H_d$) and background sound signature activation component ($H_{bg}$), as shown in equation (3).

$$W * H \approx M \tag{1}$$

$$W = [\, W_d \quad W_{bg} \,] \tag{2}$$

$$H = \begin{bmatrix} H_d \\ H_{bg} \end{bmatrix} \tag{3}$$

The example background update processor 1904 is configured to update dynamic background sound signatures by only using the background components such that:

$$W_{bg}/H_{bg} \approx M \tag{4}$$

In equation (4), as discussed above, during a background sound signature update, it is known in advance that a drone component is not present in matrix M. The example background update processor 1904 accordingly solves for some combination of $W_{bg}$ and $H_{bg}$ that will most resemble or approximate the sample vectors in matrix M. The background update processor 1904 may select any number of power spectral density vectors from one or more sound samples for the matrix M. For example, the background update processor 1904 may select only one sample vector, which means matrix M will only have one column. In this example, the background update processor 1904 determines which updates of background sound signatures and/or combinations background sound signatures and activations most closely match the single sample vector. In other examples, the background update processor 1904 may select two or more sample vectors, preferably between 10 and 4096 vectors or the number of sample vectors in the memory band 1912. In some instances, the background update processor 1904 is configured to select at least 1×, 1.5×, 2×, 4×, etc. as many sample vectors as background sound signatures. It should be appreciated that the use of more sample vectors generates a better average among the background sound signatures. Otherwise, if only a single sample vector (or a few sample vectors) is considered, the most closely matching sound signatures may be over adjusted to match the sample vector, which could create issues if the sample vector is an outlier.

As disclosed in more detail below, activations in matrix H specify a contribution of a sound signature to a power spectral density vector (e.g., sample vector). For example, an i-th row and j-th column of activation matrix H specifies a contribution of the background sound signature at the i-th column of the matrix W for the power spectral density vector at the j-th column of matrix M. Each entry in the activation matrix H accordingly provides a value regarding how well a sound signature matches a sample vector.

In some embodiments, the values of the entries of activation matrix H may be normalized between '0' and '1', '1' and '10', etc. to reduce computational resources needed to process the matrix. A value of '0' in an entry of activation matrix H may be indicative that a sound signature does not comprise or match a sampled power spectral density vector. In contrast, a value of '1' indicates that the sound signature matches the power spectral density vector. In other words, a value of '1' means that the sample vector and the sound signature have almost matching power or decibel levels throughout the frequency range or for a predetermined number of frequency bins. A value of '0.5' indicates that there is at least a partial match between the sound signature and the sample vector.

In other embodiments, the values of the entries of matrix W are normalized between '0' and '1', '1' and '10', etc. In these embodiments, the background update processor 1904 holds the entries of matrix W fixed while solving for matrix H using equation (6) below. Normalization of matrix W enables the entries of activation matrix H to be free to scale based on the values in the respective entries of the sample matrix M. The scaled values of matrix H may then be used to adjust one or more of the background sound signatures of matrix W.

The example background update processor 1904 is configured to use an NMF algorithm due to the inherent non-negativity of frequency content of a sound signal. Specifically, a noise source has a non-negative spectrum. If noise is present in an acoustic sound sample, the noise will contribute to the overall sample with a positive amplitude (with little or no noise cancellation). NMF algorithms require that all entries of the matrices involved in the factorization have a value that is greater than or equal to zero to satisfy a non-negativity constraint. The use of the non-negativity constraint enhances the noise source separation capability of factorization, thereby improving noise source isolation and drone detection.

The example NMF algorithm operated by the background update processor 1904 is configured to operate according to the following equation (5):

$$W, H = \min_{W,H} D(M \mid WH) \tag{5}$$

In equation (5), background update processor 1904 is configured to optimize a linear combination of background sound signatures to approximate or match one or more power spectral density vectors. D is typically the β-divergence, which corresponds to a cost function that measures a difference between a linear combination of sound signatures and a sample vector. For instance, β is a real number that changes how function D of equation (5) measures a difference between matrices M and WH. A value of '2' for β corresponds to a Euclidean distance, a value of '1' for β corresponds to a Kullback-Leibler divergence, and a value of '0' for β corresponds to a Euclidean distance. Solving for equation (5) includes specifying a stopping criterion such as a maximum number of iterations or acceptable D-value. The example background update processor 1904 is configured to iteratively use the NMF algorithm specified by equations (6) and (7) below to alternate updates between the background sound signatures in matrix W and activations in matrix H. During the iterative procedure, the background update processor 1904 is configured to preserve the non-negativity constraint.

$$H \leftarrow H \otimes \frac{W^T(M \otimes \Lambda^{\beta-2})}{W^T\Lambda^{\beta-1}} \tag{6}$$

$$W \leftarrow W \otimes \frac{(\Lambda^{\beta-2} \otimes M)H^T}{\Lambda^{\beta-1}H^T} \tag{7}$$

In equations (6) and (7), T denotes a matrix transpose and Λ:=WH. It should be appreciated that exponents, division operations, and multiplication operations of equations (6) and (7) are applied per sound signature and/or sample vector (e.g., element-wise). During a first iteration, the background update processor 1904 is configured to hold the background sound signatures fixed in matrix W and determine which background sound signatures in matrix W most closely match the sample vectors in matrix M using equation (6). The matching or approximation data is stored in activation matrix H. Then, the background update processor 1904 uses equation (7) to update the background sound signatures based on the activations to more closely match the sample vectors in matrix M. For example, sound signatures that are not activated are not modified are updated. In contrast, sounds signatures that correspond to high activation values may be adjusted to increase or decrease power by an amount of the activation value in the respective entry. For example, an entry in matrix H with an activation value of '0.9' may cause the power of a sound signature to be increased by 10% (in some or all of the bins) to more closely match the power in the sample vector.

In a second iteration, the background update processor 1904 is configured to hold the background sound signatures fixed again and determine which background sound signatures in matrix W most closely match the sample vectors in matrix M using equation (6). The matching or approximation data is stored in activation matrix H. Then, the background update processor 1904 uses equation (7) again to update the background sound signatures based on the activations to more closely match the sample vectors in matrix M. Each successive iteration causes the background sound signatures to more closely match the sample power spectral density vectors related to recorded background sound samples. The background update processor 1904 may perform a predetermined number of iterations, such as two, five, ten, etc. or continue until another stopping criterion is met, such as an acceptable value for the divergence.

It should be appreciated that different combinations of background sound signatures may be used to match different sample vectors. For example, the addition of a lawn mower noise source in a small subset of the sample vectors in matrix M may cause different background sound signatures to be activated only for those vectors. In addition, it should be appreciated that the above-described process to update dynamic background sound signatures occurs as long as none of the sample vectors within the memory band 1912 include a drone component (or loud ambient noise component). This means that the background update processor 1904 may execute the signature update process every time a new power spectral density vector is added to the memory block 1906 (as long as the memory band 1912 is free of drone components or the drone components can be isolated in small sets). In other examples, the background sound signature update may occur after a predetermined amount of time (e.g., 5 minutes) or after a defined amount of movement within the memory band 1912. For example, an update may occur after vectors have moved right ¼ or ½ of a length of the memory band 1912.

After updating the background sound signatures, the background update processor 1904 is configured to temporarily fix the dynamic background sound signatures for drone detection. At this point, a vector analyzer 1914 is configured to determine if a combination of the locked dynamic background sound signatures (and/or the static background sound signatures) and the drone sound signatures matches or approximates one or more received power spectral density vectors. The background update processor 1904 may transmit a message to the vector analyzer 1914 indicative that the background sound signatures have been updated.

III. Sound Signature Activation

The example vector analyzer 1914 of FIG. 19 is configured to process one or more power spectral density vectors (e.g., sample vectors) to determine the presence of background noise components and/or drone components. The vector analyzer 1914 is configured to compare background sound signatures within the databases 326*b* and/or 326*c* and drone sound signatures within the database 326*a* to determine which combination of sound signatures most closely match or approximate one or more power spectral density vectors, or more generally, a power spectral density spectrum. The example vector analyzer 1914 may execute one or more algorithms and/or routines to determine which sound signatures in combination match or approximate one or more sample vectors. For instance, as described in more detail below, the vector analyzer 1914 may use an NMF algorithm. In other embodiments, the vector analyzer 1914 may perform a sum-of-squares or least squares regression analysis to determine which of the sound signatures have minimal power differences between certain groups of frequency bins. In yet other embodiments, the vector analyzer 1914 may use a Naive Bayes algorithm where the sound signatures are used as training classifiers. In any of these algorithms, a sparsity parameter or minimization constraint may be implemented that specifies that an optimal solution is to use as few sound signatures as possible.

Regarding an NMF algorithm, the example vector analyzer 1914 is configured to fix or hold constant the background noise component ($W_{bg}$) of the Matrix W 2200. In addition, the vector analyzer 1914 combines the background noise component ($W_{bb}$) with the drone component ($W_d$) to create a complete matrix W having m rows and p columns, as shown in FIG. 22. Each of the rows corresponds to a different frequency bin while each of the columns represents one drone or background sound signature. Each entry in the matrix W represents a normalized power spectral density value (Pi,j) for the respective sound signature at the corresponding frequency.

The example vector analyzer 1914 also creates the sample matrix M 2202 using, for example, the power spectral density vectors within the memory band 1912 and/or the guard band 1908. The vector analyzer 1914 may also include the sample vector 1910 directly to the right of the guard band, as shown in FIG. 19. The sample matrix M 2202 has in rows and n columns, as shown in FIG. 22. Each of the rows corresponds to a different frequency bin while each of the columns represents one of the power spectral density vectors (e.g., sample vectors). The frequency bins in the sample matrix M are the same as the frequency bins of matrix W. Each entry in the matrix M represents a power spectral density value (Si,j) for the respective sample vector at the corresponding frequency bin.

The example vector analyzer 1914 uses the NMF algorithm and known matrices W 2200 and M 2202 to solve for the activation matrix H 2204, shown in FIG. 22. In one example, the NMF algorithm may include equation (8) below.

$$H \leftarrow H \otimes \frac{W^T(M \otimes \Lambda^{\beta-2})}{W^T\Lambda^{\beta-1} + \mu} \tag{8}$$

Equation (8) is similar to equation (7) with the addition of μ, which is a sparsity parameter. In some examples, the sparsity parameter μ is greater than or equal to '0', which encourages or forces the NMF algorithm to determine a sparse solution where as few sound signatures as possible are selected or activated to model, match, or approximate the power spectral density vectors in the sample matrix M 2202. Sparse solutions discourage or prevent the NMF algorithm from approximating sample vectors using a complex combination of sound signatures, which may lead to detection errors. Further, this prevents the NMF algorithm from approximating new, unknown sources with a convoluted and complex combination of known sound sources.

FIG. 22 shows an example of the activation matrix H 2204, which has p rows and n columns. Each of the rows represents an estimated contribution of one drone or background sound signature for each of the n power spectral density vectors in matrix M 2202. Each of the columns of the activation matrix H 2204 represents an estimated contribution of all p sound signatures in the matrix W 2200 to a particular power spectral density vector in the matrix M 2202. The vector analyzer 1914 is configured to size the activation matrix H 2204 based on the p columns from matrix W 2200 and the n columns of the sample matrix M 2202. Accordingly, the vector analyzer 1914 enables any number of sample vectors to be analyzed at one time.

Each entry in the activation matrix H 2204 (Ai,j) provides an activation indication, which may include any scalar or decimal number. The activation indication specifies how much a sound signature is estimated to contribute to a power spectral density vector across all or some of the frequency bins. A lower value indicates that there is a poor match, and there little or no activation. A higher value indicates that there is a good match where there is significant activation.

In the example, entry $A_{2,1}$ of the activation matrix H 2202 of FIG. 22 corresponds to Sound Signature 2 and Vector 1. A value within the entry $A_{2,1}$ specifies how well the Sound Signature 2 matches Vector 1 (e.g., Sample Vector 1). To determine how well Sound Signature 2 matches Vector 1, the vector analyzer 1914 is configured to determine a difference between the power of the Sound Signature 2 and Vector 1 at each frequency bin. For example, the vector analyzer 1914 determines a difference in power between $P_{0,2}$ and $S_{0,1}$ for Bin 0, a difference in power between $P_{1,2}$ and $S_{1,1}$ for Bin 1 and so on. The vector analyzer 1914 may sum or otherwise compile the differences at each frequency bin to determine a total difference. In some examples, the vector analyzer 1914 may perform a regression analysis or least squares routine across some or all of the frequency bins to quantify a difference between a sound signature and a sample vector. The vector analyzer 1914 may scale the total difference to an activation value, where greater differences generate lower activation values.

In some instances, the vector analyzer 1914 may only analyze bins where a power is greater than a threshold. Such a configuration reduces the comparison to frequency bins where there are power spikes (or at least power above a noise floor), rather than consider low level noise throughout the entire frequency spectrum. In these instances, the vector analyzer 1914 first identifies which of the bins of the Sound Signature 2 and/or Vector 1 have powers above a predetermined threshold (e.g., −20 dB, −15 dB, −10 dB, 0 dB, etc.). The vector analyzer 1914 then determines differences between the corresponding identified bins of Sound Signature 2 and Vector 1. It should be appreciated that comparing only peaks or power above a noise floor more closely aligns the activation number to how well peaks match between sound signatures and vectors. In some instances, the entire frequency spectrum may be analyzed, however, more weight may be applied based on power value in the entry of Matrix W 2200 or Matrix M 2202. For instance, the vector analyzer 1914 assigns greater weights to entries with greater powers when determining differences.

In some embodiments, each entry within the activation matrix H 2204 may comprise an array of activation values for each frequency bin. For example, each entry of the activation matrix H 2202 may contain an array that has a length of m. Each element of the array corresponds to a difference between the corresponding frequency bins. For instance, a first element of an array for entry $A_{2,1}$ of matrix H 2202 includes a difference value between $P_{0,2}$ of matrix W 2200 and $S_{0,1}$ of matrix M 2202. Each of the elements may be combined to determine an overall activation value. Alternatively, each of the elements may be further processed to determine which portions of sound signatures are activated. The vector analyzer 1914 may indicate a sound signature is activated if the activated portions correspond to frequency peaks and/or sounds above a noise floor.

The example vector analyzer 1914 is also configured to select or determine activation values such that a minimal number of sound signatures are used to approximate or match the sample vectors. In some instances, the vector analyzer 1914 compares the differences in frequency bins between the different sound signatures for each vector. For each bin, or bins within a frequency range, the vector analyzer 1914 is configured to select which sound signature most closely matches or contributes to the sample vector. The vector analyzer 1914 retains the activation value for the selected sound signature while decreasing the value (or setting to '0') the activation value for the sound signatures that do not match as well. For example, the matrix W 2200 may contain 15 sound signatures that include a lawn mower. The vector analyzer 1914 is configured to select the one or two sound signatures that most closely match sample vector with a lawn mower component. The vector analyzer 1914 performs the analysis for each bin, or frequency range encompassing multiple bins, across the entire frequency spectrum under analysis. The vector analyzer 1914 typically activates one to five sound signatures (e.g., having a value between '0.3' and '1.0') and while deactivating the other sound signatures having the lawn mower component.

After determining activation values for each of the sound signatures for the sample vectors, the example vector analyzer 1914 is configured to provide the matrices W 2200, M 2202, and H 2204 for error processing and signal strength calculations to reduce false alarms. In some instances, the vector analyzer 1914 may use the activations in matrix H 2204 with the sound samples of matrix W 2200 to create a reconstruction of the sample vectors in the matrix M 2202. The reconstruction may be used to identify false alarms. As described in more detail below, error processing determines how well a reconstruction of the activated sound signatures match the sample vectors. In addition, signal strength calculations determine a robustness of the drone sound signature activations compared to background sound signature activations.

In other examples, the vector analyzer 1914 may identify which sound signatures were activated. The vector analyzer 1914 may then determine if any of the activated sound signatures are drone sound signatures. Contingent upon determining at least one drone sound signature is activated, the vector analyzer 1914 may cause an alert message 1916 to be transmitted, as shown in FIG. 19. Additionally or alternatively, the vector analyzer 1914 may transmit a message to activate a beamformer to determine a location of the detected drone. Further, the vector analyzer 1914 may send the activated drone sound signatures to the classifier 414 in the sample component 401. As described above in conjunction with FIG. 4, the classifier 414 uses a k-NN algorithm to determine a drone class, model/make, brand, etc. that corresponds to the selected drone sound signatures having a next lowest Wasserstein metric.

IV. Activation Embodiments

Figure 24:
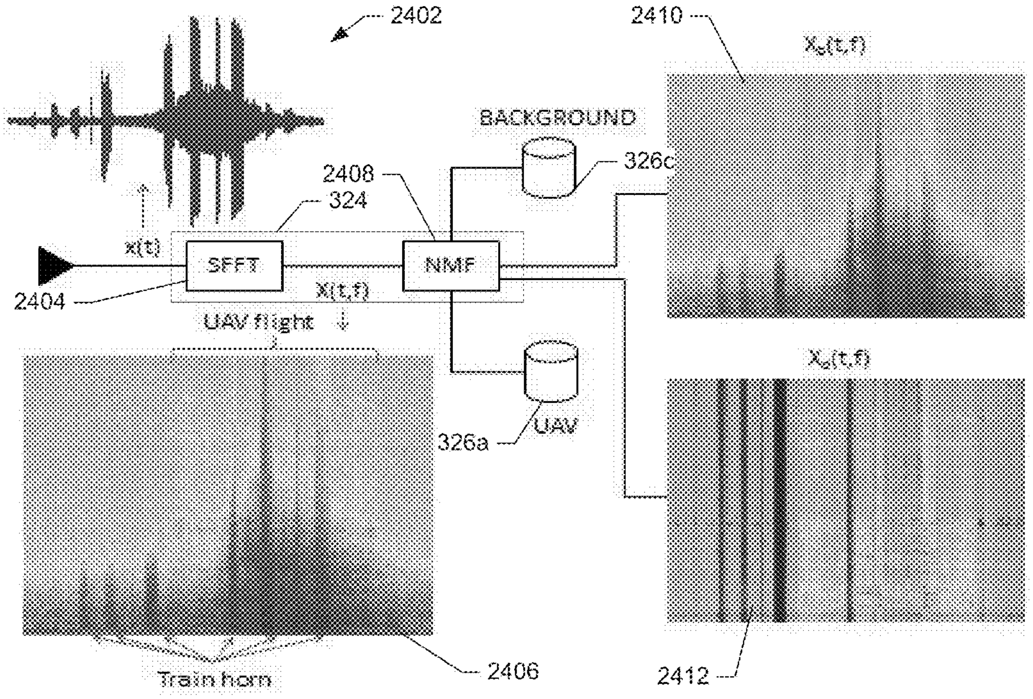
FIGS. 24 to 28 show diagrams illustrative of signal processing and sound signature activation performed by the sample processor of FIG. 19 to detect drones, according to example embodiments of the present disclosure.
Figure 25:
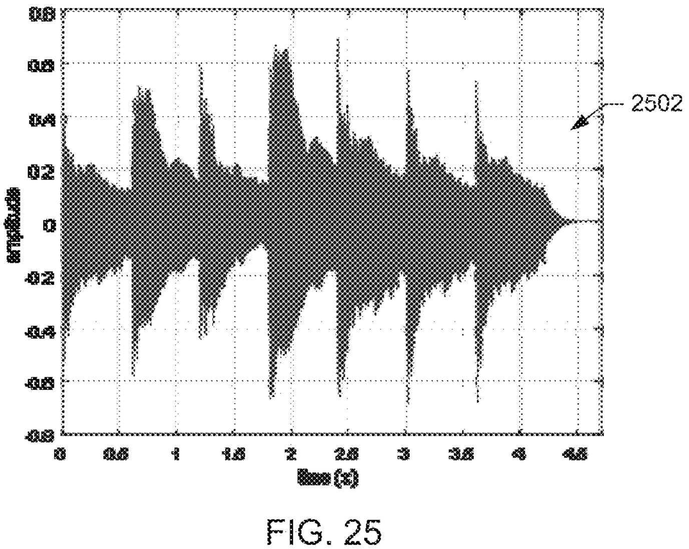

FIGS. 24 to 28 show diagrams that illustrate examples of the vector analyzer 1914 determining which drone and/or background sound signatures are activated for a sound sample, accordingly to example embodiments of the present disclosure. FIG. 24 shows a diagram where a sample processor 324 within a drone detection device 302 is configured to determine drone and background noise components within a sound sample 2402. In this example, discussion focuses on the analysis of the sound sample 2402. In other words, the example of FIG. 24 processes the sound sample 2402, or at least a portion of the sample, as a batch. This may be representative of embodiments where the sample processor 324 is configured to process samples at defined time intervals, such as 10 seconds, 20 seconds, 45 seconds, 1 minute, 10 minutes, etc. However, it should be appreciated that in some embodiments, the sample processor 324 is configured to continuously process sound samples such that a new analysis is performed every time a new sample vector is created from a sound sample.

The sound sample 2402 of FIG. 24 has a duration of 10 seconds and includes a drone operating in proximity of the device 302. In addition, the sound sample 2402 includes a train horn from a train in the distance. The sound sample 2402 is recorded by a microphone 320 and digitized by the sound card 322 of FIG. 3. A voltage amplitude of the sound sample 2402 is indicative of sound power in decibels.

The example sample component 401 of FIG. 19 performs a frequency transformation on the sound sample 2402 using, for example, an SFFT algorithm 2404 to produce a time-frequency spectrum 2406. In this example, a power level of each frequency is represented in FIG. 24 by line hashing. The example sample processor 324 partitions the spectrum 2406 into defined time segments and computes a power spectral density vector for each segment. In some examples, the sound sample 2402 may first be partitioned into time segments before a frequency transformation is performed.

An example NMF algorithm 2408, operated by the vector analyzer 1914, is configured to determine noise and drone components in the sample vectors. If this is a first instance of the drone being detected, or being detected through sample vectors still in the guard band 1908, the NMF algorithm 2408 updates the background database 326*c* based on previous sample vectors in the memory band 1912 of the temporary vector memory 1907 of FIG. 19. After updating the background database 326*c*, the NMF algorithm 2404 is configured to activate sound signatures in the databases 326*a*, 326*b*, and 326*c* by determining a minimum number of sound signatures needed to approximate or match the sample vectors.

In this illustrated example, the NMF algorithm 2408 determines that one or more background sound signatures (related to background time-frequency spectrum 2410) and one or more drone sound signature (related to background time-frequency spectrum 2412) are present in the time-frequency spectrum 2406. As discussed above in conjunction with the vector analyzer 1914, the NMF algorithm 2408 determines which of the sound signatures are activated for each of the sample vectors. The background time-frequency spectrum 2410 shows a reconstruction of the background noise component in the frequency domain using only the activated background sound signatures. Similarly, the drone time-frequency spectrum 2412 shows a reconstruction of the drone noise component in the frequency domain using only the activated drone sound signatures. To perform the reconstruction, the NMF algorithm 2408 determines which sound signatures are activated for each vector, which represents a different time segment. The NMF algorithm 2408 then combines sequentially the activated sound signatures for each sample vector, which produces the time-frequency spectrums 2410 and 2412. Thus, while each sample vector is analyzed independently by the NMF algorithm 2408 with respect to the sound signatures, the sample vectors are sequential and related to each other on a time scale, which enables reconstruction.

Reconstruction in the time domain of the activated sound signatures therefore enables the drone component and the background component of a sound sample (including broad spectrums of each) to be separated. For example, while the background spectrum 2410 appears to dominate the sound in the spectrum 2406, the drone spectrum 2412 confirms that there is indeed a drone in proximity, though not as apparent when only viewing the spectrum 2406. This indicates that the NMF algorithm 2408 enables drones to be detected even when sounds emitted from a drone are far less in magnitude or overpowered by background noise.

FIGS. 25 to 28 show diagrams illustrative of how the vector analyzer 1914 of the sample processor 324 of FIG. 19 determines which sound signatures are to be activated based on a detected sound sample 2502. In this example, the sound sample 2502 has a duration of 4.7 seconds. An amplitude of the sound sample 2502 is represented as a normalized voltage. The sound sample 2502 corresponds to the playing of "Mary had a little lamb" on a piano and has approximately 75,200 distinct elements or sample points.

Figure 26:
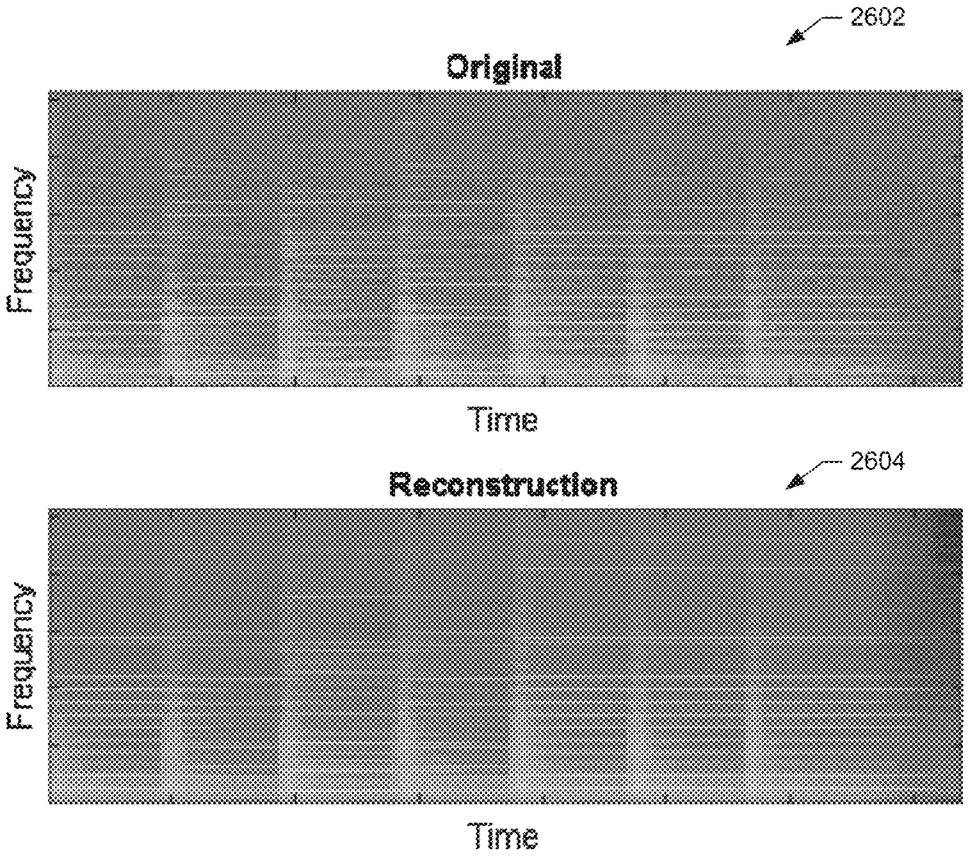

FIG. 26 shows a time-frequency spectrum 2602 created from a frequency transformation of the sound sample 2502. The power density is represented as hashed lines such that the spectrum provides a time-series power magnitude spectrum. In this example, there are 1025 distinct non-overlapping frequency bins and 147 different segments, which includes a segment length of about 0.03 seconds. The spectrum 2602 may be stored to an input matrix M by the vector analyzer 1914.

Figure 27:
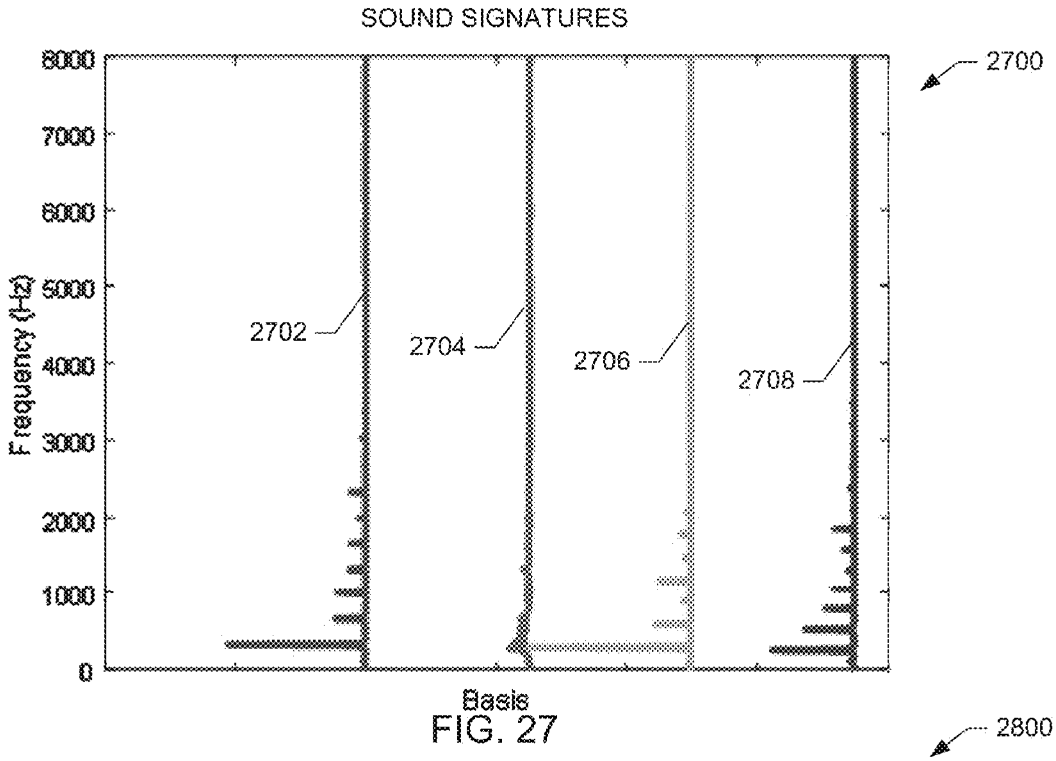

FIG. 27 shows a diagram 2700 of sound signature matrix W, which includes four sound signatures 2702, 2704, 2706, and 2708. Similar to matrix M, the matrix W of FIG. 27 includes 1025 distinct frequency bins. For convenience, the power value of each bin is represented by a line graph. Each of the sound signatures 2702 to 2708 shows peaks at different frequencies. Further, the peaks have different amplitudes.

Figure 28:
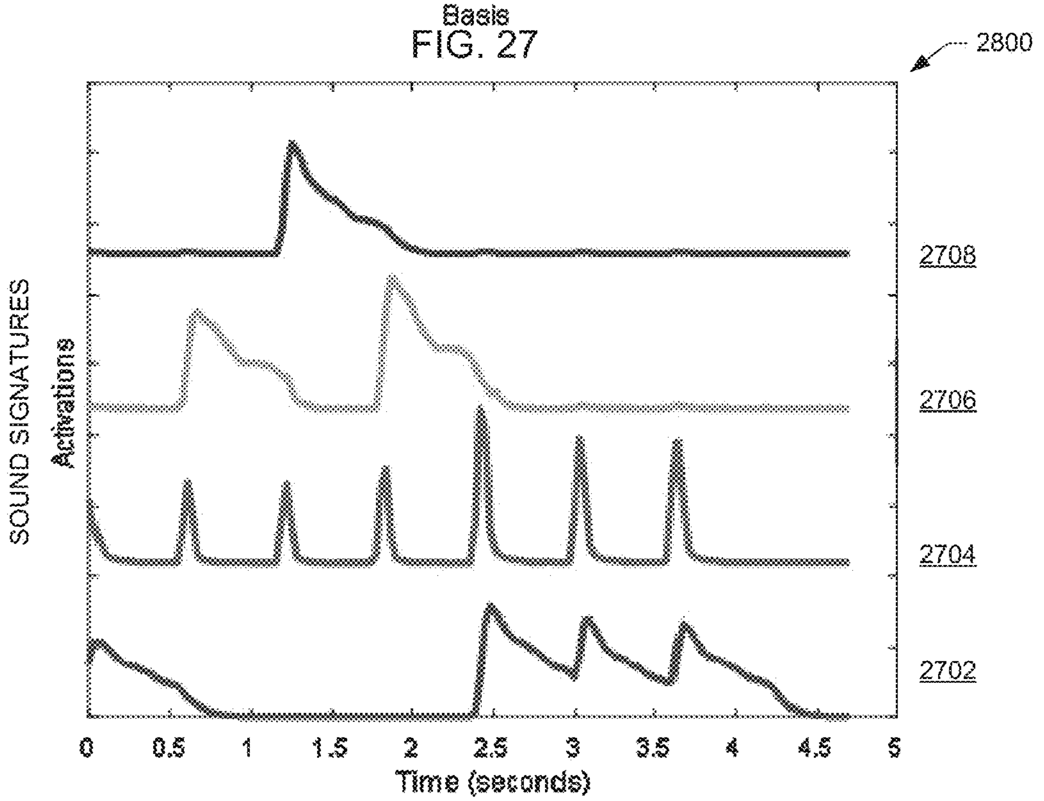

The example vector analyzer 1914 is configured to use the NMF algorithm 2408 to solve for activation matrix H based on matrices W and M. FIG. 28 shows a diagram 2800 of activation matrix H. Each of the rows corresponds to the different sound signatures 2702 to 2708. The activation value for each sample vector is represented as a line graph, which is formed by combining the activation values for sample vectors into a single time-series plot. Activations are provided for each of the 147 sample vectors. The activations illustrate activation values for the sound signatures 2702 to 2708 for each sample vector. Given the three musical notes for "Mary had a little lamb", it appears sound signature 2708 corresponds to the note for "had", sound signature 2806 corresponds to the note for "ry" and "a", and sound signature 2702 corresponds to the note for "Ma" and "little lamb". The sound signature 2704 corresponds to impulses associated with the beginning of each note.

It should be appreciated that the activations for sound signatures 2702 to 2708 include a range of values, and are not limited to a binary activated/deactivated. For instance, the activation for sound signature 2708 appears to peak for the sample vector at about 1.25 seconds and then trail off for subsequent vectors. The peak activation may coincide to when the piano key is struck, while the trail-off corresponds to the key's decaying oscillation, which produces a fainter tone over time. It should also be appreciated that for any given sample vector, some sound signatures are activated and others are not activated. This provides an indication as to whether that sound signature is present or approximates the sound within the sample vector.

Returning to FIG. 26, a time-frequency spectrum 2604 was created or reconstructed based on the activations of the corresponding sound signatures 2702 to 2708. In other words, for each sample vector, the value of the activation of the sound signatures 2702 to 2708 of FIG. 28 was applied to the frequency-based power amplitudes shown in FIG. 27. Specifically, the time-series power spectral density spectrum 2604 was created by the multiplication of matrices W and H. In comparing the sound sample spectrum 2602 with the reconstruction spectrum 2604, it appears the spectrums 2602 and 2604 are very closely matched. This example accordingly reinforces the accuracy of the vector analyzer 1914 using an NMF algorithm to determine drone and background components in a sound sample for drone detection.

V. Sound Signature Activation Error and Signal Strength Analysis

In some embodiments, the example sample processor 324 of FIG. 19 is configured to determine error and/or robustness of the sound signature activations to reduce the likelihood of false detections. This may be especially important when the drone detection device 302 is deployed at a sensitive location where a detection may trigger a response, such as individuals being alerted to find and take permitted countermeasures against a drone. Too many false detections may erode trust in the system and eventually lead to individuals ignoring all detection alarms.

The example error analyzer 1918 of the sample processor 324 is configured to determine error between the activated sound signatures and the power spectral density vectors in the sample matrix M 2202. In addition, the example signal analyzer 1920 of the sample processor 324 is configured to determine a strength of drone sound signature activations. Description of the error analyzer 1918 and the signal analyzer 1920 are provided below in reference to example procedure 2900 of FIGS. 29 and 30. However, it should be appreciated, based on application or design considerations, the sample processor 324 may omit the error analyzer 1918 and/or the signal analyzer 1920.

Figure 29:
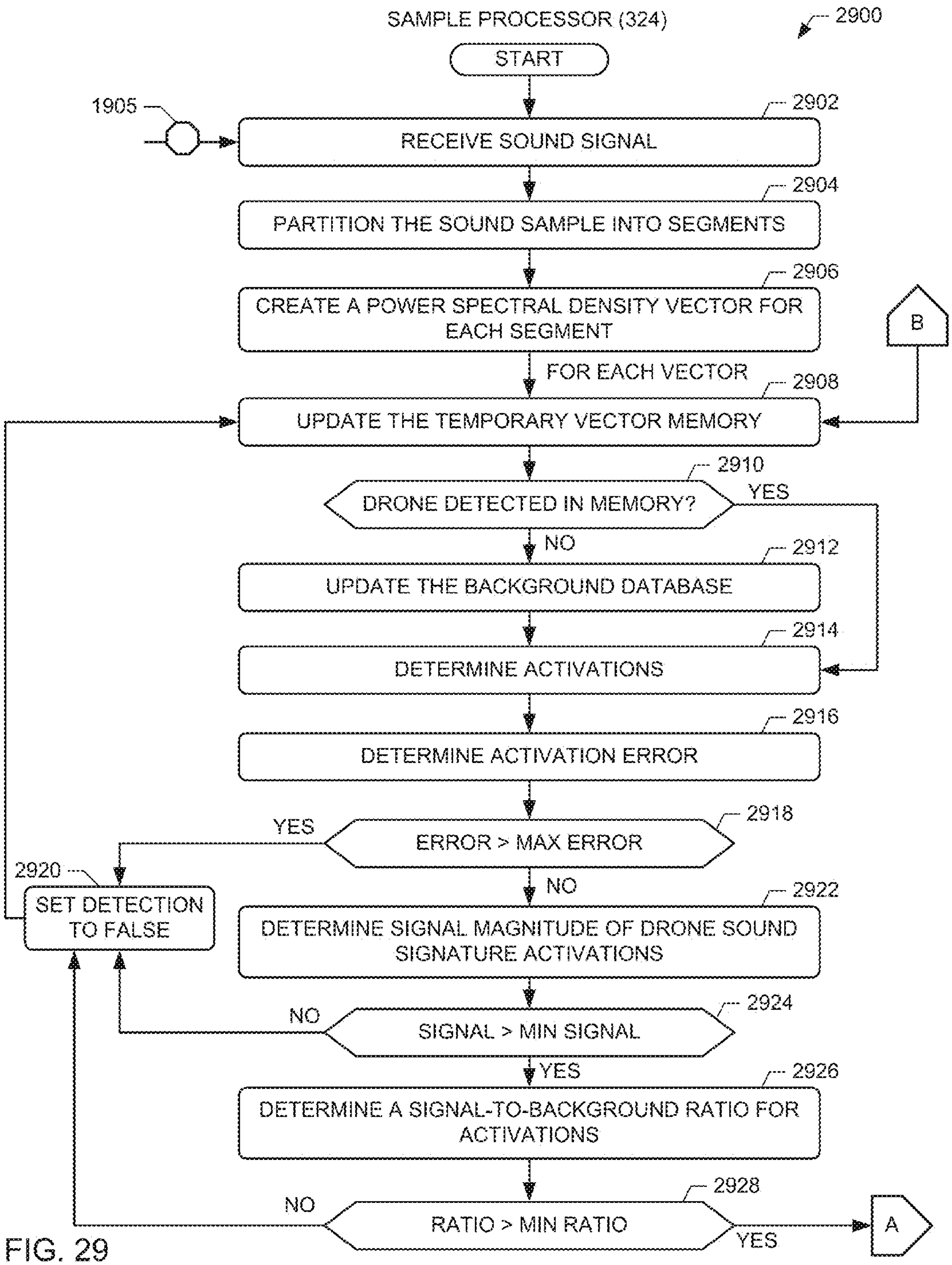
FIGS. 29 and 30 illustrate a flow diagram showing an example procedure to detect drones using background noise consideration, according to an example embodiment of the present disclosure.
Figure 30:
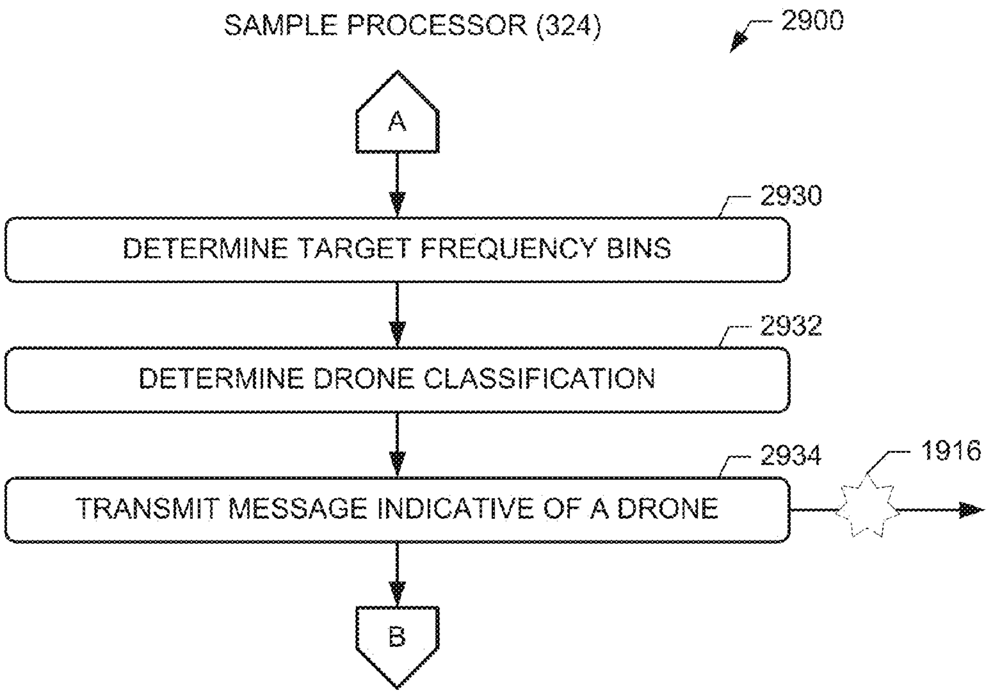

FIGS. 29 and 30 illustrate a flow diagram showing an example procedure 2900 to detect drones using background noise consideration, according to an example embodiment of the present disclosure. Although the procedure 2900 is described with reference to the flow diagram illustrated in FIGS. 29 and 30, it should be appreciated that many other methods of performing the steps associated with the procedure 2900 may be used. For example, the order of many of the blocks may be changed, certain blocks may be combined with other blocks, and many of the blocks described are optional including, for example, checks on drone sound signature activation robustness. Further, the actions described in the procedure 2900 may be performed among multiple components including, for example, the sample component 401, the memory manager 1902, the background update processor 1904, the vector analyzer 1914, the error analyzer 1918, and/or the signal analyzer 1920.

The example procedure 2900 begins when the sample processor 324 receives one or more digital sound sample signals from one or more sound cards 322 (block 2902). The sound samples may have predefined durations, such as one second. Alternatively, the samples may be streamed from incoming sound signals. The example sample processor 324 partitions the samples into segments (block 2904). For example, a one second sample may be partitioned into 0.1 or 0.01 second segments. The sample processor 324 then creates a power spectral density vector for each segment (block 2906). The power spectral density vector provides a relation of sound power to frequency for the respective sound segment.

The example processor 324 next performs a background sound signature update and drone detection analysis. The below description for procedure 2900 is based on an analysis being performed for each sample vector. However, in other embodiments, the sample processor 324 may process the sample vectors of each sound sample in a single batch for background sound signature updates and drone detection. In yet other embodiments, the sample processor 324 may perform background sound signature updates and drone detection at defined time periods and/or after a threshold number of sample vectors have been queued.

As illustrated in FIG. 29, for each sample vector, the sample processor 324 updates the temporary vector memory 1907 by adding the sample vector to a right (literal or virtual) side of the memory block 1906 (block 2908). The sample processor 324 then determines if any of the previously stored sample vectors in the memory band 1912 of the memory block 1906 include at least one activated drone sound signature (block 2910). If a drone sound signature activation is not located in the memory band 1912 (or can be easily isolated in a subset), the sample processor 324 is configured to update the sound signatures in the dynamic background database 326*c*, as described above in conjunction with the description of the background update processor 1904 (block 2912). Additionally or alternatively, at least some of the sample vectors in the memory band 1912 may be copied to the database 326*c*.

After the dynamic background database 326*c* is updated, the example sample processor 324 determines sound signature activations, as discussed above in connection with the vector analyzer 1914 (block 2914). In addition, block 2914 is performed, with the background sound signature updating block 2912 being skipped, if the sample processor 324 determines in block 2910 that at least one sample vector in the memory band 1912 includes an activated drone sound signature (or the sample vectors related to activated drone signatures cannot be easily isolated in one or more subsets in the memory band 1912). As discussed above, the sample processor 324 is configured to use, for example, an NMF algorithm to determine which combination of drone and background sound signatures match, or at least approximate, one or more sample vectors. The combination of matching or approximating drone and background sound signatures are identified as activated sound signatures.

The example sample processor 324 is configured to use the error analyzer 1918 to determine sound signature activation error (e) (block 2916). The error e is a reconstruction error and measures how well the NMF algorithm is able to reconstruct the one or more sample vectors using the activated sound signatures in the databases 326. Specifically, the error analyzer 1918 solves for error e by measuring a distance between the input sample vectors of the sample matrix M 2202 and the NMF approximation represented as the product of matrices W 2200 and H 2204 (where W*H represents the reconstruction of M). The reconstruction (W*H) should closely approximate the sample matrix M if the background sound signatures model the acoustic environment well. If the reconstruction poorly matches the sample vectors in the sample matrix M, the background sound signatures may not model the environment well or the signal separation NMF algorithm may not have achieved an acceptable solution. In either case, the sample processor 324 is configured to wait until the sound signatures are better adapted to the acoustic environment or the background returns to normal (known) conditions before making a drone detection.

The error e may be determined, for example, using a normalized 2-norm equation shown below in equation (9). Alternatively, the error e may be determined using a beta divergence routine.

$$e = \frac{\|WH - M\|}{\|M\|} \quad (9)$$

The value of error e is between '0' and '1', with larger values being indicative that the activated sound signatures are not representative of the input sample vectors of the sample matrix M 2202. For instance, the activated sound signatures may not be sufficiently approximating unfamiliar clutter sources or unfamiliar drones. Specifically, the NMF algorithm may have attempted to co-opt the sound signatures in an overly complex manner, which can lead to a false detection. The error analyzer 1918 is configured to suppress false alarms from unfamiliar noise sources until they can be used to update the dynamic background sound signatures and/or the drone sound signatures.

The error analyzer 1918 is configured to compare the error e to an error maximum threshold (e-max), which may be a value between '0.25' and '1', preferably between '0.33' and '0.5'. Lower values of e-max can mitigate and suppress detections, thereby reducing or eliminating false alarms. However, lower values of e-max may also disregard actual detections of drones. In some instances, the error analyzer 1918 may change the value of e-max to adapt to seasonal variability, clutter sources, and/or weather conditions not present during a background data collection period.

If the error e is greater than e-max, the example error analyzer 1918 of the sample processor 324 is configured to set a detection flag for the sample vector(s) under analysis to false (block 2920). This may include setting a flag within metadata of each of the respective sample vectors. This may also include creating a file that identifies the sample vectors analyzed in the sample matrix M 2202 with an indication that drone detection is false. The example sample processor 324 then returns to block 2908 for the next sample vector to be included within a drone detection analysis.

If, however, the error e is less than e-max, the example error analyzer 1918 transmits a message to the signal analyzer 1920 to determine a robustness of the drone sound signature activations. The example signal analyzer 1920 is configured to determine a signal magnitude (s) of drone sound signature activations (block 2922). The signal magnitude s represents a strength of the drone sound signature activations. In some embodiments, signal magnitude may be determined as an absolute magnitude by setting $s=\|H_d\|$. In other examples the signal magnitude may be determined as a relative signal magnitude where $s=\|H_d\|/(\|H_d\|+\|H_{bg}\|)$.

The relative signal magnitude s provides a value between '0' and '1' that indicates how much of the activations are drone sound signature activations compared to background sound signature activations. For instance, a value of '0' for s indicates that there is no drone component in a sound sample (e.g., the sound sample comprises only background noise). In contrast, a value of '1' for s indicates that an entire sound sample comprises only drone components. Further, larger values of signal magnitude s provide an indication of a large/near drone and/or that there is a sufficient match between the actual drone sound and the drone sound signatures. Smaller values of signal magnitudes provide an indication of a quiet/far drone, a poor match between recorded sound and drone sound signatures, poor performance of noise signal separation by the NMF algorithm, and/or a spurious activations of drone sound signatures as a result of background noise.

The example signal analyzer 1920 is configured to compare the signal magnitude s to a signal magnitude threshold (s-min) (block 2924). A value of s-min is selected to set a drone detection sensitivity. It should be appreciated that the value of s-min should be high enough to avoid triggering alerts based on spurious background activations but low enough to maintain good distance detection performance. For instance, the value of s-min may be between '0.25' and '0.85', preferable between '0.5' and '0.6'.

If the signal magnitude s is not greater than s-min, the example signal analyzer 1920 of the sample processor 324 is configured to set a detection flag for the sample vector(s) under analysis to false (block 2920). As discussed above, this may include setting a flag within metadata of each of the respective sample vectors. This may also include creating a file that identifies the sample vectors analyzed in the sample matrix M 2202 with an indication that drone detection is false. The example sample processor 324 then returns to block 2908 for the next sample vector to be included within a drone detection analysis.

If, however, the signal magnitude s is greater than s-min, the example signal analyzer 1920 determines a signal-to-background ("SB") ratio (block 2926). In some embodiments, the signal analyzer 1920 may determine the signal magnitude s and omit calculation of the SB ratio or vice versa. The SB ratio provides an indication of the activated drone sound signatures normalized by activated background signatures. The SB ratio facilitates drone detection in instances where a sound amplitude of a background noise component in a sound sample is similar or greater than a drone component. An SB ratio is determined for each frequency bin for each of the sample vectors of the sample matrix M 2202. Each SB ratio represents how well done sounds are spectrally separated from background noise for the respective frequency bin at the designated sample vector. SB ratios having a value greater than '1' indicate that drone sounds dominate the respective frequency bin for that sample vector. The example signal analyzer 1920 may use equation (10) below to determine an SB ratio for each sample vector of the sample matrix M 2202 at each frequency bin.

$$SBR = \frac{W_d h_d}{W_{bg} h_{bg} + \varepsilon} \tag{10}$$

In equation (10), $h_d$ and $h_{bg}$ correspond to drone and background sound signature activations of the activation matrix H 2204 for each respective sample vector. ε is a small positive constant used in equation (10) to improve numerical stability. It should be appreciated that the SB ratio may range from −100 (or 0) to +100 (or 1/ε) based on power amplitude differences between drone and background sound signatures at each frequency bin.

Figure 31:
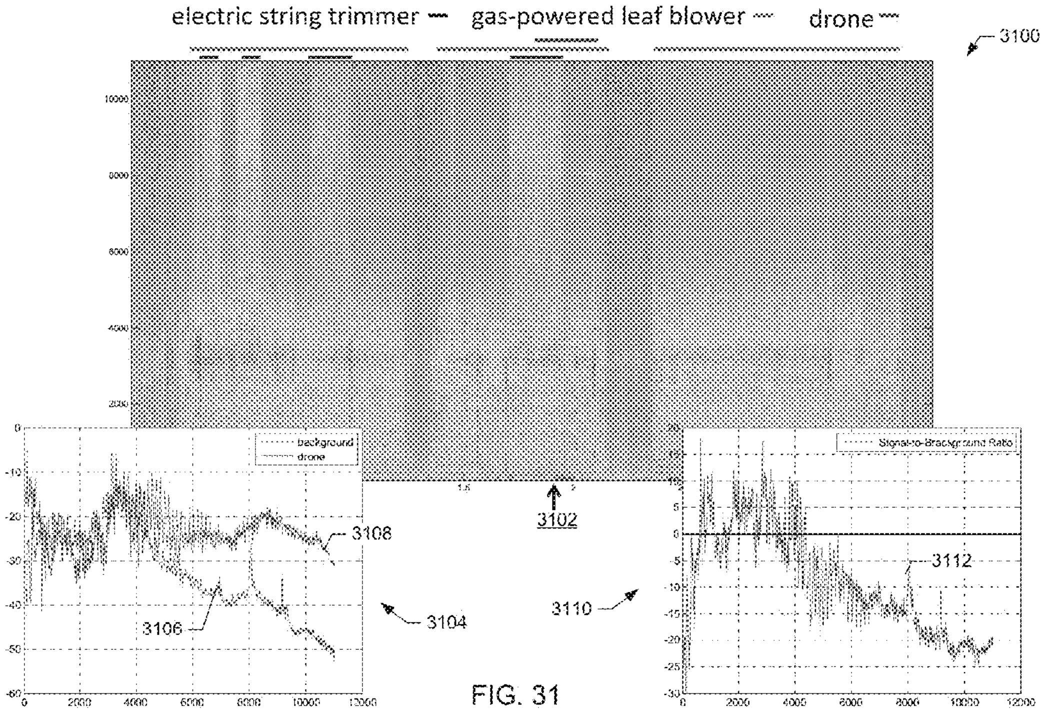
FIGS. 31 and 32 show diagrams illustrative of example signal-to-background ratio calculations performed by the sample processor of FIG. 19, according to example embodiments of the present disclosure.
Figure 32:
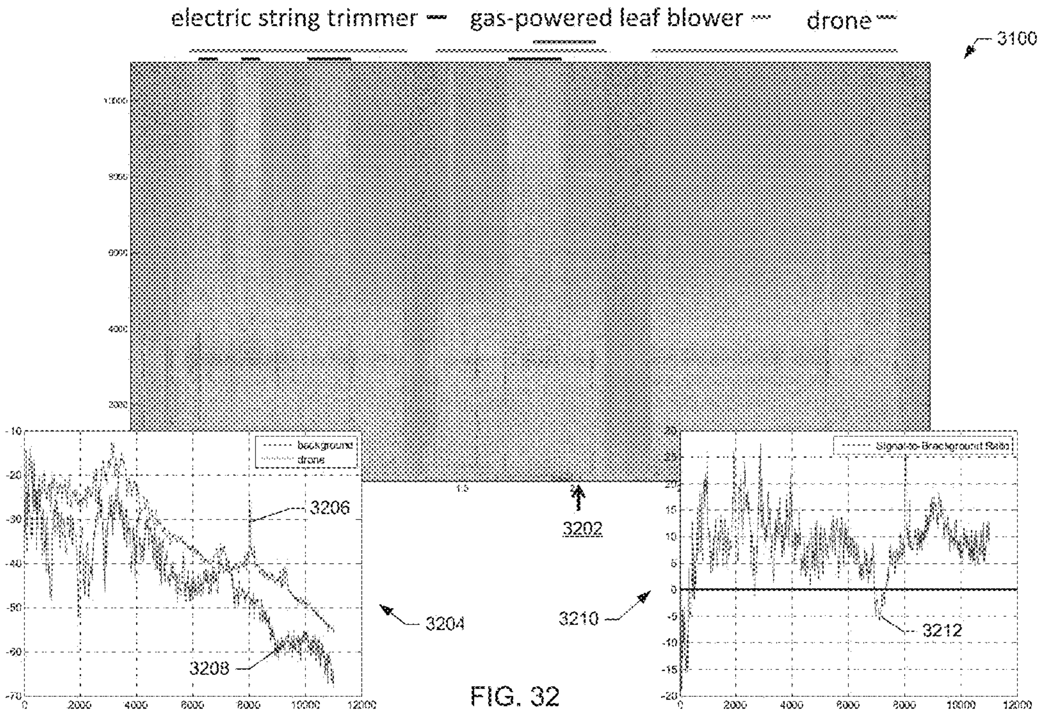

FIGS. 31 and 32 show diagrams illustrative of SB ratio calculations performed by the signal analyzer 1920 of FIG. 19 using equation (10), according to example embodiments of the present disclosure. FIG. 31 shows a time-series power spectral density spectrum 3100 when a drone is present during landscaping work. Similar to the spectrums 2302, 2306, and 2310 of FIG. 23, the spectrum 3100 of FIG. 31 shows a power of different frequencies over a time period of four seconds. In this example, a sample power spectral density vector 3102 at about 1.9 seconds is analyzed. The vector analyzer 1914 determines drone and background sound signature activations that approximately match the sample vector 3102. Graph 3104 shows power amplitudes for activated drone sound signatures (represented by line 3106) and activated background sound signatures (represented by line 3108) for each frequency bin. In this example, the power for all activated drone sound signatures are summed and normalized as one value for each frequency bin while the power for all activated background sound signatures are summed and normalized as another value for the same frequency bin. The normalization enables the SB ratios to be calculated such that a value of '1' may be used as a threshold for drone detection. Graph 3110 shows the SB ratio 3112 calculated from lines 3106 and 3108 at each frequency bin using equation (10). SB ratios having a value greater than '1' are indicative of a drone presence at those frequencies. In comparison, SB ratios having a value less than '1' are indicative of less or no drone presence at those frequencies. For example, from 6 kHz to 11 kHz, the background sound signatures of line 3108 dominate. Accordingly, the SB ratio in graph 3110 shows the SB ratio range from −10 to −25 between 6 kHz to 11 kHz. This indicates that the sound, especially between 6 kHz and 11 kHz originated from one or more background clutter sources.

FIG. 32 shows the same time-series power spectral density spectrum 3100 as FIG. 31. However, in FIG. 32, a sample vector 3202 at 2.05 seconds is analyzed. Graph 3204 shows that the power amplitudes for the activated drone sound signatures (represented by line 3206) is greater in value than the power amplitudes for the activated background sound signatures (represented by line 3208) across most of the frequency spectrum. In this example, graph 3210 shows SB ratio 3212 that is predominantly above the value of '1' across the frequency spectrum, indicating that sound at sample vector 3202 is predominantly related to a drone.

Returning to FIG. 29, the example signal analyzer 1920 is configured to compare the SB ratios for each sample vector to a minimum threshold (sb-min) (block 2928). The value of sb-min may be any value between '0' and '10', preferably between '1' and '4'. A greater sb-min value increases the threshold for detecting a drone, thereby reducing the chances of false detections. However, a value too high may reduce the distance at which a drone may be detected. In other words, a value too high for sb-min reduces the range of the drone detection device 302.

As mentioned above, an SB ratio is determined for each frequency bin of a sample vector. The example signal analyzer 1920 is configured to determine a number of frequency bins that are above the sb-min threshold. This ensures that one or a few bins that have an SB ratio slightly above '1' do not cause a false alarm. The threshold of frequency bins is between '10' and '100', preferable between '30' and '50'. If a sufficient number of frequency bins do not have an SB ratio above sb-min, the example signal analyzer 1920 is configured to set a detection flag to false for the sample vector under analysis (block 2920). The signal analyzer 1920 performs this check for each sample vector analyzed. If all of the sample vectors have false detection flags, sample processor 324 then returns to block 2908 for the next sample vector to be included within a drone detection analysis. Additionally or alternatively, if less than a threshold number of sample vectors have false detection flags (e.g., less than 5% of all sample vectors analyzed in matrix M 2202), the example procedure returns to block 2908.

However, if at least a threshold number (or at least one sample vector) has a threshold number of frequency bins above the sb-min threshold, the example sample processor 324 performs a classification routine to determine if indeed a drone has been detected. The sample processor 324 may also build a list of target frequency bins for controlling a beamformer. In some alternative embodiments, if at least a threshold number (or at least one sample vector) has a threshold number of frequency bins above the sb-min threshold, the sample processor 324 determines that a drone has been detected and sets a detection flag for the respective sample vector. Drone detection may cause the sample processor 324 to transmit an alert message, activate beamforming tracking, activate other detection sensors (e.g., radar, optical, RF) to confirm the detection, and/or activate countermeasures. The following section discusses the classification and tracking features of the example procedure 2900 of FIG. 30.

VI. Drone Classification and Beamformer Control

As mentioned above, if at least a threshold number (or at least one sample vector) has a threshold number of frequency bins above the sb-min threshold, a beamformer processor 1922 of the sample processor 324 is configured to determine target frequency bins for the respective sample vectors (block 2930). The beamformer processor 1922 is configured to, for example, create a list of target frequency bins that correspond to an SB ratio above the sb-min threshold. Alternatively, the beamformer processor 1922 may identify the one, two, four, ten, etc. target frequency bins that have the greatest SB ratios. These identified frequency bins may serve as spectral targets for a beamforming direction finder. In some instances, the beamformer processor 1922 may transmit an indication of the target frequency bins to a beamformer device. Alternatively, the beamformer processor 1922 may control a beamformer direction finder.

In addition, FIG. 30 shows that the classifier 414 of sample component 401 of FIG. 19 classifies drone sounds if one or more sample vectors have a threshold number of frequency bins above the sb-min threshold (block 2932). The classifier 414 uses a relative magnitude among drone sound signature activations to assign scores ($s_k$) to different drone models, types, flight characteristics. The classifier 414 uses the scores to gauge a likelihood of one drone model relative to another drone model. In an example, the classifier 414 may use a 2-norm equation, such as equation (11) shown below.

$$s_k = \frac{\|H_{d_k}\|}{\|H_d\|} \tag{11}$$

In equation (11), $H_{dk}$ is a subset of activated drone sound signatures ($H_d$) that are associated with the k-th drone model, type, brand, and/or flight characteristic. The classifier 414 selects the greatest $s_k$ score, which is indicative of the drone mode, type, flight characteristic. In some instances, the scores $s_k$ may be organized by flight characteristics for each drone model. As disclosed above, each drone sound signature includes metadata indicative of a drone type, brand, model, and/or flight characteristic. Equation (11) may be performed for each flight characteristic of each drone model. For example, equation (11) may provide an indication that 90% of the sound signatures are related to Drone Model 1 while 10% of the sound signatures are related to Drone Model 2. For Drone Model 1, equation (11) determines that 40% of the sample vectors correspond to an approaching flight characteristic, 40% of the sample vectors correspond to a hovering flight characteristic, and 20% of the sample vectors correspond to an ascending flight characteristic. The classifier 414 determines not only is it more than likely that the detected drone is Drone Model 1, but also determines how the drone is operating. Such a configuration enables not only the drone model to be determined, but also an indication of the drone's flight pattern.

In some instances, the classifier 414 may compare activated drone signatures of the current analysis with activated drone signatures of previous recent sound samples. This provides an extended determination of drone detection and classification. Further, in some instances, the classifier 414 may use a k-NN classification algorithm using a Euclidean or Wasserstein norm and distance threshold, as discussed above in conjunction with FIG. 4 to classify drones.

After classifying a drone, the example sample processor 324 is configured to transmit an alert message 1916 that is indicative of the drone detection (block 2934). The alert message 1916 may include, for example, the determined or most likely drone model and/or one or more flight characteristics (which may be timestamped based on the corresponding sample vector). The alert message 1916 may be transmitted to the management server 308 and/or the user device 306 of FIG. 3. The alert message 1916 may also include the target frequency bins and be transmitted to a beamforming directional finder. After the message 1916 is transmitted, the example procedure 2900 returns to block 2908 of FIG. 29 where the next sample vector is added to the memory block 1906 for processing and analysis. In instances where all sample vectors of a sound sample have been processed, the example procedure 2900 returns to block 2902 and processes the next sound sample.

As mentioned above, one or more directional beamformers may be controlled to determine a location of a detected drone. The beamformer processor 1922 is configured to use the information related to a detected drone to determine how a beamformer is to be controlled to determine a location of a drone. A beamforming directional finder is configured to receive relatively narrow sound waves from one particular direction (e.g., a detection cone). In other words, a beamformer may use a constructive array such that acoustic signals from a narrowly defined angle are received (with constructive interference) while signals from other directions are discarded or destructively interfered. Since a location of a drone is not known (only that a drone is present), a beamformer has to sweep or scan a designated area. In addition, if target frequencies are not known, the beamformer has to sweep or scan through an entire frequency spectrum, which can take a significant amount of time. The beamformer processor 1922 uses the target frequency bins to limit which frequencies are used in the scan, thereby improving scan speed. This can be especially useful in noisy environments, where beamformers can sometimes spend too much time focusing on the loudest noise in the environment, which is usually not a drone.

To find a drone, the beamformer scans through the target frequency bins searching for noise power spikes. Once a spike is detected, the beamformer directional finder notes its heading, which is used to extrapolate an approximate location (including estimated altitude) of a drone. Amplitude of the sound may be used to estimate a distance. In some embodiments, the beamformer processor 1922 may track a drone once its location has been determined. The beamformer processor 1922 may transmit alert messages indicative of the location of the drone, including heading, altitude, and/or distance information.

Further, the beamformer processor 1922 may control or communicate with multiple directional finders. For example, two directional finders may be used to more precisely determine a location, altitude, and distance of the drone based on overlapping directional cone regions. Three or more directional finders may be used to provide more granular location, altitude, and/or distance data. In some embodiments, the location data from beamformer directional finder(s) may be used to automatically aim a frequency jamming device or other countermeasure to neutralize the drone.

Figure 33:
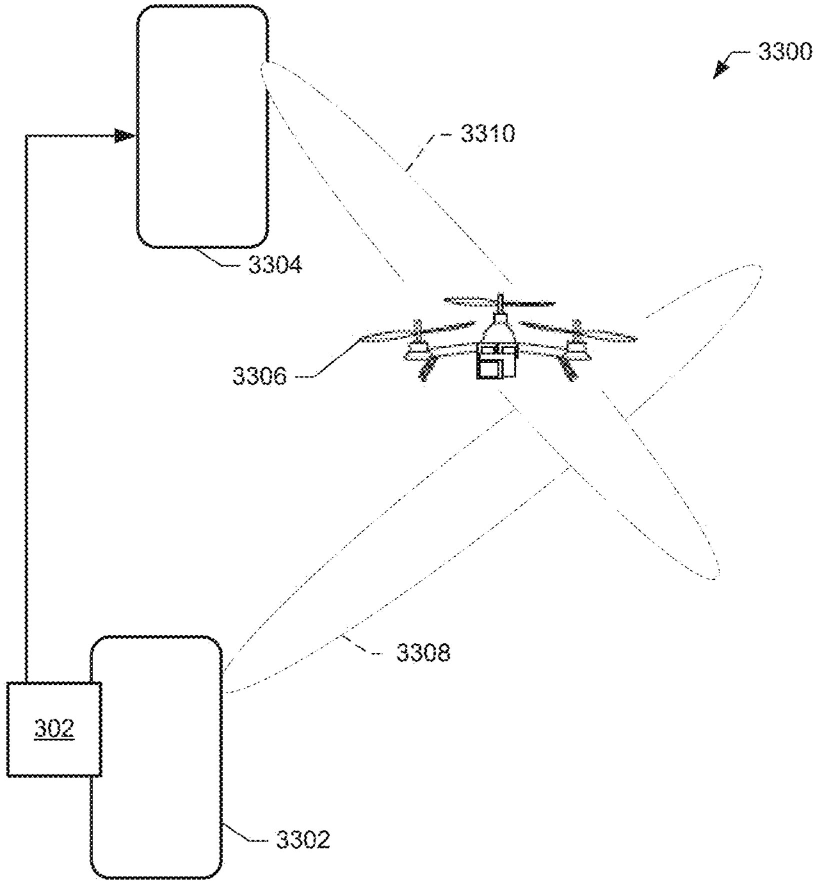
FIG. 33 shows a diagram of an example environment including beamformer directional devices configured to determine a location of a drone that was detected by the drone detector of FIG. 19, according to an example embodiment of the present disclosure.

FIG. 33 shows a diagram of an example environment 3300 including beamformer directional devices 3302 and 3304 searching for a drone 3306 that was detected by the drone detector 302 of FIG. 19, according to an example embodiment of the present disclosure. In this example, the beamformer 3302 moves cone 3308 in different directions to listen for the drone 3306 while the beamformer moves cone 3310 in different directions to also listen for the drone 3306. The beamformers 3302 and 3304 are configured to cycle through the target frequency bins for the respective cones 3308 and 3310. In this example the drone detection device 302 communicates the target frequency bins to both of the beamformers 3302 and 3304. If the beamformer 3302 only locates the drone 3306, it is determined that the drone 3306 is somewhere within the cone 3308. The beamformer 3302 knows the heading at which the cone 3308 is pointed and can approximate the location and altitude of the drone. Sound amplitude may be used by the beamformer 3302 to approximate distance, to further refine altitude and location. In addition, if the beamformer 3304 also locates the drone 3306 at the same time (or after the beamformer 3302 begins tracking the drone), then the location of the drone 3306 is limited to the intersection of the cones 3308 and 3310. In some instances, the beamformer 3302 may communicate to the beamformer 3304 its heading after detecting the drone 3306, which causes the beamformer 3304 to narrow its search. The cone intersection substantially narrows the potential location of the drone, to possibly a few square meters.

VII. Sound Signature Frequency Bin Embodiment

As mentioned above, the beamformer processor 1922 may determine target frequency bins of the sample vectors that have large SB ratios to detect drones. In some examples, the drone sound signatures and/or the background sound signatures may be associated with certain frequency bins representative of frequency peaks. For example, a drone sound signature for the S900 drone, shown in FIG. 20, has frequency peaks between 3 kHz and 3.6 kHz. The greatest peak is around 3.5 kHz. The drone sound signature may include an indication of the peak at 3.5 kHz and/or indications of the lesser peaks. In this embodiment, the example vector analyzer 1914 is configured to determine the power at the 3.5 kHz frequency bin for the sample vector(s) under analysis. If the power of a sample vector is above a certain threshold at the specified frequency bin(s), the vector analyzer 1914 determines that the drone sound signature is activated and/or determines that an S900 drone has been detected. It should be appreciated that each target frequency bin of a sound signature may have a different threshold.

The vector analyzer 1914 is configured to compare target frequency bins for all of the drone sound signatures in the drone database **326*a* to determine a drone model and/or flight characteristic in addition to providing general drone detection. The vector analyzer 1914 may also perform similar comparisons for target frequency bins of background sound signatures. The error analyzer 1918 and the signal analyzer 1920** may compare drone sound signatures to background sound signatures active through target frequency bin analysis to confirm drone detection and rule out false alarms. It should be appreciated that the use of only certain frequency bins for drone and background sound signatures reduces significant processing since the entire frequency spectrum is not analyzed, only the portions of the spectrum are analyzed that are most indicative of drones and background noise.

VIII. Sample Processor Partitioning

Figure 34:
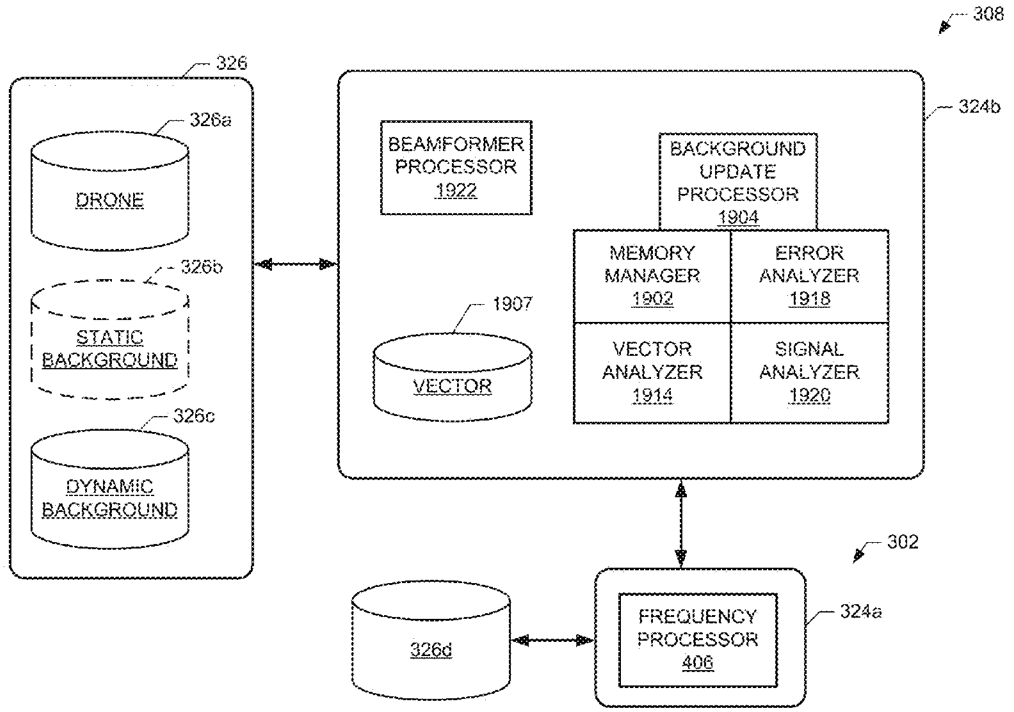
FIG. 34 shows a diagram where the sample processor of FIG. 19 is distributed across two different locations, according to an example embodiment of the present disclosure.

The example sample processor 324 of FIG. 19 may be distributed across different locations, as illustrated in FIG. 34. For example, a first portion **324*a* of the sample processor 324 may be located locally within a drone detection device 302. A second portion 324*b* of the sample processor 324 may be located at the management server 308 or other remote distributed computing server/device. In some examples, the second portion 324*b*** may be located in a centralized location at a deployment location.

The first portion 324*a* includes the frequency processor 406, which is configured to convert a digitized sound sample into non-overlapping sample power spectral density vectors. The first portion 324*a* may also be communicatively coupled to a local database 326*d*, which is configured to store sound samples, sample vectors, and/or drone/background sound signatures. The first portion 324*a* is communicatively coupled to the second portion 324*b* via, for example, the Internet.

The example second portion 324*b* of the sample processor 324 is configured to update the background sound signatures, determine sound signature activations, and perform error/signal analysis to detect drones and rule out false alarms. The second portion 324*b* may also perform classification and determine target frequency bins, which are transmitted to the sample processor 324*a* or separate beamformer directional finder(s) to locate a detected drone. The alert messages 1916 may also be transmitted to the first portion 324*a* and/or user devices related to the deployment location. The example second portion 324*b* is configured to maintain a separate dynamic background database 326*c* and/or static background database 326*b* for each first portion 324*a* and/or deployment location. However, the drone database 326*a* may be shared across different locations.

The configuration illustrated in FIG. 34 moves the most significant computational processing offsite to more capable servers. This accordingly reduces the processing power, energy consumed, and cost of the individual drone detection devices 302. Further, this enables the centralized location to scale based on a number of devices 302 in use. Moreover, centralizing the second portion 324*b* reduces the number of software updates needed to be transmitted and enables the system to be updated in real-time based on changing conditions and/or indications of false alarms.

Conclusion

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus configured to detect drones comprising:
- a microphone configured to receive a sound signal;
- a sound card configured to record a digital sound sample of the sound signal;
- a memory storing a plurality of drone sound signatures and a plurality of background sound signatures; and
- a processor configured to:
  - apply a frequency transformation to the digital sound sample to create a sample time-frequency spectrum;
  - determine a sample power spectral density of the sample time-frequency spectrum;
  - perform single channel source separation of the sample power spectral density using a non-negative matrix factorization algorithm to determine which of the plurality of sound signatures in the memory are activated by
    - determining a combination of the drone and background sound signatures stored in the memory that most closely match the sample power spectral density of the digital sound sample, and
    - applying a sparsity parameter to cause the non-negative matrix factorization algorithm to select a minimal combination of sound signatures needed to closely match the sample power spectral density;
  - determine if at least one of the plurality of drone sound signatures are activated; and
  - conditioned on the at least one of the plurality of drone sound signatures being activated, at least one of (i) transmit an alert indicative of a drone, and (ii) activate a beamformer to determine a location of a drone associated with the sound signal.

2. The apparatus of claim 1, wherein each of the drone and background sound signatures are stored as power spectral densities.

3. The apparatus of claim 1, wherein the drone and background sound signatures are stored within an m×p matrix W, where p is equal to a total number of drone and background sound signatures such that each column of the matrix W corresponds to a different drone or background sound signature and m is equal to a predetermined number of frequency bins, each entry within the matrix W specifying a power of the respective sound signature at the respective frequency bin.

4. The apparatus of claim 3, wherein the processor is configured to:
- partition the digital sound sample into n number of non-overlapping segments each having a predetermined duration;
- process each of the non-overlapping segments into a power spectral density vector; and
- create a sample m×n matrix M where n is equal to a total number of power spectral density vectors such that each column of the sample matrix M corresponds to a different power spectral density vector,
- wherein the sample matrix M has the same number m of predetermined frequency bins as the matrix W, and
- wherein each entry within the sample matrix M specifies a power of the respective power spectral density vector at the respective frequency bin.

5. The apparatus of claim 4, wherein the predetermined duration is between 0.05 seconds and 2 seconds.

6. The apparatus of claim 4, wherein the processor is configured to execute the non-negative matrix factorization algorithm to determine which of the plurality of sound signatures in the memory are activated by solving for an activation p×n matrix H, where the matrix W multiplied by the activation matrix H approximates the sample matrix M,
- wherein an i-th row and j-th column of the activation matrix H specifies a contribution of the drone or background sound signature at the i-th column of the matrix W for the power spectral density vector at the j-th column of the sample matrix M.

7. The apparatus of claim 6, wherein each entry of the activation matrix H includes a value greater than 0 that is indicative of how much of a respective drone or background sound signature matches a corresponding power spectral density vector across the predetermined number of frequency bins.

8. The apparatus of claim 4, wherein the non-negative matrix factorization algorithm is specified as:

$$H \leftarrow H \otimes \frac{W^T(M \otimes \Lambda^{\beta-2})}{W^T\Lambda^{\beta-1} + \mu}$$

where T indicates a matrix transpose, μ is the sparsity parameter and is greater than 0, β is a cost function that measures a difference between a linear combination of the sound signatures and each of the power spectral density vectors, and Λ:=WH.

9. The apparatus of claim 8, wherein the matrices W and H are determined by:

$$W, H = \min_{W,H} D(M \mid WH).$$

10. A system configured to detect drones comprising:
- a drone detection device including:
  - a microphone configured to receive a sound signal;
  - a sound card configured to record a digital sound sample of the sound signal; and
  - a frequency processor configured to:
    - apply a frequency transformation to the digital sound sample to create a sample time-frequency spectrum,
    - determine a sample power spectral density vector from the sample time-frequency spectrum, and
    - transmit the sample power spectral density vector for further analysis; and
- a server communicatively coupled to the drone detection device including:
  - a memory storing a plurality of drone sound signatures and a plurality of background sound signatures; and
  - a detection processor configured to
    - determine which of the plurality of sound signatures in the memory are activated using a non-negative matrix factorization algorithm by determining a combination of the drone and background sound signatures stored in the memory that most closely match the sample power spectral density vector,
    - determine if at least one of the plurality of drone sound signatures are activated, and
    - conditioned on the at least one of the plurality of drone sound signatures being activated, at least one of (i) transmit an alert indicative of a drone, and (ii) activate a beamformer in proximity of the drone detection device to determine a location of a drone associated with the sound signal.

11. The apparatus of claim 10, wherein the drone detection device is deployed at a specific location and the server is located within at least one of a management server, a cloud computing environment, and a distributed computing environment remote from the specific location.

12. The apparatus of claim 10, wherein the detection processor is configured to:
- determine if at least one sample power spectral density vector previously received within a predetermined time period is associated with a detected drone;
- conditioned on the previously received sample power spectral density vectors not being associated with a detected drone, before determining which of the plurality of sound signatures in the memory are activated, update at least some of the background sound signatures based on the previously received sample power spectral density vectors; and
- conditioned on at least one of the previously received sample power spectral density vectors being associated with a detected drone, refrain from updating the background sound signatures.

13. The apparatus of claim 12, wherein the detection processor is configured to use the non-negative matrix factorization algorithm to update the at least some of the background sound signatures by iteratively changing (i) the at least some of the background sound signatures and (ii) activations of the background sound signatures such the combination of (i) and (ii) closely approximates the previously received sample power spectral density vectors.

14. The apparatus of claim 10, wherein the detection processor is configured to:
- determine an error associated with the combination of the drone and background sound signatures that most closely match the sample power spectral density vector; and
- conditioned upon the error exceeding a threshold, determine that a drone is not detected.

15. The apparatus of claim 10, wherein the detection processor is configured to:
- determine a ratio between activated drone sound signatures and activated background sound signatures; and
- conditioned upon the ratio not exceeding a threshold, determine that a drone is not detected.

16. A method for detecting drones comprising:
- receiving, via an interface, a digital sound sample;
- partitioning, via a processor, the digital sound sample into segments;
- applying, via the processor, a frequency and power spectral density transformation to each of the segments to produce respective sample vectors;
- for each of the sample vectors, determining, via the processor, a combination of drone sound signatures and background sound signatures stored in a memory that most closely match the sample vector;
- applying for each of the sample vectors, via the processor, a sparsity constraint to the combination of drone sound signatures and background sound signatures to select a minimal combination of sound signatures needed to closely match the respective sample vector;
- determining, via the processor, for the sample vectors, if the drone sound signatures in relation to the background sound signatures that are included within the respective minimal combinations are indicative of a drone; and
- conditioned on determining the drone sound signatures are indicative of a drone, transmitting an alert message indicative of the drone.

17. The method of claim 16, further comprising:
- determining, via the processor, frequency bins of the drone sound signatures included within the minimal combination that are indicative of the drone; and
- transmitting, via the processor, an indication of at least some of the determined frequency bins to a beamformer directional finder to determine a location of the drone.

18. The method of claim 16, further comprising:

determining, via the processor, a classification of the drone based on metadata associated with the drone sound signatures that are included within the minimal combination; and transmitting, via the processor, the classification in conjunction with the alert.

19. The method of claim 16, wherein the processor is configured to determine the combination or the minimal combination by performing a sum-of-squares or least squares regression analysis to determine which of the drone sound signatures and the background sound signatures have minimal power differences between certain groups of frequency bins.

20. The method of claim 16, wherein the minimal combination includes only drone sound signatures and no background sound signatures or only background sound signatures and no drone sound signatures, wherein the alert is not transmitted if the combination only includes background sound signatures.

* * * * *